(12) United States Patent
Tokuchi

(10) Patent No.: US 10,987,804 B2
(45) Date of Patent: Apr. 27, 2021

(54) ROBOT DEVICE AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 208 days.

(21) Appl. No.: 15/642,665

(22) Filed: Jul. 6, 2017

(65) Prior Publication Data

US 2018/0104816 A1 Apr. 19, 2018

(30) Foreign Application Priority Data

Oct. 19, 2016 (JP) .............................. JP2016-205160
Jan. 11, 2017 (JP) .............................. JP2017-002408

(51) Int. Cl.
*B25J 9/16* (2006.01)
*B25J 11/00* (2006.01)

(52) U.S. Cl.
CPC ............. *B25J 9/163* (2013.01); *B25J 9/1661* (2013.01); *B25J 9/1679* (2013.01); *B25J 9/1697* (2013.01); *B25J 11/008* (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 5,084,826 A | * | 1/1992 | Hariki | G05B 19/41815 700/248 |
| 5,963,712 A | * | 10/1999 | Fujita | B25J 9/1615 700/264 |
| 6,266,577 B1 | * | 7/2001 | Popp | B25J 9/163 700/245 |
| 6,324,443 B1 | * | 11/2001 | Kurakake | B25J 9/1656 318/568.24 |
| 6,364,026 B1 | * | 4/2002 | Doshay | A62C 3/0271 169/36 |
| 6,411,055 B1 | * | 6/2002 | Fujita | B25J 9/1679 318/568.12 |
| 6,584,375 B2 | * | 6/2003 | Bancroft | A47F 10/00 235/383 |
| 6,636,781 B1 | * | 10/2003 | Shen | B08B 9/045 318/568.11 |

(Continued)

FOREIGN PATENT DOCUMENTS

| | | |
|---|---|---|
| JP | H05-065766 A | 3/1993 |
| JP | 2003-291083 A | 10/2003 |

(Continued)

OTHER PUBLICATIONS

May 29, 2018 Office Action issued in Japanese Patent Application No. 2017-002408.

(Continued)

*Primary Examiner* — Jonathan L Sample

(74) *Attorney, Agent, or Firm* — Oliff PLC

(57) ABSTRACT

A robot device includes a detector and a controller. The detector detects a surrounding situation. If the robot device is unable to execute a solution for solving a problem in the surrounding situation by using a function of the robot device, the controller performs control so that the solution will be executed by using an element other than the robot device.

15 Claims, 36 Drawing Sheets

(56) References Cited

U.S. PATENT DOCUMENTS

| | | | | |
|---|---|---|---|---|
| 7,096,090 B1* | 8/2006 | Zweig | G05D 1/0022 | 700/245 |
| 7,174,238 B1* | 2/2007 | Zweig | G05D 1/0038 | 700/245 |
| 7,211,980 B1* | 5/2007 | Bruemmer | G05D 1/0246 | 318/567 |
| 7,236,861 B2 | 6/2007 | Paradis | F41H 13/00 | 701/120 |
| 7,304,581 B2* | 12/2007 | Miyazaki | G05D 1/0274 | 318/568.11 |
| 7,467,026 B2* | 12/2008 | Sakagami | B25J 9/1694 | 318/568.12 |
| 7,539,558 B2* | 5/2009 | Adachi | B25J 9/0003 | 700/245 |
| 7,860,614 B1* | 12/2010 | Reger | B25J 9/1671 | 700/264 |
| 7,912,633 B1* | 3/2011 | Dietsch | G05D 1/024 | 701/450 |
| 7,966,093 B2* | 6/2011 | Zhuk | G06N 3/008 | 700/246 |
| 8,108,071 B2* | 1/2012 | Lin | B25J 9/1674 | 700/248 |
| 8,112,176 B2* | 2/2012 | Solomon | G05D 1/0088 | 700/245 |
| 8,131,839 B2* | 3/2012 | Yu | G01D 21/00 | 709/224 |
| 8,138,868 B2* | 3/2012 | Arnold | H01L 24/83 | 335/219 |
| 8,160,746 B2* | 4/2012 | Wang | B25J 9/1671 | 700/259 |
| 8,200,700 B2* | 6/2012 | Moore | G06F 16/27 | 707/791 |
| 8,307,061 B1* | 11/2012 | Hickman | B25J 9/161 | 709/223 |
| 8,355,818 B2* | 1/2013 | Nielsen | G05D 1/0214 | 700/258 |
| 8,586,410 B2* | 11/2013 | Arnold | H05K 3/3436 | 438/107 |
| 8,958,912 B2* | 2/2015 | Blumberg | G05B 19/42 | 700/259 |
| 8,982,217 B1* | 3/2015 | Hickman | H04N 7/185 | 348/158 |
| 8,983,883 B2* | 3/2015 | Sterritt | G06N 3/004 | 706/14 |
| 8,984,136 B1* | 3/2015 | Francis, Jr. | G06F 16/2468 | 709/226 |
| 9,004,200 B2* | 4/2015 | Ben-Tzvi | B62D 55/065 | 180/7.1 |
| 9,020,636 B2* | 4/2015 | Tadayon | F24S 25/70 | 700/247 |
| 9,026,248 B1* | 5/2015 | Hickman | G05B 19/418 | 700/248 |
| 9,043,012 B2* | 5/2015 | Davey | G16H 40/67 | 700/216 |
| 9,222,205 B2* | 12/2015 | Head | D04C 3/14 | |
| 9,330,286 B2* | 5/2016 | Somani | B25J 9/1679 | |
| 9,358,685 B2* | 6/2016 | Meier | G06N 20/00 | |
| 9,486,921 B1* | 11/2016 | Straszheim | B25J 9/1679 | |
| 9,656,806 B2* | 5/2017 | Brazeau | B25J 5/007 | |
| 9,671,786 B2* | 6/2017 | Baltes | G05D 1/0274 | |
| 9,720,414 B1* | 8/2017 | Theobald | B25J 11/008 | |
| 2004/0024490 A1* | 2/2004 | McLurkin | G05D 1/0297 | 700/245 |
| 2004/0162638 A1* | 8/2004 | Solomon | F41H 13/00 | 700/247 |
| 2005/0065652 A1* | 3/2005 | Sakagami | B25J 9/1694 | 700/245 |
| 2005/0113974 A1* | 5/2005 | Doi | G05D 1/0278 | 700/245 |
| 2006/0079997 A1* | 4/2006 | McLurkin | G05D 1/0297 | 700/245 |
| 2006/0112034 A1* | 5/2006 | Okamoto | G05D 1/0251 | 706/16 |
| 2006/0195226 A1* | 8/2006 | Matsukawa | B25J 9/162 | 700/245 |
| 2007/0021867 A1* | 1/2007 | Woo | H04L 12/282 | 700/245 |
| 2007/0031217 A1* | 2/2007 | Sharma | B25J 9/0018 | 414/222.08 |
| 2007/0061040 A1* | 3/2007 | Augenbraun | A47L 5/225 | 700/245 |
| 2007/0061043 A1* | 3/2007 | Ermakov | A47L 9/009 | 700/263 |
| 2007/0061487 A1* | 3/2007 | Moore | G06F 16/27 | 709/246 |
| 2007/0150098 A1* | 6/2007 | Jang | G05D 1/0246 | 700/245 |
| 2007/0179669 A1* | 8/2007 | McLurkin | G05D 1/0297 | 700/245 |
| 2007/0192910 A1* | 8/2007 | Vu | B25J 19/06 | 700/245 |
| 2007/0208442 A1* | 9/2007 | Perrone | G05D 1/0088 | 700/95 |
| 2007/0250212 A1* | 10/2007 | Halloran | A47L 9/2894 | 700/245 |
| 2007/0271002 A1* | 11/2007 | Hoskinson | G05D 1/0088 | 700/245 |
| 2008/0009967 A1* | 1/2008 | Bruemmer | G05D 1/0088 | 700/245 |
| 2008/0009968 A1* | 1/2008 | Bruemmer | G06N 3/008 | 700/245 |
| 2008/0009969 A1* | 1/2008 | Bruemmer | G05D 1/0027 | 700/245 |
| 2008/0009970 A1* | 1/2008 | Bruemmer | G05D 1/0088 | 700/245 |
| 2008/0161970 A1* | 7/2008 | Adachi | B25J 9/1676 | 700/253 |
| 2008/0269948 A1* | 10/2008 | Solomon | A61B 5/416 | 700/245 |
| 2009/0015404 A1* | 1/2009 | Lin | B25J 9/1682 | 340/540 |
| 2009/0234788 A1* | 9/2009 | Kwok | G06N 3/006 | 706/46 |
| 2009/0248200 A1* | 10/2009 | Root | B25J 9/1602 | 700/245 |
| 2009/0306823 A1* | 12/2009 | Baltes | G05D 1/0274 | 700/245 |
| 2011/0054679 A1* | 3/2011 | Lefebvre | B08B 7/04 | 700/245 |
| 2011/0135189 A1* | 6/2011 | Lee | B25J 9/1682 | 382/153 |
| 2012/0150345 A1* | 6/2012 | Baltes | G05D 1/0274 | 700/245 |
| 2012/0165984 A1* | 6/2012 | Kang | B25J 5/00 | 700/259 |
| 2012/0185094 A1* | 7/2012 | Rosenstein | G05D 1/0251 | 700/259 |
| 2013/0054029 A1* | 2/2013 | Huang | B25J 5/005 | 700/259 |
| 2013/0217421 A1* | 8/2013 | Kim | H04W 4/18 | 455/456.3 |
| 2013/0218339 A1* | 8/2013 | Maisonnier | B25J 13/003 | 700/257 |
| 2013/0218346 A1* | 8/2013 | Root | B25J 9/1602 | 700/264 |
| 2013/0261796 A1* | 10/2013 | Park | B25J 9/1617 | 700/245 |
| 2013/0345876 A1* | 12/2013 | Rudakevych | B25J 9/104 | 700/259 |
| 2014/0136302 A1* | 5/2014 | Song | G05B 19/0426 | 705/14.4 |
| 2014/0336818 A1* | 11/2014 | Posselius | G05D 1/0297 | 700/248 |
| 2015/0088310 A1* | 3/2015 | Pinter | G16H 40/67 | 700/253 |
| 2015/0127155 A1* | 5/2015 | Passot | B25J 9/161 | 700/257 |

(56) References Cited

U.S. PATENT DOCUMENTS

| | | | |
|---|---|---|---|
| 2015/0190925 A1* | 7/2015 | Hoffman | B25J 9/1671 700/257 |
| 2015/0217449 A1* | 8/2015 | Meier | G05D 1/0033 700/257 |
| 2016/0046025 A1 | 2/2016 | Miyashita et al. | |
| 2016/0059412 A1* | 3/2016 | Oleynik | B62D 57/032 700/257 |
| 2016/0082298 A1* | 3/2016 | Dagenhart | A62C 3/025 169/46 |
| 2016/0114488 A1* | 4/2016 | Mascorro Medina | B25J 11/008 700/259 |
| 2016/0250752 A1* | 9/2016 | Djugash | B25J 9/161 700/264 |
| 2016/0325127 A1* | 11/2016 | Billman | A62C 3/0285 |
| 2017/0088205 A1* | 3/2017 | Karras | B64C 27/08 |
| 2017/0128759 A1* | 5/2017 | Zonio | A62C 31/00 |
| 2017/0282362 A1* | 10/2017 | Erhart | B25J 11/008 |
| 2017/0282375 A1* | 10/2017 | Erhart | B25J 9/1674 |
| 2017/0286651 A1* | 10/2017 | Erhart | G06F 21/31 |
| 2017/0286916 A1* | 10/2017 | Skiba | H04L 67/42 |
| 2018/0104816 A1* | 4/2018 | Tokuchi | B25J 9/163 |
| 2019/0242916 A1* | 8/2019 | Guarracina | B25J 19/06 |
| 2019/0248016 A1* | 8/2019 | Deyle | B25J 9/1697 |
| 2019/0369641 A1* | 12/2019 | Gillett | G05D 1/0088 |

FOREIGN PATENT DOCUMENTS

| | | |
|---|---|---|
| JP | 2005-111637 A | 4/2005 |
| JP | 2010-244222 A | 10/2010 |
| JP | 2014-188597 A | 10/2014 |

OTHER PUBLICATIONS

Jan. 28, 2020 Notice of Reasons for Refusal issued in Japanese Patent Application No. 2018-208618.

Jan. 28, 2020 Notice of Reasons for Refusal issued in Japanese Patent Application No. 2018-208458.

* cited by examiner

FIG. 5

| FREQUENCY | 900 MHz | 2.4 GHz | 5 GHz |
|---|---|---|---|
| MAJOR STANDARD | RFID (UHF BAND) | ZigBee (REGISTERED TRADEMARK)<br>Bluetooth (REGISTERED TRADEMARK) | IEEE802.11a<br>MuLTEfire |
| ADVANTAGES | • HIGH RESISTANCE TO OBSTACLES<br>• FEW INTERFERENCE FREQUENCY BANDS (SUCH AS THAT OF MICROWAVE OVENS) | • HIGH POWER SAVING<br>• HIGH SPEED<br>• SMALL-SIZE ANTENNA | • FEW INTERFERENCE FREQUENCY BANDS (SUCH AS THAT OF MICROWAVE OVENS)<br>• HIGH SPEED |
| DISADVANTAGES | • LARGE-SIZE ANTENNA<br>• SHORT COVERAGE RANGE | • MANY INTERFERENCE FREQUENCY BANDS | • LOW RESISTANCE TO OBSTACLES |

FIG. 6

| COMMUNICATION METHOD | INFRARED COMMUNICATION | VISIBLE LIGHT COMMUNICATION | NEAR FIELD COMMUNICATION (NFC) |
|---|---|---|---|
| ADVANTAGES | • HIGH POWER SAVING<br>• EASY MINIATURIZATION | • EASY TO TRACK COMMUNICATION PATH | • EASY PAIRING |
| DISADVANTAGES | • INFRARED IS INVISIBLE | • STRONG DIRECTIVITY | • LIMITED TO NEAR DISTANCES |

FIG. 7

| No | FUNCTION PROVIDED IN ROBOT DEVICE | OPERATION EXECUTABLE BY USING FUNCTION |
|---|---|---|
| 1 | LIFT OBJECTS WITH ARM PARTS | LIFT AND CARRY OBJECTS UP TO 30 kg |
| 2 | MOVE | MOVABLE BY CHANGING SPEED WITHIN 10 km/h |
| ... | ... | ... |

FIG. 8

| No | FUNCTION THAT IS NOT PROVIDED IN ROBOT DEVICE | OPERATION THAT IS NOT EXECUTABLE BY ROBOT DEVICE |
|---|---|---|
| 1 | COOLING FUNCTION FOR EXTERNAL ENVIRONMENTS | NOT CAPABLE OF COOLING THE ROOM |
| 2 | PRINT FUNCTION | NOT CAPABLE OF PRINTING WORDS OF VOICE OR DOCUMENTS |
| ... | ... | ... |

FIG. 9

| No | SITUATION (PROBLEM) | SOLUTIONS FOR SITUATION (PROBLEM) | PRIORITY |
|---|---|---|---|
| 1 | ROOM TEMPERATURE IS 30°C OR HIGHER. | (1) COOLING BY AIR CONDITIONER<br>(2) OPENING THE WINDOW | |
| 2 | PEOPLE IN THE ROOM ARE SWEATING. | (1) COOLING BY AIR CONDITIONER<br>(2) OPENING THE WINDOW | |
| 3 | PEOPLE IN THE ROOM LOOK COLD. | (1) TURNING ON HEATING<br>(2) CLOSING THE WINDOW | HIGHER THAN SITUATION 1 |
| ... | ... | ... | ... |

FIG. 10

| DEVICE ID | DEVICE NAME (TYPE) | FUNCTION | IMAGE ID |
|---|---|---|---|
| A | PC | DISPLAY FUNCTION, STORAGE FUNCTION, ... | ... |
| B | MULTIFUNCTION DEVICE | PRINT FUNCTION, SCAN FUNCTION, COPY FUNCTION, FAX FUNCTION, POST-PROCESSING FUNCTION, ... | ... |
| C | PROJECTOR | PROJECTING FUNCTION, ... | ... |
| ... | ... | ... | ... |

FIG. 11

| COMBINATION OF DEVICE IDs | DEVICE NAME (TYPE) | COLLABORATIVE FUNCTION |
|---|---|---|
| A, B | PC (A), MULTIFUNCTION DEVICE (B) | SCAN TRANSFER FUNCTION |
| | | PRINT FUNCTION |
| A, C | PC (A), PROJECTOR (C) | PROJECT FUNCTION |
| | | PRINT FUNCTION |
| B, C | MULTIFUNCTION DEVICE (B), PROJECTOR (C) | PROJECT FUNCTION |
| | | PRINT FUNCTION |
| ... | ... | ... |

FIG. 37

| COMBINATION OF DEVICE IDs | DEVICE NAME (TYPE) | COLLABORATIVE FUNCTION | CONNECTING ORDER | PRIORITY LEVEL |
|---|---|---|---|---|
| A, B | PC (A), MULTIFUNCTION DEVICE (B) | SCAN TRANSFER FUNCTION | B→A | 1 |
| | | | A→B | 2 |
| | | PRINT FUNCTION | A→B | 1 |
| | | | B→A | 2 |
| A, C | PC (A), PROJECTOR (C) | PROJECT FUNCTION | A→C | 1 |
| | | | C→A | 2 |
| | | ... | C→A | 1 |
| | | | A→C | 2 |
| ... | ... | ... | ... | ... |

FIG. 40

| DEVICE ID | DEVICE NAME (TYPE) | POSITION WITHIN IMAGE | FUNCTION | IMAGE ID |
|---|---|---|---|---|
| A | PC | ... | SCREEN DISPLAY FUNCTION | ... |
| | | ... | DATA STORAGE FUNCTION | |
| | | ... | ... | |
| B | MULTIFUNCTION DEVICE | ... | PRINT FUNCTION | ... |
| | | ... | SCAN FUNCTION | |
| | | ... | STAPLING FUNCTION | |
| | | ... | ... | |
| ... | ... | ... | ... | ... |

FIG. 42

| DEVICE ID | DEVICE NAME (TYPE) | PORTION | PORTION ID | FUNCTION | PORTION IMAGE ID |
|---|---|---|---|---|---|
| A | PC | DISPLAY | Aa | SCREEN DISPLAY FUNCTION | ... |
|   |    | BODY | Ab | DATA STORAGE FUNCTION | ... |
|   |    | ... | ... | ... | ... |
| B | MULTIFUNCTION DEVICE | BODY | Ba | PRINT FUNCTION | ... |
|   |    | READER | Bb | SCAN FUNCTION | ... |
|   |    | POST-PROCESSOR | Bc | STAPLING FUNCTION | ... |
|   |    | ... | ... | ... | ... |
| C | PROJECTOR | BODY | Ca | PROJECT FUNCTION | ... |
|   |    | ... | ... | ... | ... |
| ... | ... | ... | ... | ... | ... |

FIG. 43

| COMBINATION OF DEVICE PORTIONS | COMBINATION OF PORTION IDs | COLLABORATIVE FUNCTION |
|---|---|---|
| DISPLAY OF PC (A), BODY OF MULTIFUNCTION DEVICE (B) | Aa, Ba | PRINT FUNCTION |
|  | ... | ... |
| BODY OF MULTIFUNCTION DEVICE (B), BODY OF PROJECTOR (C) | Ba, Ca | PRINT FUNCTION |
|  | ... | ... |
| READER OF MULTIFUNCTION DEVICE (B), BODY OF PROJECTOR (C) | Bb, Ca | SCAN PROJECTING FUNCTION |
|  | ... | ... |

ROBOT DEVICE AND NON-TRANSITORY COMPUTER READABLE MEDIUM

CROSS-REFERENCE TO RELATED APPLICATIONS

This application is based on and claims priority under 35 USC 119 from Japanese Patent Application Nos. 2016-205160 filed Oct. 19, 2016 and 2017-002408 filed Jan. 11, 2017.

BACKGROUND

Technical Field

The present invention relates to a robot device and a non-transitory computer readable medium.

SUMMARY

According to an aspect of the invention, there is provided a robot device including a detector and a controller. The detector detects a surrounding situation.

If the robot device is unable to execute a solution for solving a problem in the surrounding situation by using a function of the robot device, the controller performs control so that the solution will be executed by using an element other than the robot device.

BRIEF DESCRIPTION OF THE DRAWINGS

An exemplary embodiment of the present invention will be described in detail based on the following figures, wherein:

FIGS. 5 and 6 illustrate characteristics of wireless communication technologies;
FIG. 7 illustrates a provided-function management table;
FIG. 8 illustrates a non-provided-function management table;
FIG. 9 illustrates a solution management table;
FIG. 10 illustrates a device function management table;
FIG. 11 illustrates a collaborative function management table;
FIG. 37 illustrates a collaborative function management table;
FIG. 40 illustrates a device function management table;
FIG. 42 illustrates a device function management table;
FIG. 43 illustrates a collaborative function management table.

DETAILED DESCRIPTION

Figure 1:
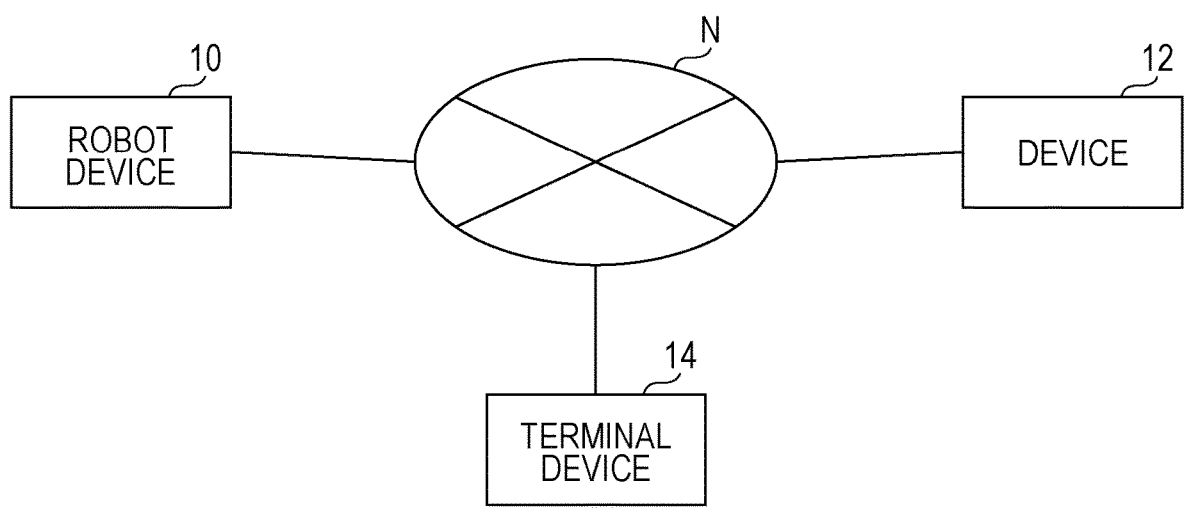
FIG. 1 is a block diagram of a device system according to the exemplary embodiment.

A device system, which serves as an information processing system according to an exemplary embodiment of the invention, will be described below with reference to FIG. 1. FIG. 1 illustrates an example of such a device system.

The device system according to this exemplary embodiment includes a robot device 10, one or plural devices 12, and a terminal device 14. The robot device 10, the device 12, and the terminal device 14 may communicate with another device via a communication path N, such as a network, or via different individual communication paths. The configuration of the device system shown in FIG. 1 is only an example, and the robot device 10, the device 12, and the terminal device 14 may not necessarily communicate with another device.

Although the single device 12 is included in the device system in the example in FIG. 1, plural devices 12 may be included in the device system. In this case, plural devices 12 having the same function may be included, or plural devices 12 having different functions may be included. Although the single terminal device 14 is included in the device system in FIG. 1, plural terminal devices 14 may be included in the device system. Another device, such as a server, may also be included.

The robot device 10 has the function of detecting the situation around the robot device 10 and finding a problem in the detected situation. The robot device 10 may detect the surrounding situation while moving or being still. When the robot device 10 has found a problem, it determines whether it is able to solve the problem by itself and performs processing according to the determination result. If the robot device 10 is able to solve the problem by itself, it solves the problem by executing a solution for solving this problem. If the robot device 10 is unable to solve the problem by itself, it performs control so that this solution can be executed by using an element other than the robot device 10. Examples of the element are a human, a device other than the robot device 10, and a robot device other than the robot device 10. The robot device 10 itself may an example of the element. The robot device 10 may cause another device to solve the problem, request a human to solve the problem, cause another device and a human to solve the problem, or solve the problem by collaborative work with another device and a human.

Examples of problems to be detected by the robot device 10 are those which can be solved only by the robot device 10, those which can be solved only by a device other than the robot device 10, those which can be solved only by a human, those which can be solved by collaborative work between another device and a human, those which can be solved by collaborative work between the robot device 10 and a human, those which can be solved by collaborative work between another device and the robot device 10, those which can be solved by collaborative work among another device, another robot device, and the robot device 10, and those which can be solved by collaborative work among another device, a human, and the robot device 10. That is, examples of the solution are a solution implemented only by the robot device 10, a solution implemented only by another device, a solution implemented only by a human, a solution implemented by collaborative work between another device and a human, a solution implemented by collaborative work between the robot device 10 and a human, a solution implemented by collaborative work between another device and the robot device 10, a solution implemented by collaborative work among another device, another robot device, and the robot device 10, and a solution implemented by collaborative work between another device, a human, and the robot device 10.

The device 12 is a device having a specific function. Examples of the device 12 are an image forming device having an image forming function, a personal computer (PC), a display device such as a liquid crystal display and a projector, an aroma diffuser diffusing aromas, a telephone set, a clock, a watch, a camera, a monitor camera, an automatic vending machine, an air conditioner, an electric fan, and a humidifier. A device other than these examples may be included in the device system. Some devices may be considered as robot devices, depending on the functions of such devices.

The terminal device 14 is a PC, a tablet PC, a smartphone, or a cellular phone, for example. The terminal device 14 is used by a user to execute a solution for solving a problem, for example.

In this exemplary embodiment, the robot device 10 detects a surrounding situation and finds a problem in the detected situation. The robot device 10 then performs control so that a solution for solving the problem can be executed in accordance with the type of problem.

The individual devices included in the device system according to the exemplary embodiment will be discussed below in detail.

Figure 2:
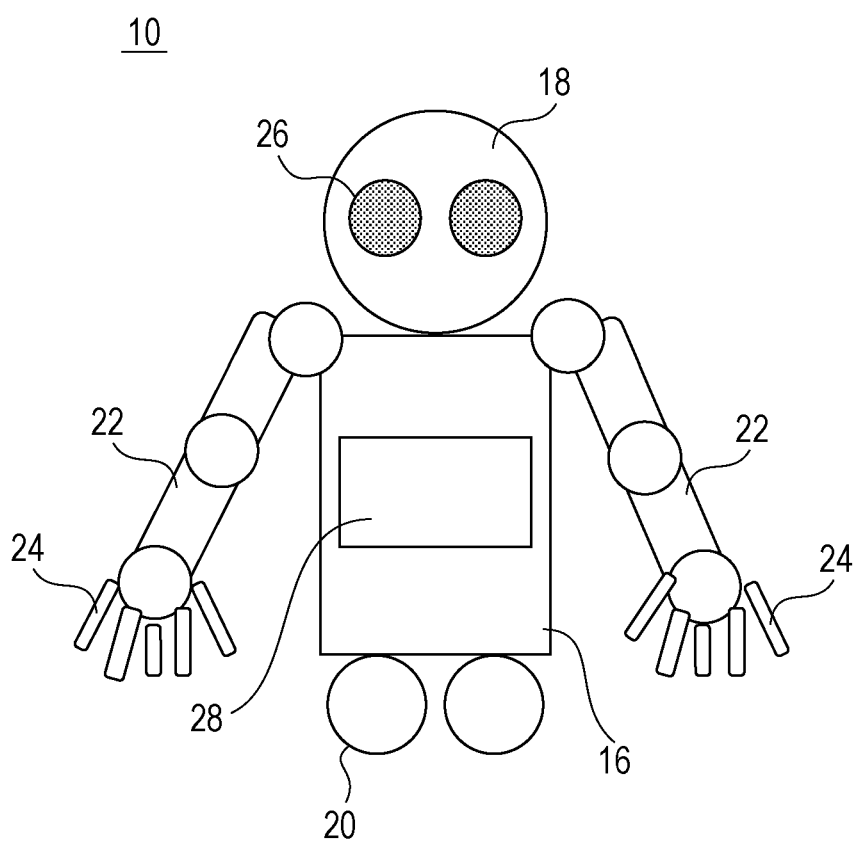
FIG. 2 illustrates the external appearance of a robot device according to the exemplary embodiment.

FIG. 2 illustrates the external appearance of the robot device 10. The robot device 10 is a humanoid robot, for example. The robot device 10 may alternatively be another type of robot. In the example shown in FIG. 2, the robot device 10 has a torso part 16, a head part 18 provided above the torso part 16, a leg part 20 provided below the torso part 16, arm parts 22 provided on both sides of the torso part 16, and finger parts 24 provided at the tips of the arm parts 22.

The robot device 10 has various sensors, such as a visual sensor, a hearing sensor, a touch sensor, a taste sensor, and an odor sensor, and thus have functions corresponding to the five senses of humans such as sight, hearing, touch, taste, and smell. Concerning the sense of touch, for example, the robot device 10 has the capability to understand and distinguish superficial sensation (such as touch, pain, and temperature), deep sensation (such as pressure, position, and vibration), and cortical sensation (such as two-point perception and stereo perception) from each other. The robot device 10 also has the sense of balance. A sensor, such as a camera 26, is provided in the head part 18 of the robot device 10. The sense of sight of the robot device 10 is achieved by recognizing images captured by the camera 26. A voice collector, such as a microphone, is provided in the robot device 10. The sense of hearing of the robot device 10 is achieved by recognizing voice obtained by the microphone.

The robot device 10 may include a detector for detecting the brain waves of a human. For example, a brain wave detector is attached to a human, and the detector provided in the robot device 10 receives information transmitted from the brain wave detector.

The leg part 20 corresponds to a moving unit, and is driven by a driving force from a drive source, such as a motor. The robot device 10 is able to move by using the leg part 20. The leg part 20 may have the shape of human legs or may be a roller or a tire. The leg part 20 may have another shape. The leg part 20 is only an example of the moving unit. The robot device 10 may include another moving unit, for example, a component for flying such as a propeller, a wing, and an airplane engine, or a component for moving under the water, such as an underwater engine. That is, the robot device 10 may include, as a moving unit, at least one of a component for land moving, a component for flying, and a component for moving under the water. The robot device 10 may not necessarily include any moving unit.

The robot device 10 may have the capability to catch or carry an object by using the arm parts 22 and the finger parts 24. The robot device 10 may have the capability to move while catching or holding an object.

The robot device 10 may have the function of outputting sound. The robot device 10 may have a communication function to send and receive data with another device. The robot device 10 may have the capability to communicate with a human, another device, or another robot device by emitting sound or sending a communication message.

The robot device 10 may have the capability to make decisions similar to those achieved by a human through machine learning using artificial intelligence (AI). Neural-network deep learning or reinforcement learning for partially reinforcing learning fields may be utilized.

The robot device 10 may have the function of searching for information (solutions for solving a problem, for example) by using the Internet, for example.

The robot device 10 may control the operation of another device by communicating with this device using a communication function. The robot device 10 may operate another device by using a remote controller or directly operate this device without using a remote controller. When directly operating another device, the robot device 10 manipulates an operation unit (such as buttons or a panel) provided in this device. If the robot device 10 is unable to control the operation of another device by communicating with this device, it may operate the device by using a remote controller or may directly operate this device. By analyzing an image obtained by the visual sensor, for example, the robot device 10 can identify the operation unit of another device or a remote controller to operate this device or the remote controller.

The robot device 10 may include a display 28. On the display 28, information concerning problems, information concerning solutions, various messages, and so on, are displayed.

Figure 3:
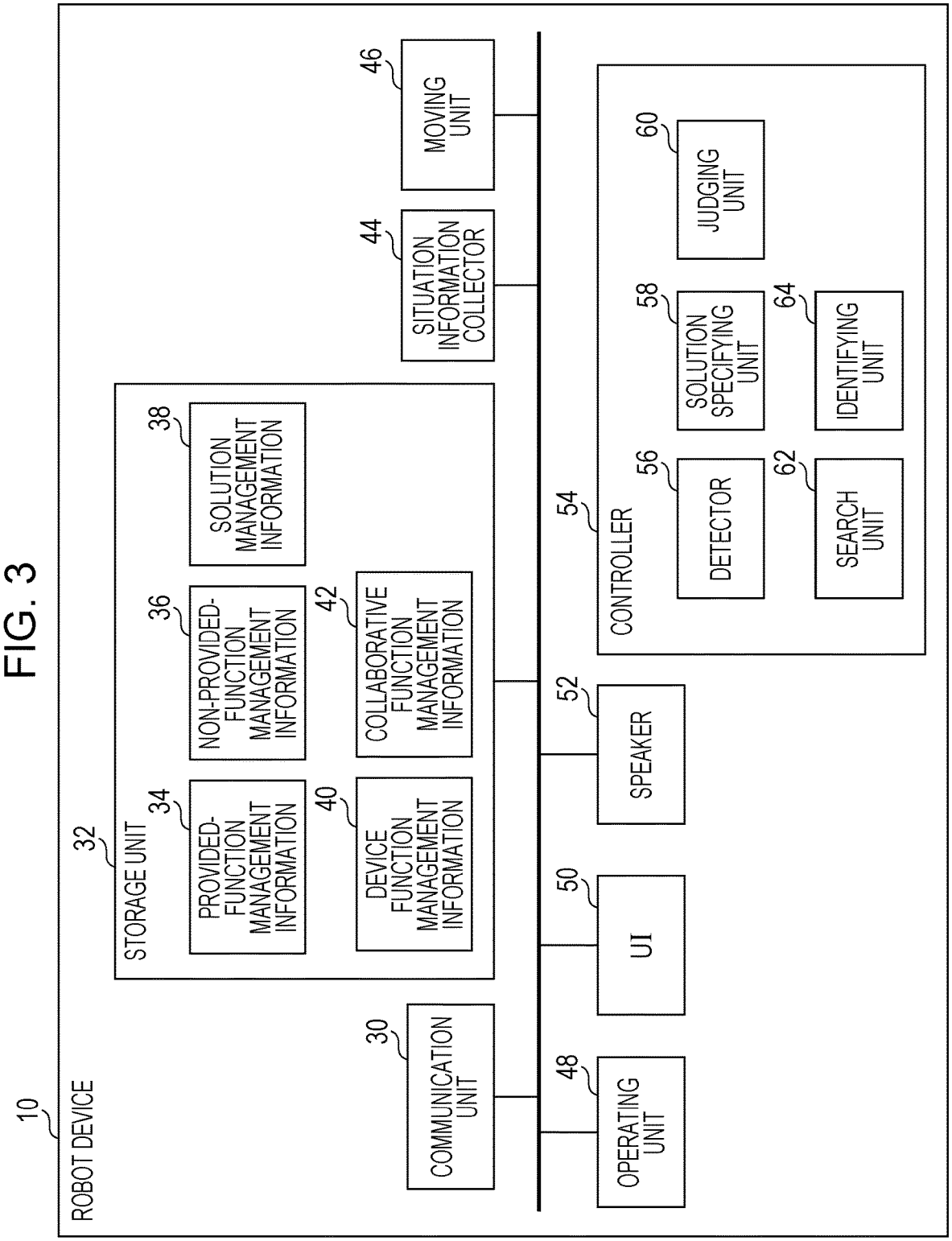
FIG. 3 is a block diagram of the robot device according to the exemplary embodiment.

The configuration of the robot device 10 will be described below in detail with reference to the block diagram of FIG. 3.

A communication unit 30, which is a communication interface, has the functions of sending data to another device and receiving data from another device. The communication unit 30 may be a communication interface having a wireless communication function or a communication interface having a wired communication function. The communication unit 30 supports one or plural communication methods, and communicates with a communication party in accordance with the communication method suitable for the communication party (that is, the communication method supported by the communication party). Examples of the communication methods are infrared communication, visible light communication, Wi-Fi (registered trademark) communication, near field communication (such as Bluetooth (registered trademark)), and a radio frequency identifier (RFID). The communication unit 30 switches the communication methods in accordance with the communication party or the surrounding environments (the distance between the robot device 10 and the communication party or the presence or the absence of an obstacle between the robot device 10 and the communication party, for example). The frequency band used for communication may be a short waveband of 800 to 920 MHz, such as low power wide area (LPWA), or a long waveband of 2.4 GHz or 5 GHz (such as MuLTEfire). The communication unit 30 switches the frequency band in accordance with the communication party or the communication method in accordance with the surrounding environments.

A storage unit 32 is a storage device, such as a hard disk or a memory (solid-state drive (SSD), for example). In the storage unit 32, provided-function management information 34, non-provided-function management information 36, solution management information 38, device function management information 40, and collaborative function management information 42 are stored. Various items of data and various programs are also stored. Device address information indicating the addresses of other devices may also be stored in the storage unit 32. The above-described items of information may be stored in the same storage device or in different storage devices.

The provided-function management information 34 is information indicating functions provided in the robot device 10. The provided-function management information 34 also indicates the association between the individual functions provided in the robot device 10 and individual operations (including processing and manipulation) executable by using these functions. Referring to the provided-function management information 34 makes it possible to specify (identify) operations executable by the robot device 10. Functions that are not indicated in the provided-function management information 34 are those that are not provided in the robot device 10. Referring to the provided-function management information 34 may thus make it possible to specify (identify) operations that are not executable by the robot device 10.

The non-provided-function management information 36 is information indicating functions that are not provided in the robot device 10. The non-provided-function management information 36 also associates the individual functions that are not provided in the robot device 10 and individual operations (including processing and manipulation) that are not executable by the robot device 10 by not having these functions. Referring to the non-provided-function management information 36 makes it possible to specify (identify) operations that are not executable by the robot device 10. Functions that are not indicated in the non-provided-function management information 36 may be those that are provided in the robot device 10. Referring to the non-provided-function management information 36 may thus make it possible to specify (identify) operations that are executable by the robot device 10.

Both of the provided-function management information 34 and the non-provided-function management information 36 may be stored in the storage unit 32 so that operations that are executable or those that are not executable by the robot device 10 can be specified based on the provided-function management information 34 and the non-provided-function management information 36. Alternatively, one of the provided-function management information 34 and the non-provided-function management information 36 may be stored in the storage unit 32 so that operations that are executable or those that are not executable by the robot device 10 can be specified based on the provided-function management information 34 or the non-provided-function management information 36 stored in the storage unit 32.

The solution management information 38 is information indicating solutions for solving problems (how to solve a problem and how to act to solve the problem). The solution management information 38 also indicates the association between individual problems which are likely to occur and solutions for solving these problems.

The device function management information 40 is information for managing the functions of devices other than the robot device 10. The device function management information 40 indicates the association between device identification information for identifying devices and function information indicating the functions provided in the devices. Examples of the device identification information are a device ID, a device name, a device type, a model number of a device, a position at which a device is installed (device position information), and an image representing the external appearance of a device. Examples of the function information are a function ID and a function name. If an image forming device, which is a device other than the robot device 10, has a scan function, a copy function, and a scan transfer function, function information indicating the scan function, function information indicating the copy function, and function information indicating the scan transfer function are associated with the device identification information for identifying the image forming device. Referring to the device function management information 40 makes it possible to specify (identify) the functions of individual devices.

Examples of devices managed by the device function management information 40 are those included in the device system, such as the device 12. Devices which are not included in the device system may also be managed by the device function management information 40. The robot device 10 may obtain information (including device identification information and function information) concerning a new device which is not included in the device system and register the obtained information in the device function management information 40. Information concerning a new device may be obtained by using the Internet, for example, or as a result of an administrator, for example, inputting such information. The robot device 10 may update the device function management information 40 regularly or at a certain timing or a timing specified by the administrator, for example. Because of this updating operation, function information concerning a new function which has not been provided in a device before the updating operation may be registered in the device function management information 40 after the updating operation. In contrast, function information concerning a function which has been provided in a device before the updating operation may be deleted from the device function management information 40 or may be registered as information indicating that this function is disabled. Updating information may be obtained by using the Internet, for example, or as a result of the administrator, for example, inputting such information.

The collaborative function management information 42 is information for managing collaborative functions that are executable by combining plural functions. By combining plural functions, one or plural collaborative functions are executed. A collaborative function may be executed by combining plural functions of one device or by combining plural functions of plural devices. A device that provides an operation instruction (terminal device 14, for example) may be included in devices to be identified, and functions provided in such a device may be used as part of a collaborative function. Functions provided in the robot device 10 may also be used as part of a collaborative function.

A collaborative function may be a function that is executable without using a hardware device. For example, a collaborative function may be a function that is executable by combining plural software items. Alternatively, a collaborative function may be a function that is executable by combining a function of a hardware device and a function of software.

The collaborative function management information 42 indicates the association between a combination of items of function information concerning functions to be combined for a collaborative function and collaborative function information indicating this collaborative function. The collaborative function information indicates a collaborative function ID and a collaborative function name, for example.

When a function to be singly used is updated, the collaborative function management information 42 is also updated accordingly. Because of this updating operation, a collaborative function that is not executable by combining plural functions before the updating operation may become executable after the updating operation. In contrast, a collaborative function that is executable by combining plural functions before the updating operation may become inexecutable after the updating operation. Collaborative function information indicating a collaborative function that has become executable after the updating operation may be registered in the collaborative function management information 42. Collaborative function information indicating a collaborative function that has become inexecutable after the updating operation may be deleted from the collaborative function management information 42 or may be registered as information indicating that this collaborative function is disabled.

If plural devices are combined to execute a collaborative function, the collaborative function management information 42 is information for managing collaborative functions that are executable by combining plural functions of plural devices. The collaborative function management information 42 indicates the association between a combination of items of device identification information for identifying individual devices used for a collaborative function and collaborative function information indicating this collaborative function. When the device function management information 40 is updated, the collaborative function management information 42 is also updated accordingly. Because of this updating operation, a collaborative function that is not executable by combining plural functions of plural devices before the updating operation may become executable after the updating operation. In contrast, a collaborative function that is executable by combining plural functions of plural devices before the updating operation may become inexecutable after the updating operation.

A collaborative function may be a function executed by combining different functions or a function executed by combining the same functions of different devices. A collaborative function may be a function that is not executable unless different functions are combined or the same functions of different devices are combined. Such a collaborative function may be a function that is executable by combining different functions or a function that is executable by combining the same functions of different devices. For example, by combining a device (printer) having a print function and a device (scanner) having a scan function, a copy function is implemented as a collaborative function. That is, by combining a print function and a scan function, a copy function is implemented. In this case, a copy function as a collaborative function and a combination of a print function and a scan function are associated with each other. In the collaborative function management information 42, collaborative function information indicating a collaborative function, that is, a copy function, and a combination of device identification information for identifying a device having a print function and device identification information for identifying a device having a scan function are associated with each other.

In the storage unit 32, available function management information may be stored. The available function management information is information for managing functions available to an individual user, and indicates the association between user identification information for identifying a user and function information (may include collaborative function information) indicating functions available to this user. Functions available to a user may be those provided to the user free of charge and those purchased by the user. Such functions may be functions to be singly used or collaborative functions. The user identification information is user account information indicating a user ID and a user name, for example. Referring to the available function management information makes it possible to identify (specify) functions available to an individual user. The available function management information is updated every time a function is provided to a user (every time a function is provided to a user for a charge or free of charge, for example).

At least one of the provided-function management information 34, the non-provided-function management information 36, the solution management information 38, the device function management information 40, the collaborative function management information 42, and the available function management information may be stored in a device other than the robot device 10 (such as a server, which is not shown, the device 12, and the terminal 14). In this case, such information stored in another device may not necessarily be stored in the storage unit 32 of the robot device 10.

A situation information collector 44 has a function of collecting information concerning situations around the robot device 10 by using various sensors. Hereinafter, such information will be called "situation information". As the situation information collector 44, the above-described visual sensor, hearing sensor, touch sensor, taste sensor, and odor sensor may be used. The robot device 10 performs image recognition as a result of the visual sensor capturing images (such as video images and still images) around the robot device 10. The robot device 10 performs voice recognition as a result of the hearing sensor picking up sound (including voice) around the robot device 10. The temperature, humidity, and odor around the robot device 10 are detected by using other sensors. Sensors other than the above-described sensors may also be used to collect information concerning the situations around the robot device 10. The situation information collector 44 may collect situation information from devices and sensors other than the robot device 10.

A moving unit 46 has the function of moving the robot device 10 by using at least one of a component for land moving, a component for flying, and a component for moving under the water. The moving unit 46 is constituted by the leg part 20 shown in FIG. 2, for example.

An operating unit 48 has the functions of operating devices other than the robot device 10 and lifting and carrying objects. The operating unit 48 is constituted by the leg part 20, the arm parts 22, and the finger parts 24 shown in FIG. 2, for example.

A user interface (UI) 50 includes a display (display 28 shown in FIG. 2, for example) and an operation unit. The display is a display device, such as a liquid crystal display. The operation unit is an input device, such as a touch panel or a keyboard. The UI 50 may be a user interface serving as both of a display and an operation unit, such as a touch display and a device which displays a digital keyboard on a display. The robot device 10 may not necessarily include the UI 50, or may include only hardware keys, such as various buttons, without a display. Examples of buttons as hardware keys are buttons dedicated to the use of numeric input, such as a numeric keypad, and buttons dedicated to the use of indicating directions, such as direction indicator keys.

A speaker 52 has the function of outputting sound and voice. Voice for a solution, such as a message for requesting a human to solve a problem, is output from the speaker 52.

A controller 54 controls operations of the individual elements of the robot device 10. The controller 54 includes a detector 56, a solution specifying unit 58, a judging unit 60, a search unit 62, and an identifying unit 64.

The detector 56 has the function of finding a problem by detecting the situation around the robot device 10, based on the situation information collected by the situation information collector 44 (values of the various sensors, for example) and by determining whether a problem has occurred around the robot device 10. The detector 56 detects, as the situation, information concerning people around the robot device 10 and information concerning the surroundings other than people. Examples of information concerning people are images of people captured by the visual sensor (images of the faces, images of the entire bodies, and images showing the movements of people, for example) and the voice picked up by the hearing sensor. Examples of information concerning the surroundings other than people are temperature information obtained by a temperature sensor and humidity information obtained by a humidity sensor. More specifically, the detector 56 finds a problem by detecting the surrounding situation by using a combination of images captured by the visual sensor, sound and voice picked up by the hearing sensor, information concerning the sense of touch obtained by the touch sensor, information concerning the taste obtained by the taste sensor, and information concerning the odor obtained by the odor sensor. The detector 56 may use information collected by a sensor which is not included in the robot device 10. For example, the detector 56 may obtain information from a sensor installed outside the robot device 10, such as a sensor installed in the room and a sensor provided in another device, and may find a problem by using such information.

The detector 56 may determine that a problem has occurred when a value obtained by a sensor (the temperature obtained by a temperature sensor, for example) is equal to or exceed a threshold. The threshold may be changed in accordance with the age or the gender detected by various sensors provided in the robot device 10, thereby making it possible to find a problem according to the individuals. That is, people may feel differently about the problems according to the age or the gender, and varying of the threshold according to the age or the gender makes it possible to find problems according to the individuals.

The solution specifying unit 58 has the function of specifying (identifying) a solution for solving a problem detected by the detector 56 by referring to the solution management information 38.

If a problem detected from the detection results concerning people (images and voice of people, for example) (corresponding to a first detection result) and a problem detected from the detection results based on information concerning the surroundings other than people (corresponding to a second detection result) are different, the solution specifying unit 58 may select a solution based on the priority level determined for the first detection result or that for the second detection result. In this case, the solution specifying unit 58 selects a solution based on the first detection result so that a problem occurring to people can be solved preferentially over that in the surroundings.

The judging unit 60 has the function of judging whether the robot device 10 can solve a problem detected by the detector 56. Examples of problems that the robot device 60 is unable to solve are problems that are not solvable only by the functions of the robot device 10, problems that require a certain amount of time (preset time) to solve only by using the functions of the robot device 10, and problems that do not produce solving results of a satisfactory quality (preset quality) by using the functions of the robot device 10. If a set of functions provided in the robot device 10 covers the solution specified by the solution specifying unit 58, the judging unit 60 judges that it is possible to solve the problem only by the robot device 10.

That is, if the robot device 10 has all the functions required for executing the selected solution, the judging unit 60 judges that it is possible to solve the problem only by the robot device 10. In contrast, if a set of functions provided in the robot device 10 does not entirely cover the solution specified by the solution specifying unit 58, the judging unit 60 judges that it is not possible to solve the problem only by the robot device 10. That is, if the robot device 10 does not have any or some of the functions required for executing the selected solution, the judging unit 60 judges that it is not possible to solve the problem only by the robot device 10. To specify the functions provided in the robot device 10 (or functions that are not provided in the robot device 10), the judging unit 60 may refer to the provided-function management information 34.

Alternatively, to specify the functions that are not provided in the robot device 10 (or functions provided in the robot device 10), the judging unit 60 may refer to the non-provided-function management information 36.

If the judging unit 60 judges that it is possible to solve a problem only by the robot device 10, the robot device 10 executes the solution specified by the solution specifying unit 58 under the control of the controller 54. In contrast, if the judging unit 60 judges that it is not possible to solve a problem only by the robot device 10, the controller 54 performs control so that the solution can be executed by using an element other than the robot device 10 (another device or a human). The controller 54 may cause a device other than the robot device 10 to execute the solution, request a human to execute the solution, or cause the robot device 10 and another element (a human or another device, for example) to execute the solution together.

The search unit 62 has the function of searching for a solution which is used for solving a problem detected by the detector 56 and which is not registered in the solution management information 38. The search unit 62 searches for such a solution by using the Internet, for example.

The identifying unit 64 has the function of identifying (specifying) a device other than the robot device 10 and also identifying the functions provided in this device. The identifying unit 64 may identify a device, based on an image of the device (image of the external appearance of the device, for example) captured by the visual sensor, or based on device identification information indicated in the device obtained from an image captured by the visual sensor. The identifying unit 64 may alternatively obtain position information indicating the position at which the device is installed. The identifying unit 64 also identifies the functions of the identified device. To identify the functions, the identifying unit 64 refers to the device function management information 40 stored in the storage unit 32 and specifies function information indicating the functions associated with the device identification information concerning the identified device.

The identifying unit 64 may identify plural devices to be combined as collaborative devices. The identifying unit 64 may refer to the collaborative function management information 42 stored in the storage unit 32 and specify collaborative function information indicating a collaborative function associated with a combination of items of device identification information concerning these identified plural devices. This makes it possible to identify (specify) a collaborative function to be executed by combining the functions of the identified devices.

If the functions available to individual users are managed, the identifying unit 64 may receive user identification information for identifying a user. The identifying unit 64 may then refer to the available function management information stored in the storage unit 32 and specify function information indicating the functions available to the user indicated by the user identification information. This makes it possible to identify (specify) a set of functions available to this user. For example, user identification information is sent from the terminal device 14 to the robot device 10, and the identifying unit 64 specifies function information indicating the functions associated with the user identification information. More specifically, the identifying unit 64 receives device identification information and user identification information. The identifying unit 64 then refers to the device function management information 40 and specifies function information indicating the functions associated with the device identification information, and also refers to the available function management information and specifies function information indicating the functions associated with the user identification information. This makes it possible to specify the functions which are provided in the device specified by the device identification information and which are available to the user specified by the user identification information.

The controller 54 may execute function purchase processing and manage the purchase history. For example, if a charged function is purchased by a user, the controller 54 may perform billing processing for the user.

The controller 54 includes an intelligence unit, and controls the individual elements of the controller 54 by using AI of this intelligence unit.

At least one of the detector 56, the solution specifying unit 58, the judging unit 60, the search unit 62, and the identifying unit 64 may be stored in a device other than the robot device 10 (such as a server, which is not shown, the device 12, and the terminal 14). In this case, such an element stored in another device may not necessarily be included in the controller 54 of the robot device 10.

Figure 4:
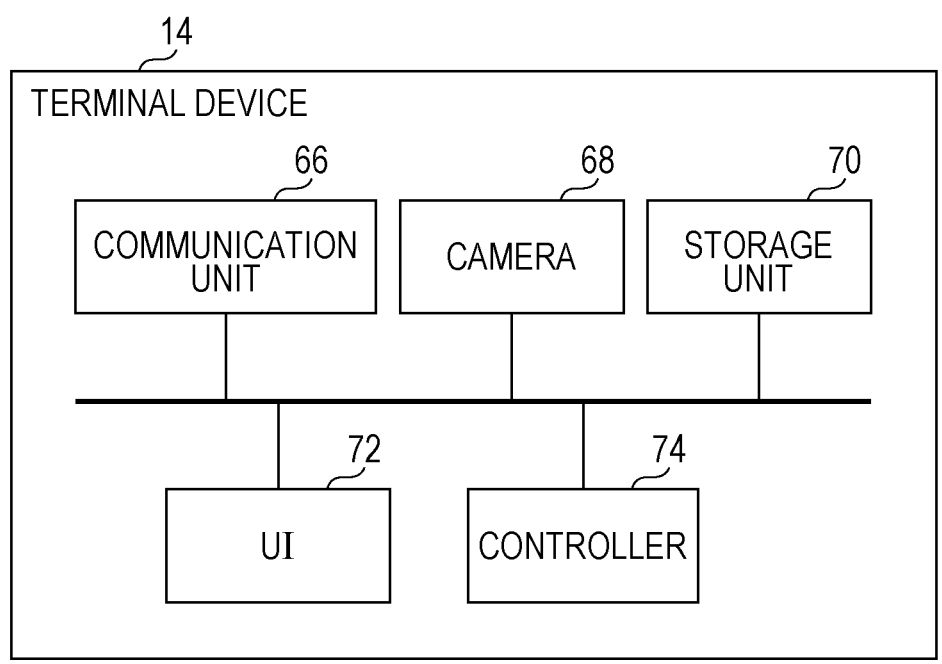
FIG. 4 is a block diagram of a terminal device.

The configuration of the terminal device 14 will be described below in detail with reference to the block diagram of FIG. 4.

A communication unit 66, which is a communication interface, has the functions of sending data to another device and receiving data from another device. The communication unit 66 may be a communication interface having a wireless communication function or a communication interface having a wired communication function.

A camera 68, which serves as an imaging unit, captures an image of an object so as to generate image data (still image data and video image data, for example). Not only the camera 68, but also an external camera connected to a communication path, such as a network, may be used. The communication unit 66 may receive image data indicating images captured by such an external camera, and a UI 72 may display the image data so that the user can process or use the image data. The terminal device 14 may not necessarily include the camera 68.

A storage unit 70 is a storage device, such as a hard disk or a memory (SSD, for example). In the storage unit 70, various programs and various items of data are stored. Address information concerning the address of the robot device 10 and the addresses of other devices (the device 12, for example), information concerning identified devices, information concerning identified devices to be combined as collaborative devices, information concerning the functions of identified devices, and information concerning collaborative functions may also be stored in the storage unit 70. The above-described items of information may be stored in the same storage device or in different storage devices.

The UI 72 includes a display and an operation unit. The display is a display device, such as a liquid crystal display. The operation unit is an input device, such as a touch panel, a keyboard, and a mouse. The UI 72 may be a user interface serving as both of a display and an operation unit, such as a touch display and a device which displays a digital keyboard on a display.

A controller 74 controls the operations of the individual elements of the terminal device 14. The controller 74, which serves as a display controller (control unit), for example, causes various items of information to be displayed on the display of the UI 72.

On the display of the UI 72, images captured by the robot device 10, images captured by the camera 68, images linked with identified devices to be used (devices to be used singly and devices to be combined), and images linked with functions are displayed. An image linked with a device may be an image representing this device captured by the robot device 10 (a still image or a video image, for example) or an image schematically representing this device (an icon, for example), or an image representing this device captured by the camera 68 (a still image or a video image, for example). Image data indicating a schematic image of a device may be stored in the robot device 10 and provided from the robot device 10 to the terminal device 14. Such image data may alternatively be stored in the terminal device 14 in advance or may be stored in another device and provided from such a device to the terminal device 14. An image linked with a function is an image representing this function, such as an icon.

Wireless communication technologies will be discussed below with reference to FIGS. 5 and 6. FIG. 5 illustrates the characteristics (advantages and disadvantages) of wireless communication technologies according to the frequency.

FIG. 6 illustrates the characteristics of wireless communication technologies according to the communication method.

As shown in FIG. 5, one of the major standards of wireless communication technologies using a frequency of 900 MHz is RFID. Some of the advantages of RFID are having high resistance to obstacles and having few interference frequency bands such as that of microwave ovens. Some of the disadvantages of RFID are a large-size antenna and a short coverage range.

Some of the major standards of wireless communication technologies using a frequency of 2.4 GHz are ZigBee (registered trademark) and Bluetooth. Some of the advantages of such a communication technology are high power saving, high speed, and a small-size antenna, while one of the disadvantages is having many interference frequency bands.

Some of the major standards of wireless communication technologies using a frequency of 5 GHz are IEEE802.11a and MuLTEfire. Some of the advantages of such a communication technology are having few interference frequency bands and high speed, while one of the disadvantages is having low resistance to obstacles.

As shown in FIG. 6, some of the advantages of infrared communication are high power saving and easy miniaturization of devices, while one of the disadvantages is that infrared light is invisible.

One of the advantages of visible light communication is easy tracking of a communication path, while one of the disadvantages is its strong directivity.

One of the advantages of near field communication (NFC) is easy pairing between multiple devices, while one of the disadvantages is that communication is limited to near distances.

When performing communication with a communication party by using a wireless communication technology, the communication unit 30 of the robot device 10 communicates with the communication party by using a wireless communication technology having characteristics suitable for the surrounding environments and the communication party. More particularly, the communication unit 30 communicates with a communication party by changing the wireless communication technology in accordance with the distance between the robot device 10 and the communication party, the presence or the absence of an obstacle therebetween, and the communication method supported by the communication party.

The functions of the robot device 10 will now be described below in detail with reference to FIGS. 7 and 8. FIG. 7 shows an example of a provided-function management table as the provided-function management information 34. FIG. 8 shows an example of a non-provided-function management table as the non-provided-function management information 36.

In the example of the provided-function management table shown in FIG. 7, the management number, information indicating a function provided in the robot device 10, and information indicating an operation (including processing and manipulation) executable by using this function are associated with each other. For example, the robot device 10 has a lifting function of lifting an object by using the arm parts 22, and is able to lift and carry an object up to 30 kg by using this lifting function. The robot device 10 also has a moving function, and is movable by changing the speed within 10 km per hour by using this moving function. Referring to the provided-function management table makes it possible to specify (identify) the functions provided in the robot device 10 and operations executable by using the functions. Functions and operations that are not registered in the provided-function management table may be functions that are not provided in the robot device 10 and operations that are not executable by the robot device 10. Referring to the provided-function management table can thus specify (identify) functions that are not provided in the robot device 10 and operations that are not executable by the robot device 10.

In the example of the non-provided-function management table shown in FIG. 8, the management number, information indicating a function that is not provided in the robot device 10, information indicating an operation (including processing and manipulation) that is not executable by the robot device 10 by not having this function are associated with each other. For example, the robot device 10 does not have a cooling function for the external environments (a function of cooling around the robot device 10), and is thus not capable of cooling the room. The robot device 10 does not have a print function and is thus not capable of printing the words of voice picked up by the robot device 10 or a document seen by the robot device 10. Referring to the non-provided-function management table makes it possible to specify (identify) the functions that are not provided in the robot device 10 and operations that are not executable by the robot device 10. Functions and operations that are not registered in the non-provided-function management table may be functions provided in the robot device 10 and operations executable by the robot device 10. Referring to the non-provided-function management table may thus specify (identify) functions provided in the robot device 10 and operations executable by the robot device 10.

In the storage unit 32, both of data indicating the provided-function management table and data indicating the non-provided-function management table may be stored, and operations that are executable by the robot device 10 or operations that are not executable by the robot device 10 may be specified based on these two items of data. Alternatively, one of the two items of data may be stored in the storage unit 32, and operations that are executable by the robot device 10 or operations that are not executable by the robot device 10 may be specified based on the stored item of data.

A specific example of the solution management information 38 will be discussed below with reference to FIG. 9. FIG. 9 shows an example of a solution management table as the solution management information 38. In the example of the solution management table shown in FIG. 9, the management number, information indicating a situation (problem), and information indicating a solution for solving this problem (situation) are associated with each other. The detector 56 detects a situation (problem). The solution specifying unit 58 refers to the solution management table and specifies a solution for solving the problem detected by the detector 56.

For example, if a situation (problem) (1) "the room temperature is equal to or higher than a temperature threshold (30° C., for example) is detected, a solution for solving this problem is to reduce the temperature in the room, and more specifically, solutions are "(1) cooling the room by the air conditioner" and "(2) opening the window". The room temperature is detected by a certain sensor (a temperature sensor, for example) provided in the robot device 10. The temperature threshold may be changed according to the age or the gender of people around the robot device 10. For example, the detector 56 of the robot device 10 detects people around the robot device 10 and also estimates the age and the gender of people, based on information (image and voice information, for example) obtained by various sensors (a visual sensor and a hearing sensor, for example). The temperature threshold used for older people (the age is equal to or higher than an age threshold) and that for younger people (the age is lower than the age threshold) may be different. For example, if older people are detected, a lower temperature threshold may be used than that for younger people. This makes it possible to execute a suitable solution according to the age. The temperature threshold may also be changed according to the gender. This makes it possible to execute a suitable solution according to the gender.

In another example, if a situation (problem) (3) "people in the room look cold" is detected, a solution for solving this problem is to raise the temperature in the room, and more specifically, solutions are "(1) turning on the heating" and "(2) closing the window". The detector 56 of the robot device 10 detects the situation (3) by observing the movement of people around the robot device 10 by using various sensors. More specifically, the detector 56 detects the situation (3) from the facial expressions, movements of the legs and the feet, voice, and sweat of people in the room, based on images showing the faces and the movements of people.

If multiple inconsistent situations are detected, the detector 56 may preferentially select one of the multiple situations, and the solution specifying unit 58 may specify solutions for solving the preferential situation. For example, if the situation (1) "the room temperature is 30° C. or higher" is detected and if the situation (3) "people in the room look cold" is also detected, the detector 56 preferentially selects the situation (3) over the situation (1), and the solution specifying unit 58 specifies solutions for solving the situation (3). The priority levels for preferentially selecting solutions are determined in advance.

For example, a situation detected based on information concerning people is preferentially selected over a situation detected based on information concerning the surroundings other than people. The situation (3) is a situation based on information concerning people (a situation detected by analyzing images or voice of people, for example), and the situation (1) is a situation based on information concerning the surroundings other than people. By preferentially selecting the situation (3) over the situation (1), solutions for a problem which may be occurring to people around the robot device 10 are preferentially selected, and thus, it is highly likely that this problem will be solved.

The device function management information 40 will be discussed below in detail with reference to FIG. 10. FIG. 10 shows an example of a device function management table as the device function management information 40. In the example of the device function management table shown in FIG. 10, the device ID, information indicating the device name (device type, for example), information indicating the functions of a device (function information), and the image ID are associated with each other. The device ID and the device name are examples of the device identification information. The image ID is an example of image identification information for identifying an image representing a device (an image showing the external appearance of the device or an image schematically representing the device (such as an icon), for example). The image ID may not necessarily be included in the device function management table. The device having a device ID "B", for example, is a multifunction device (image forming device including multiple image forming functions), and has a print function and a scan function, for example. The image ID for identifying an image representing this device is associated with the device. Image data indicating an image of a device is stored in the storage unit 32 of the robot device 10 or in another device.

By using various sensors of the robot device 10, the detector 56 detects the device ID for identifying a device around the robot device 10, and the identifying unit 64 refers to the device function management table and specifies the device name, functions, and image ID associated with the device ID. This makes it possible to identify devices around the robot device 10. Information indicating the device name and image data of an image of the device may be sent from the robot device 10 to the terminal device 14 and be displayed on the terminal device 14. An image representing a device is displayed as the image linked with this device. The image linked with a device may be an image captured by a camera or an image schematically representing the device (an icon, for example). If a user specifies the image linked with the device on the terminal device 14, information concerning the functions of this device (function information or description information concerning the functions) may be sent from the robot device 10 to the terminal device 14 and be displayed on the terminal device 14.

The collaborative function management information 42 will be described below in detail with reference to FIG. 11. FIG. 11 shows an example of a collaborative function management table as the collaborative function management information 42. In the example of the collaborative function management table shown in FIG. 11, a combination of device IDs, information indicating the names of devices to be combined (device types, for example), and information indicating collaborative functions (collaborative function information) are associated with each other. The device having a device ID "A", for example, is a PC, and the device having a device ID "B" is a multifunction device. By combining the PC (A) and the multifunction device (B), "scan transfer function" and "print function" are implemented as collaborative functions. "Scan transfer function" is the function of transferring image data generated by a scanning operation of the multifunction device (B) to the PC (A). "Print function" is the function of sending data (image data or document data, for example) stored in the PC (A) to the multifunction device (B) and printing the data in the multifunction device (B).

Figure 12:
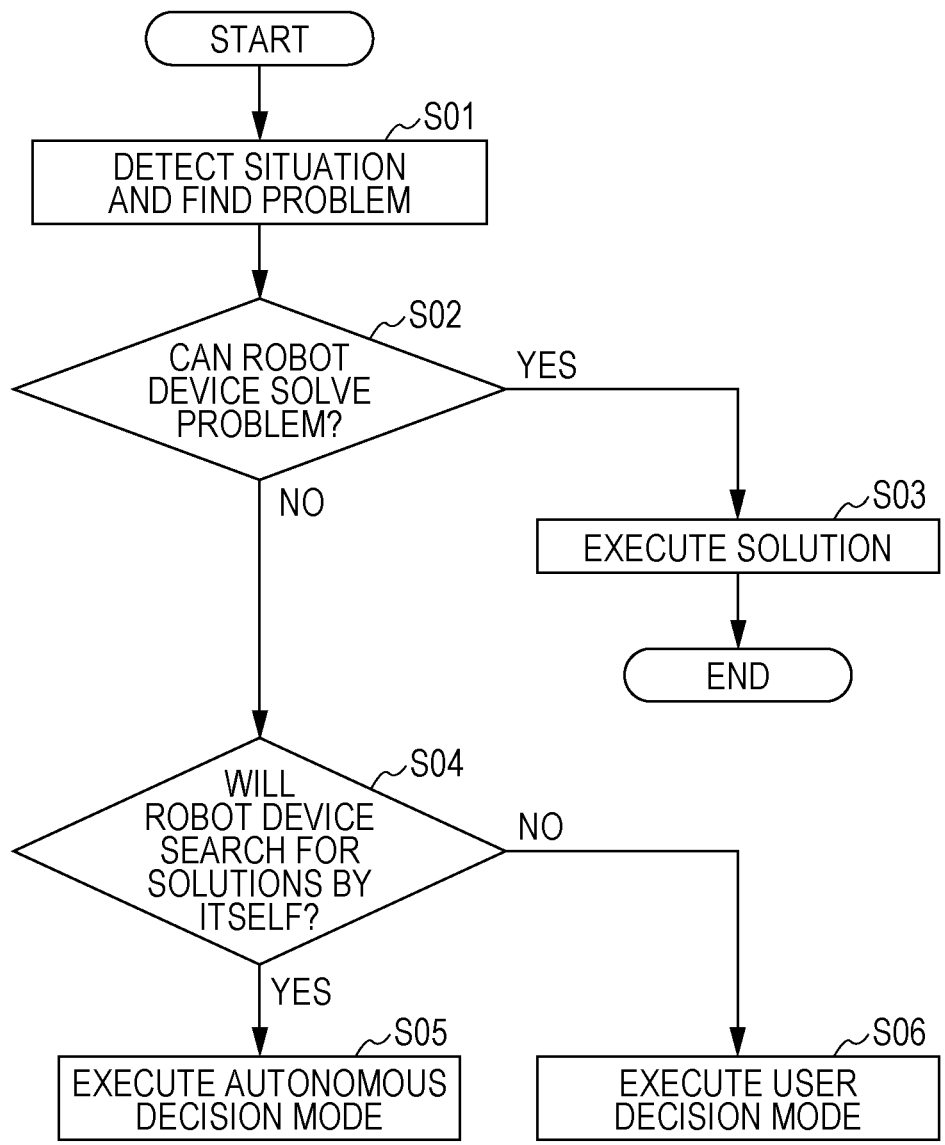
FIG. 12 is a flowchart illustrating an overview of situation checking processing.

An overview of situation checking processing will be described below with reference to the flowchart of FIG. 12.

In step S01, the situation information collector 44 collects situation information (the values of various sensors) concerning the surroundings around the robot device 10 by using various sensors. The detector 56 then detects the situation around the robot device 10 based on the situation information and finds a problem occurring in this situation.

In step S02, the judging unit 60 judges whether the robot device 10 can solve the problem detected by the detector 56. As described above, examples of problems that the robot device 10 are unable to solve are problems that are not solvable only by the functions of the robot device 10, problems that require a certain amount of time (preset time) to solve only by using the functions of the robot device 10, and problems that do not produce solving results of a satisfactory quality (preset quality) by using the functions of the robot device 10.

If the robot device 10 can solve the problem (YES in step S02), it executes a solution for solving the problem in step S03. This solution is specified by the solution specifying unit 58. In this case, the robot device 10 executes the specified solution by using the functions of the robot device 10 without using another device or receiving human assistance. The robot device 10 may cause the UI 50 of the robot device 10 or the UI 72 of the terminal device 14 to display information concerning the problem and information concerning the solution. The robot device 10 may execute the solution when receiving an execution instruction from a user.

If the robot device 10 is unable to solve the problem (NO in step S02), search processing for solutions is executed. It is determined in step S04 whether the robot device 10 will search for solutions by itself. If the result of step S04 is YES, the robot device executes an autonomous decision mode in step S05. If the robot device 10 will not search for solutions by itself (NO in step S04), the robot device 10 executes a user decision mode in step S06. It has been determined in advance whether the autonomous decision mode or the user decision mode will be executed. That is, if the robot device 10 is unable to solve the problem detected by the detector 56, it executes a predetermined one of the autonomous decision mode and the user decision mode. The mode to be executed may be specified by the user.

Figure 13:
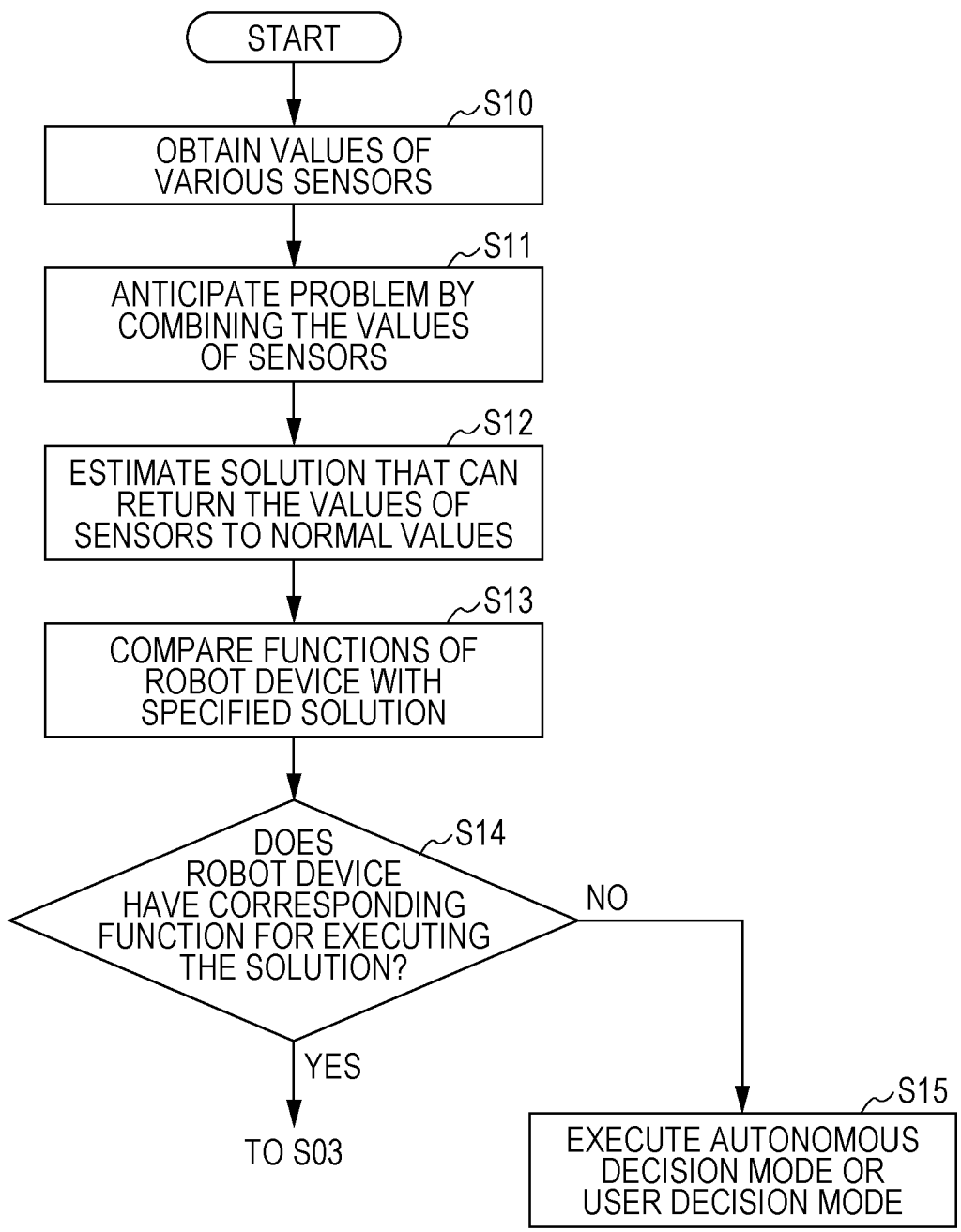
FIG. 13 is a flowchart illustrating details of the situation checking processing.

Details of the situation checking processing will be described below with reference to the flowchart of FIG. 13.

In step S10, the situation information collector 44 collects situation information (the values of various sensors) concerning the surroundings around the robot device 10 by using various sensors. In step S11, the detector 56 anticipates a problem that may occur by using a combination of the values of the sensors. The detector 56 anticipates a problem by using a combination of information obtained by analyzing the images of the surroundings around the robot device 10 and the values of the sensors. Voice picked up by a hearing sensor may also be used, and the detector 56 may anticipate a problem by using the results of analyzing voice, as well as the result of analyzing the images and the values of the sensors. For example, if the detected temperature is equal to or higher than the temperature threshold (30° C.), and if the captured image indicates that people around the robot device 10 are sweating, the detector 56 detects that the temperature needs decreasing by an air conditioner or an electric fan. If the detector 56 attempts to detect a surrounding situation by using only one sensor, it may fail to detect the situation correctly. However, the use of an image representing the surroundings of the robot device 10 together with the values of sensors makes it possible to detect more complicated situations with higher precision. The use of such an image also makes it possible to detect a situation from a personal point of view, as well as from a general point of view. On the other hand, however, a sensor is able to detect a situation that is not possible to detect by the sense of sight or the sense of smell.

Then, in step S12, the solution specifying unit 58 estimates a solution that can return the values of the sensors to the normal values. The solution specifying unit 58 refers to the solution management table shown in FIG. 9, for example, and specifies a solution for the problem detected by the detector 56. Information concerning the specified solution may be presented upon receiving an inquiry from a user, which will be discussed later, or as an instruction (control) request when the problem is solved by using a human or a device other than the robot device 10.

Then, the judging unit 60 judges whether the robot device 10 can solve the problem detected by the detector 56. To make this judgement, in step S13, the judging unit 60 compares the functions of the robot device 10 with the solution specified by the solution specifying unit 58.

It is then determined in step S14 whether a set of functions provided in the robot device 10 covers the solution specified by the solution specifying unit 58, that is, whether the robot device 10 has a function for executing the solution. If the result of step S14 is YES, the process proceeds to step S03 shown in FIG. 12. In this case, the robot device 10 executes the specified solution by using the corresponding function of the robot device 10 without using another device or receiving human assistance. The robot device 10 may execute the solution upon receiving an execution instruction from a user.

If a set of functions provided in the robot device 10 does not cover the solution specified by the solution specifying unit 58, that is, if the robot device 10 does not have a function for executing the solution (NO in step S14), the robot device 10 executes the autonomous decision mode or the user decision mode in step S15.

Figure 14:
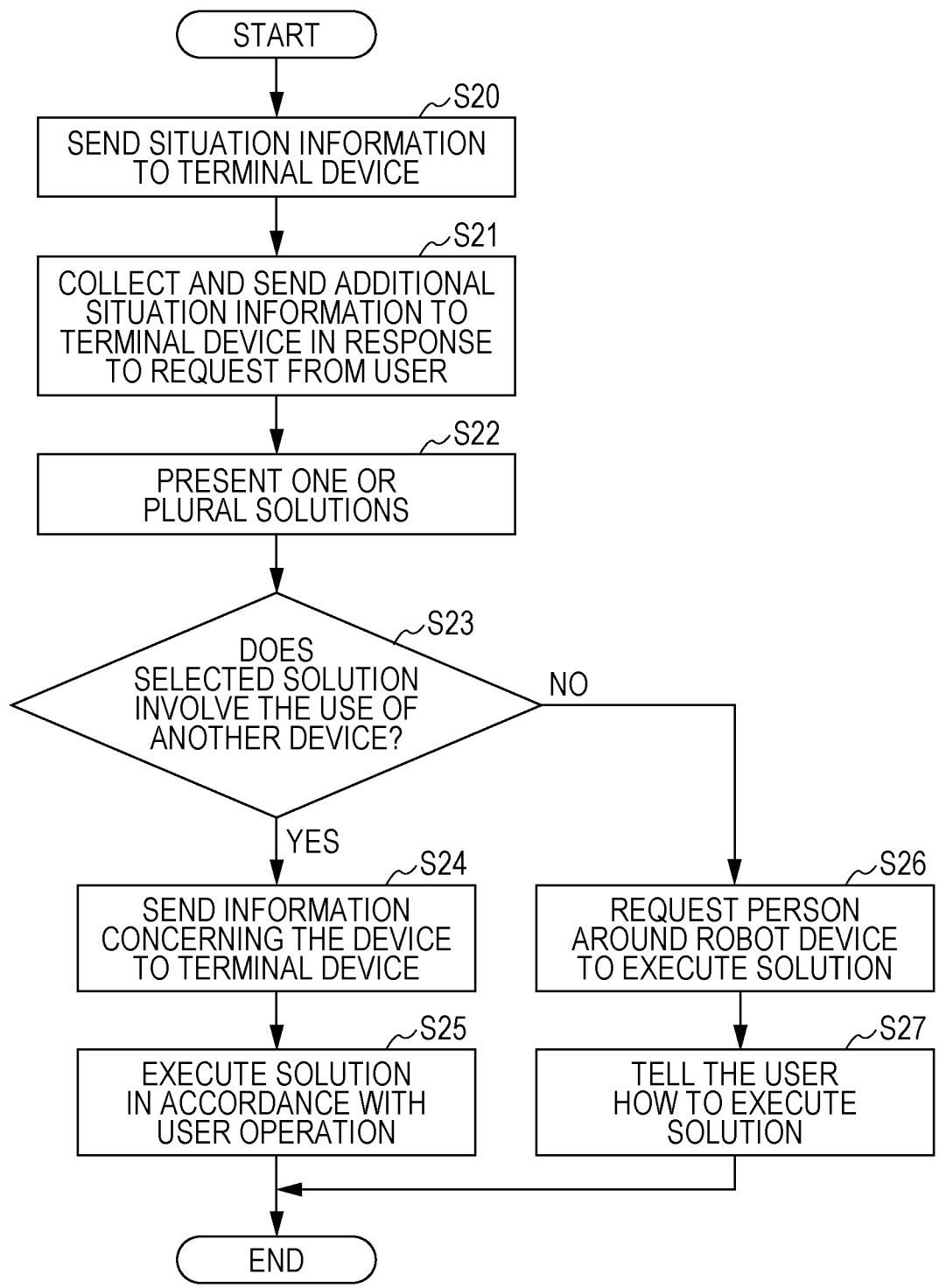
FIG. 14 is a flowchart illustrating processing executed in a user decision mode.

Processing executed in the user decision mode will be described below in detail with reference to the flowchart of FIG. 14.

In step S20, the communication unit 30 of the robot device 10 sends situation information (the values of various sensors) collected by the situation information collector 44 to the terminal device 14 under the control of the controller 54. In this case, the communication unit 30 may switch the communication method in accordance with the presence or the absence of obstacles or the distance between the robot device 10 and the terminal device 14. The communication unit 30 may send situation information to a terminal device 14 which has been registered as a destination, or to a terminal device 14 identified by the robot device 10, or to a terminal device 14 which has sent a request to communicate with the robot device 10. For example, the identifying unit 64 of the robot device 10 may obtain device identification information concerning a terminal device 14 from an image of the terminal device 14 captured by the visual sensor, and may identify the terminal device 14 based on the device identification information. In another example, the communication unit 30 may send situation information to a terminal device 14 located within a preset range from the position of the robot device 10 (for example, a terminal device 14 located within a range where the robot device 10 can perform near field communication. In another example, the identifying unit 64 may identify a user who seems to have a problem and send situation information to the terminal device 14 of this user.

In step S21, the robot device 10 may collect and send additional situation information to the terminal device 14 in response to a request from the user of the terminal device 14. For example, while moving, the robot device 10 captures additional images of the surroundings by using the visual sensor, such as a camera, and sends the resulting images (video images and still images) to the terminal device 14, or recollects data concerning the information (the temperature, for example) requested by the user and resends the data to the terminal device 14.

Then, in step S22, the robot device 10 presents one or plural solutions for solving the problem detected by the detector 56 (one or plural solutions specified by the solution specifying unit 58). For example, the communication unit 30 sends information indicating one or plural solutions to the terminal device 14 under the control of the controller 54. The information indicating one or plural solutions is displayed on the UI 72 of the terminal device 14. In another example, the controller 54 may cause information indicating one or plural solutions to be displayed on the UI 50 of the robot device 10.

When the user selects one of the solutions presented to the user, the controller 54 of the robot device 10 determines in step S23 whether the solution selected by the user is a solution to be executed by using a device (the device 12, for example) other than the robot device 10. For example, when the user selects one of the solutions by using the terminal device 14, and information indicating the selected solution is sent from the terminal device 14 to the robot device 10. The controller 54 then determines based on this information whether the solution selected by the user is a solution to be executed by using a device other than the robot device 10. If information indicating one or plural solutions is displayed on the UI 50 of the robot device 10 and the user has selected one of the solutions, the controller 54 determines whether the solution selected by the user will be executed by using another device.

If the solution selected by the user is a solution to be executed by using a device other than the robot device 10 (YES in step S23), the process proceeds to step S24. In step S24, the communication unit 30 sends information concerning a device that can execute the solution to the terminal device 14 under the control of the controller 54. For example, the controller 54 refers to the device function management table and the collaborative function management table, and specifies one or multiple devices having a function that can execute the solution selected by the user. If "printing" is selected as a solution, a multifunction device having a print function is specified as a device that can execute the solution. Examples of information concerning a device that can execute the solution are an image showing the external appearance of the device, address information indicating the address of the device for connecting to the device, and information concerning the specifications of the device. Alternatively, the controller 54 may cause information concerning the device to be displayed on the UI 50 of the robot device 10. In this case, the information may not necessarily be sent to the terminal device 14.

Then, in step S25, the solution is executed in accordance with user operation. That is, the function of the device for executing the solution is performed. As the function for executing the solution, a function included in a single device may be executed, or a collaborative function using functions of plural devices may be executed. As the function for executing the solution, a function included in the robot device 10 may be used. An instruction to execute the function may be provided from the robot device 10 or from the terminal device 14 to the device. Details of the operation for performing the function will be discussed later.

If the solution selected by the user is not a solution to be executed by using a device other than the robot device 10 (NO in step S23), the robot device 10 requests a person around the robot device 10 to execute the solution in step S26. Then, in step S27, the robot device 10 tells the user how to execute the solution (execution procedure). In this case, the controller 54 causes a speaker to output the procedure as voice or the UI 50 to display the procedure, or causes the robot device 10 to move to the person to touch him or her. If the procedure is presented to the person as voice from the speaker, the volume may be increased so that the person will understand the procedure better. The communication unit 30 may alternatively send information indicating the procedure to the terminal device 14, in which case, the information is displayed on the UI 72 of the terminal device 14.

If the controller 54 determines in step S23 that the solution selected by the user is a solution to be executed by using both of a device and a person, steps S24 through S27 are executed. A function of the robot device 10 may also be used as part of the solution.

Figure 15:
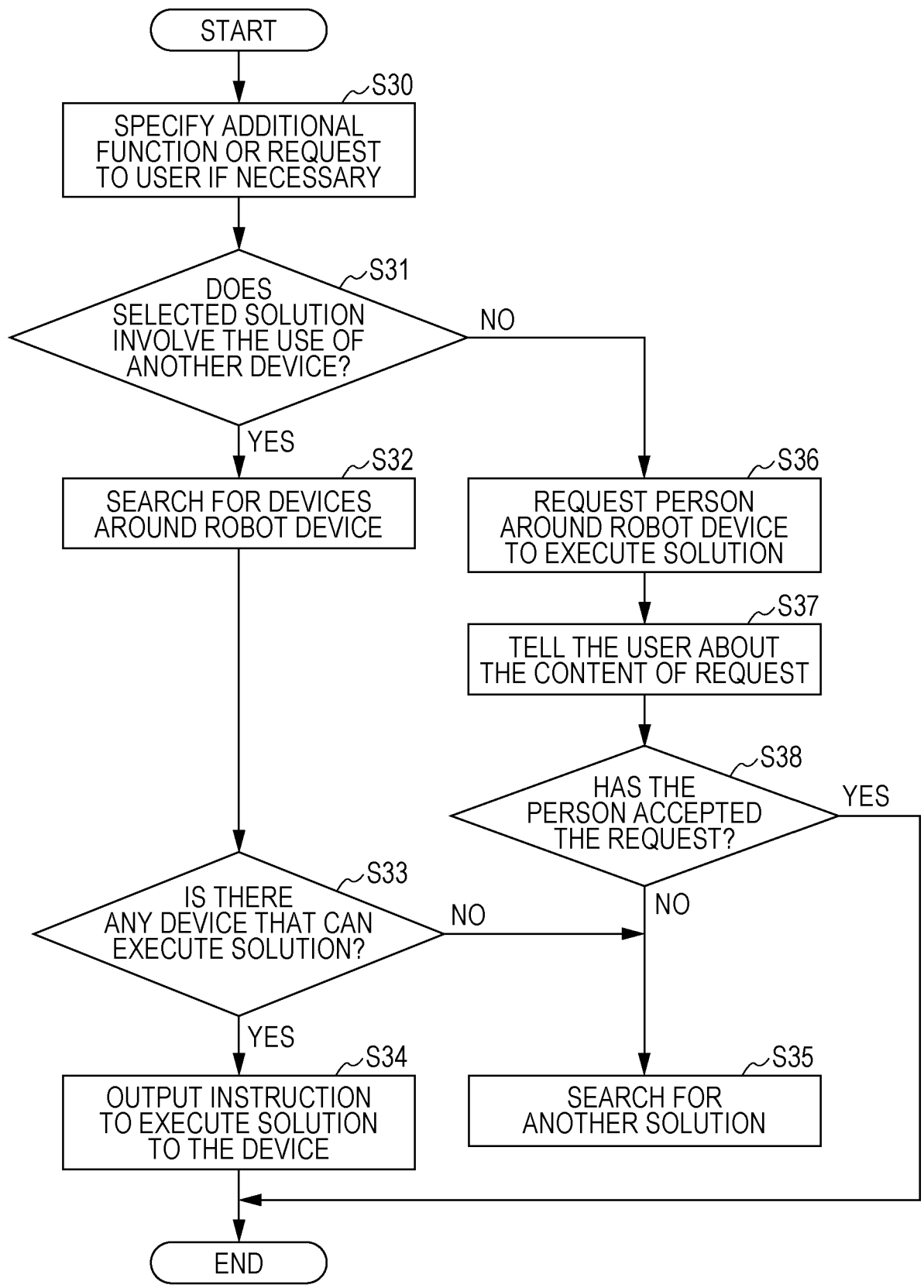
FIG. 15 is a flowchart illustrating processing executed in an autonomous decision mode.

Processing executed in the autonomous decision mode will be described below in detail with reference to the flowchart of FIG. 15.

In step S30, if necessary, the controller 54 of the robot device 10 specifies an additional function or a request to a user necessary for executing a solution specified by the solution specifying unit 58.

The controller 54 then determines in step S31 whether the solution specified by the solution specifying unit 58 is a solution to be executed by using a device other than the robot device 10 (the device 12, for example).

If the solution specified by the solution specifying unit 58 is a solution to be executed by using a device other than the robot device 10 (YES in step S31), the process proceeds to step S32. In step S32, the controller 54 searches for devices around the robot device 10 that can execute the solution. The controller 54 searches for such devices, based on images obtained by the visual sensor, position information concerning the positions of the devices, and the wireless communication status, for example. The controller 54 refers to the device function management table and the collaborative function management table, and specifies one or plural devices having a function that can execute the solution. If the solution is "printing", the controller 54 searches for a multifunction device having a print function.

The controller 54 determines in step S33 whether there is a device around the robot device 10 that can execute the solution. If there is such a device (YES in step S33), the process proceeds to step S34. In step S34, the communication unit 30 of the robot device 10 sends information indicating an instruction to execute the solution (an instruction to perform the function for executing the solution) to the searched device under the control of the controller 54. Upon receiving this information, the device executes the solution in response to the instruction.

The controller 54 may check whether it is possible to obtain a control right for the device that can execute the solution. That is, the controller 54 checks whether address information concerning the device or a driver for controlling the device is stored in the robot device 10. If such a driver can be obtained by using a network, the controller 54 downloads the driver. The robot device 10 may provide an instruction to execute the solution to the device by directly operating the operation panel of the device or by operating a remote controller of the device.

A determination as to whether the solution has successfully been executed can be made according to whether the problem has been solved after the device performed the function. If the detector 56 does not find the problem any longer, the controller 54 determines that the problem has been solved. If the problem has not been solved, the controller 54 resends an instruction to execute the solution to the device, or searches for another solution.

If there is no device around the robot device 10 that can execute the solution (NO in step S33), the controller 54 searches for another solution in step S35. In this case, the controller 54 may switch the autonomous decision mode to the user decision mode.

If the solution specified by the solution specifying unit 58 is not a solution to be executed by using a device other than the robot device 10 (NO in step S31), the robot device 10 requests a person around the robot device 10 to execute the solution in step S36. In step S37, the robot device 10 tells the user about the content of the request (procedure to execute the solution, for example). For example, the controller 54 causes the speaker to output the content of the request as voice or the UI 50 to display the content of the request, or causes the robot device 10 to move to the person to touch him or her. The communication unit 30 may alternatively send information indicating the content of the request to the terminal device 14. In this case, the information is displayed on the UI 72 of the terminal device 14.

The controller 54 then determines in step S38 whether the person has accepted the request. If the person has accepted the request (YES in step S38), the controller 54 finishes the processing. The user then executes the solution. If it is found that the person has not accepted the request (NO in step S38), the controller 54 searches for another solution in step S35. The controller 54 may switch the autonomous mode to the user decision mode. The controller 54 may make the above-described determination by voice recognition. If the controller 54 acknowledges a reply from the person accepting the request by voice recognition, it determines that the person has accepted the request. In another example, if the operation that is likely to be performed by the user for executing the solution is performed within a preset time and if this operation is recognized by a certain sensor (visual sensor, for example), the controller 54 may determine that the person has accepted the request.

The situation around the robot device 10 may change over time, and the problem which may occur is also likely to change accordingly. The robot device 10 thus detects the situation (problem) almost in real time and specifies the solution based on the detection results.

The problems that can be solved by the robot device 10 are also changed in accordance with the updating of the functions of the robot device 10. The functions of the robot device 10 are updated by changing at least one of hardware and software of the robot device 10.

The solution specifying unit 58 may preferentially specify a solution to be executed by using a device (a solution which does not require human assistance) over a solution to be executed by a person. A solution to be executed by a person is not always executed (may be rejected). By preferentially specifying a solution which does not require human assistance, the solution is more likely to be executed. If nobody around the robot device 10 is detected, the solution specifying unit 58 may specify solutions which do not require human assistance without searching for solutions requiring human assistance. This can reduce the load for searching for solutions.

Figure 16:
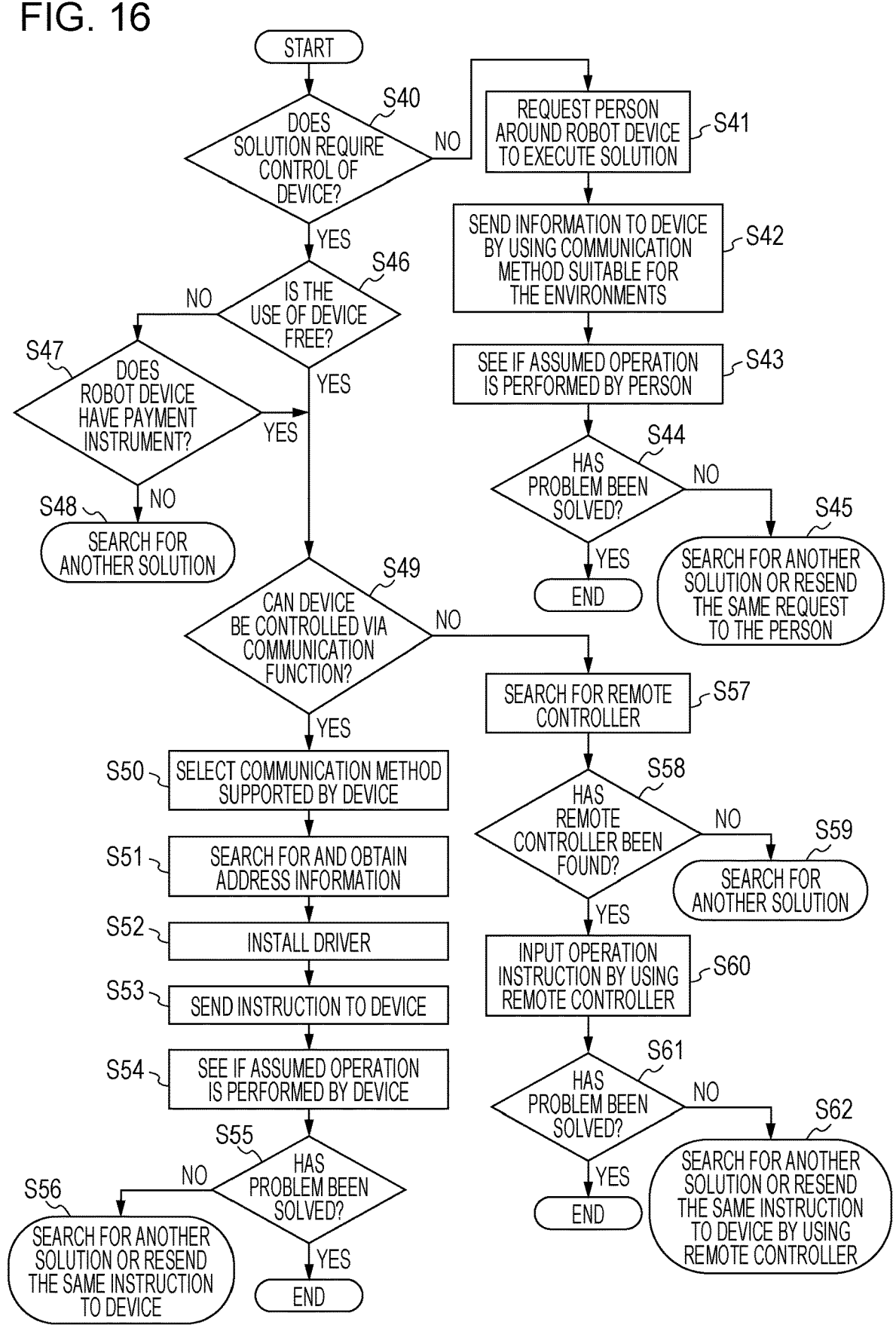
FIG. 16 is a flowchart illustrating control processing for executing a solution.

Control processing for executing a solution will be described below in detail with reference to the flowchart of FIG. 16. It is assumed that the robot device 10 is unable to solve a problem by itself.

In step S40, the controller 54 of the robot device 10 determines whether a solution selected by the user in the user decision mode or a solution specified by the robot device 10 in the autonomous decision mode requires control of a device. That is, the controller 54 determines whether the solution is a solution to be executed by using a device. In other words, the controller 54 determines whether the solution is implemented only by a person without using a device.

If the solution does not require control of a device (NO in step S40), that is, if the solution is implemented only by a person without using a device, the process proceeds to step S41. In step S41, the robot device 10 requests a person around the robot device 10 to execute the solution. For example, the communication unit 30 sends information indicating the content of a request (procedure taken to execute the solution, for example) to the terminal device 14. This information is displayed on the UI 72 of the terminal device 14. In step S42, the communication unit 30 sends this information to the terminal device 14 by using a communication method suitable for the surrounding environments. Examples of the surrounding environments are the distance between the robot device 10 and the terminal device 14 and the presence or the absence of obstacles therebetween. The controller 54 may alternatively cause the speaker to output the content of the request as voice or the UI 50 to display the content of the request, or cause the robot device 10 to move to the person to touch him or her. In step S43, the controller 54 sees if the operation that is likely to be performed for executing the solution is performed by the user within a preset time. The controller 54 then determines in step S44 whether the problem has been solved based on whether this operation has been performed. If this operation has been performed within the preset time and if a certain sensor (the visual sensor, for example) has detected this operation, the controller 54 determines that the problem has been solved (YES in step S44). The controller 54 then finishes the processing. If this operation has not been performed within the preset time nor has a certain sensor (the visual sensor, for example) detected this operation, the controller 54 determines that the problem has not been solved (NO in step S44). In this case, the robot device 10 may search for another solution or resend the same request to the user in step S45.

If the solution requires control of a device (YES in step S40), that is, if the solution is a solution to be executed by using a device, the controller 54 determines in step S46 whether the use of the device for executing the solution is free. More specifically, the controller 54 searches for (identifies) a device around the robot device 10 and determines whether the use of this device is free. Information concerning whether the use of a device is charged or free is managed for each device. This information may be managed by the device function management table. The controller 54 may alternatively obtain from an identified device information indicating whether the use of this device is charged or free.

If the use of the device is not free (NO in step S46), that is, if the use of the device is charged, the controller 54 determines in step S47 whether the robot device 10 possesses a payment instrument for paying for the device. Examples of the payment instruments are electronic money (digital currency), virtual money, cash, and credit cards. Payment may be made by using an instrument other than these examples. If the robot device 10 does not possess the payment instrument for paying for the device (NO in step S47), the controller 54 searches for another solution in step S48. If the robot device 10 possesses the payment instruction for paying for the device (YES in step S47), the process proceeds to step S49. The controller 54 controls the payment operation of the robot device 10. That is, the robot device 10 makes payment when using the device. If the robot device 10 does not possess the payment instrument for paying for the device, it may receive payment support from at least one of people and devices other than the robot device 10 (borrow or receive money from someone or a device).

The controller 54 then determines in step S49 whether the device for executing the solution can be controlled via a communication function. Information indicating whether a device can be controlled via a communication function is managed for each device. This information may be managed by the device function management table.

If the device can be controlled via a communication function (YES in step S49), the controller 54 selects a communication method that can be employed for communication with this device (communication method supported by this device) in step S50. The communication method supported by a device is managed for each device. The communication method supported by each device may be managed by the device function management table. If communication errors occur when performing communication by using the communication method supported by the device, the process may proceed to step S57. If the device supports plural communication methods, the robot device 10 may attempt to communicate with the device by using each of the plural communication methods. In this case, the robot device 10 may select the device by using the optimal communication method (the communication method having the highest speed or producing the least noise).

In step S51, the controller 54 obtains address information concerning the device and an access password. The controller 54 may obtain address information from another device, such as a server, storing address information or via the Internet. Address information may alternatively be stored in the robot device 10. In step S52, if a driver for controlling the device is required, the controller 54 obtains the driver and installs it in the robot device 10. The controller 54 may obtain the driver from a device, such as a server, storing drivers or via the Internet.

Then, in step S53, the communication unit 30 sends information indicating an instruction to execute the solution (an instruction to perform the function for executing the solution) to the device. Upon receiving this information, the device executes the solution in accordance with the instruction.

In step S54, the controller 54 sees if the device is solving the problem. The controller 54 then determines in step S55 whether the problem has been solved. If the operation that is likely to be performed for executing the solution is performed by the device within a preset time and if a certain sensor (the visual sensor, for example) has detected this operation, the controller 54 determines that the problem has been solved (YES in step S55). The controller 54 then finishes the processing. If this operation has not been performed within the preset time nor has a certain sensor (the visual sensor, for example) detected this operation, the controller 54 determines that the problem has not been solved (NO in step S55). In this case, the robot device 10 may search for another solution or resend the same instruction to the device in step S56. The controller 54 may determine whether it is possible to execute another solution. For example, if the room temperature is high and if, a device other than an air conditioner, such as an electric fan, is installed in the room, the controller 54 may search for another solution using the electric fan. The search unit 62 may search for another solution by using the Internet.

If it is not possible to control the device for executing the solution via a communication function (NO in step S49), the robot device 10 searches for a remote controller for operating the device in step S57. The robot device 10 may identify the remote controller by analyzing an image captured by the visual sensor, for example.

The robot device 10 then determines in step S58 whether a remote controller has been found. If the robot device 10 fails to find a remote controller (NO in step S58), it searches for another solution in step S59.

If a remote controller is found (YES in step S58), the robot device 10 operates the remote controller to input an instruction for executing the solution in step S60. Upon receiving this instruction, the device executes the solution in accordance with the instruction.

The controller 54 sees if the device is solving the problem, and determines in step S61 whether the problem has been solved. If the operation that is likely to be performed for executing the solution is performed by the device within a preset time and if a certain sensor (the visual sensor, for example) has detected this operation, the controller 54 determines that the problem has been solved (YES in step S61). The controller 54 then finishes the processing. If this operation has not been performed within the preset time nor has a certain sensor (the visual sensor, for example) detected this operation, the controller 54 determines that the problem has not been solved (NO in step S61). In this case, the robot device 10 may search for another solution or resend the same execution instruction to the device by using the remote controller in step S62.

Scenes to which the robot device 10 of this exemplary embodiment is applied (application scene) will be discussed below in detail.

(Application Scene 1)

Figure 17:
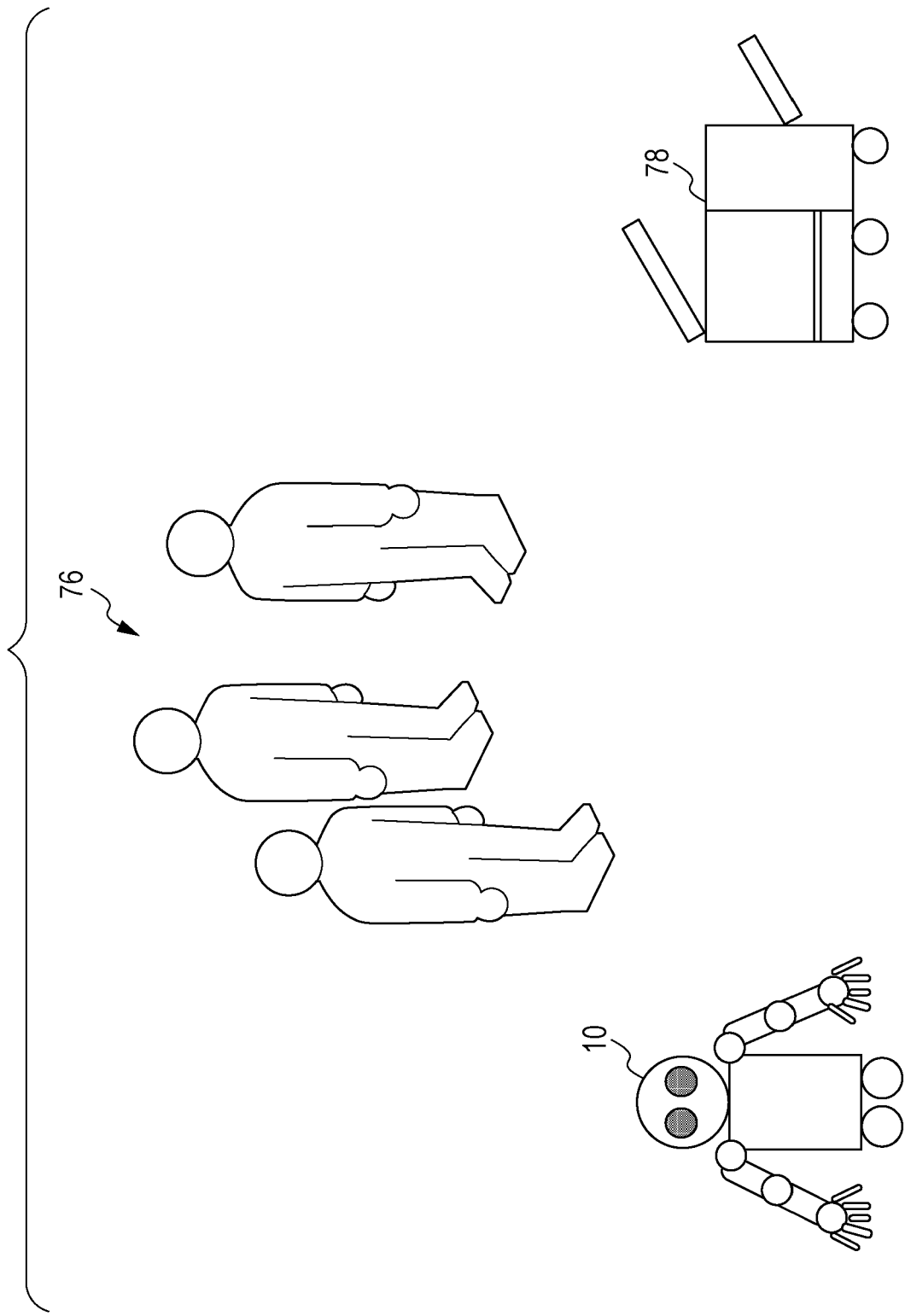
FIG. 17 is a view for explaining an application scene 1.

Application scene 1 will be discussed below with reference to FIG. 17. In FIG. 17, staff members 76 and the robot device 10 are shown. The staff members 76 (three members) are holding a meeting, for example, and the robot device 10 is with the staff members 76.

The situation information collector 44 of the robot device 10 collects situation information concerning the surroundings of the robot device 10 by using various sensors. More specifically, the situation information collector 44 collects the content of the conversation among the staff members 76 as voice, images (images of the faces and the entire bodies of the staff members 76), the temperature, and the humidity as situation information. The detector 56 of the robot device 10 detects the surrounding situation based on the situation information (the state of the staff members 76 (such as the content of the conversation, expressions, and attitudes) and the temperature). If a staff member 76 says "I want to have the content of our conversation written on paper", the situation information collector 44 collects voice information concerning this conversation as situation information. The detector 56 then determines based on the conversation whether any problem (issue) is occurring in this situation. In this example, the detector 56 detects a problem (issue) "a staff member 76 wants to have the content of their conversation printed on paper".

The solution specifying unit 58 refers to the solution management information 38 and specifies a solution for solving this problem. This problem can be solved by a combination of "a function of collecting the content of conversation as voice information and converting it into a character string" and "a print function", for example. That is, the solution for this problem is constituted by a combination of "a function of collecting the content of conversation as voice information and converting it into a character string" and "a print function".

It is now assumed that the robot device 10 has "a function of collecting the content of conversation as voice information and converting it into a character string", but does not have "a print function". That is, this problem is not possible to solve only by the robot device 10. To address such a situation, the robot device 10 searches for a device having a print function. The robot device 10 captures an image of a device around the robot device 10 by using a visual sensor (camera), and the identifying unit 64 identifies this device by analyzing the image. For example, a multifunction device 78 having a print function is installed near the robot device 10. The identifying unit 64 identifies the multifunction device 78 and also identifies the function (print function, for example) of the multifunction device 78. In this case, the solution is executed by using the robot device 10 and the multifunction device 78. This solution is a solution implemented by a collaborative function using the robot device 10 and the multifunction device 78, that is, a solution implemented by combining the robot device 10 and the multifunction device 78 as collaborative devices. The robot device 10 may execute the solution automatically or in response to an instruction from a user. When executing the solution, the robot device 10 communicates with the multifunction device 78, sends information indicating the content of conversation among the staff members 76 to the multifunction device 78, and provides an instruction to print the information to the multifunction device 78. As a result, the content of conversation among the staff members 76 is printed on paper.

The robot device 10 may move to the multifunction device 78, fetch paper on which the content of conversation is printed, and hand it to a staff member 76. The robot device 10 may output voice to inform the staff members 76 that the solution has been executed.

In the example in FIG. 17, the robot device 10 is used as one of the devices to execute the solution. However, the robot device 10 may not necessarily be used, and instead, the solution may be executed by using a device other than the robot device 10. In this case, the robot device 10 provides an instruction to execute the solution to another device.

The robot device 10 may directly operate the multifunction device 78. For example, if a problem (issue) "I want to have a document copied" is detected by the detector 58, the solution specifying unit 58 specifies "a copy function" as the solution. In this case, the robot device 10 searches for a device having a copy function (such as the multifunction device 78), and causes the multifunction device 78 to make a copy of the document. The robot device 10 receives the document from a staff member 76, sets it in the multifunction device 78, and directly operates the operation panel of the multifunction device 78, thereby providing a copy instruction to the multifunction device 78. The robot device 10 identifies the operation panel by analyzing an image captured by the visual sensor, for example, and then provides a copy instruction.

As described above, it is possible to solve a problem that is not possible to solve only by the robot device 10 by using another device. This enables the robot device 10 to solve more problems by working with another device according to the situation.

(Application Scene 2)

Figure 18:
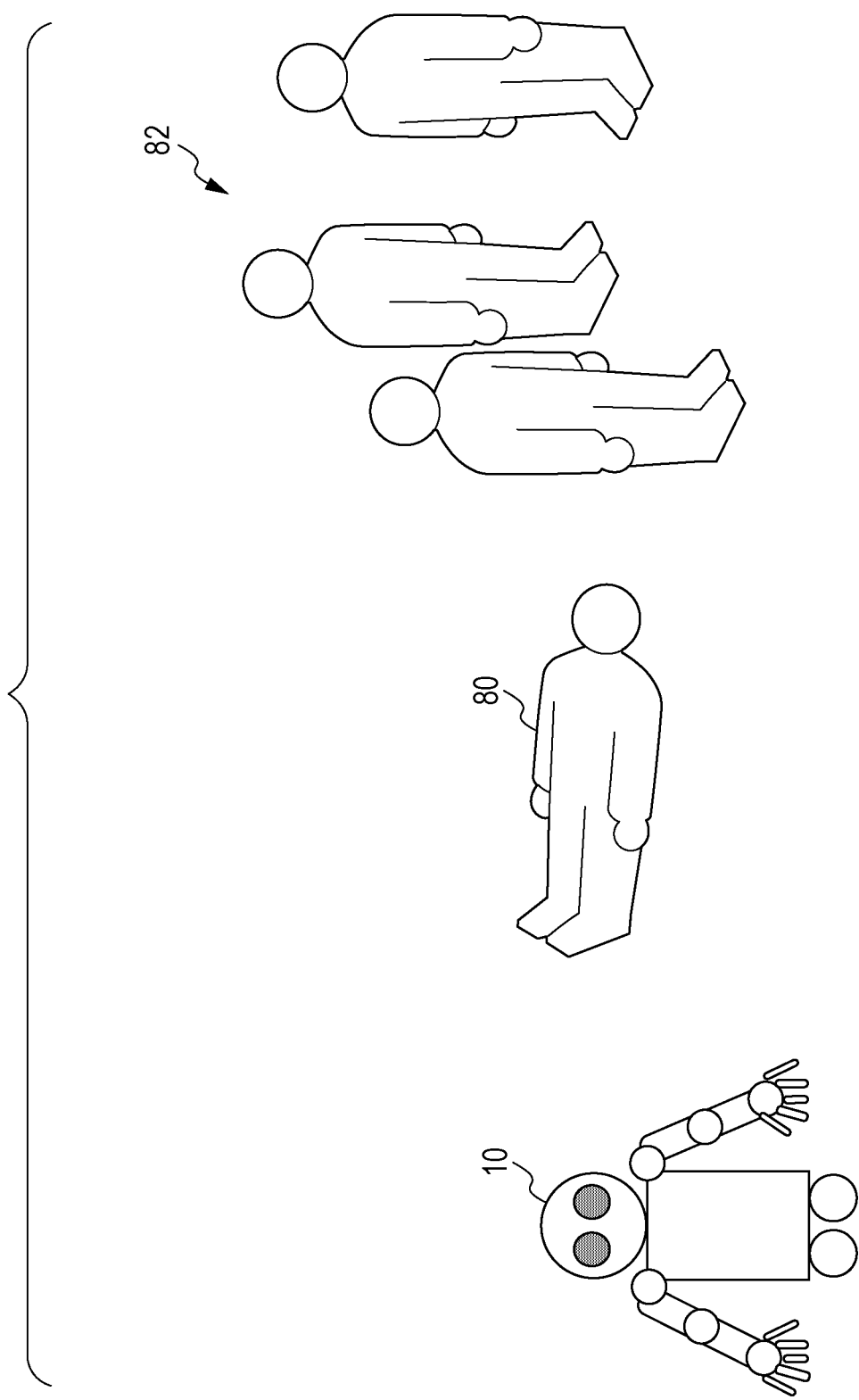
FIG. 18 is a view for explaining an application scene 2.

Application scene 2 will be discussed below with reference to FIG. 18. In FIG. 18, three persons 82 and the robot device 10 are shown. A person 80 is lying down. The situation information collector 44 of the robot device 10 collects an image of the person 80 lying down as situation information, and the detector 56 determines based on this image whether a problem is occurring. In the example in FIG. 18, a problem "someone is lying down" is detected.

The solution specifying unit 58 refers to the solution management information 38 and specifies a solution for solving this problem. This problem can be solved by "asking someone for help to rescue the person lying down". That is, an example of the solution for this problem is "asking someone for help". In this case, the robot device 10 asks a person 82 other than the person 80 lying down for help. To do so, the robot device 10 may output sound or move to the person 82 to touch him or her. The controller 54 may display information concerning the rescue procedure on the UI 50 of the robot device 10 or the UI 72 of the terminal device 14 of the person 82. The robot device 10 may identify the terminal device 14 by using a certain sensor and send information concerning the rescue procedure to the terminal device 14.

The solution specifying unit 58 specifies a solution "carrying the person lying down to a safe place", for example. If the robot device 10 has the function of carrying objects, it may carry the person 80 only by itself or together with another person 82 or another device, or with another device and another person 82. The robot device 10 identifies a device which may carry the person 80. If the robot device 10 does not have the function of carrying objects, it may instruct a person 82 to carry the person 80 lying down to a safe place. Information indicating this instruction may be displayed on the UI 50 of the robot device 10, or may be sent to the terminal device 14 of the person 82 and displayed on the UI 72 of the terminal device 14.

As described above, it is possible to solve a problem that is not possible to solve only by using the robot device 10 by asking someone for help.

(Application Scene 3)

Figure 19:
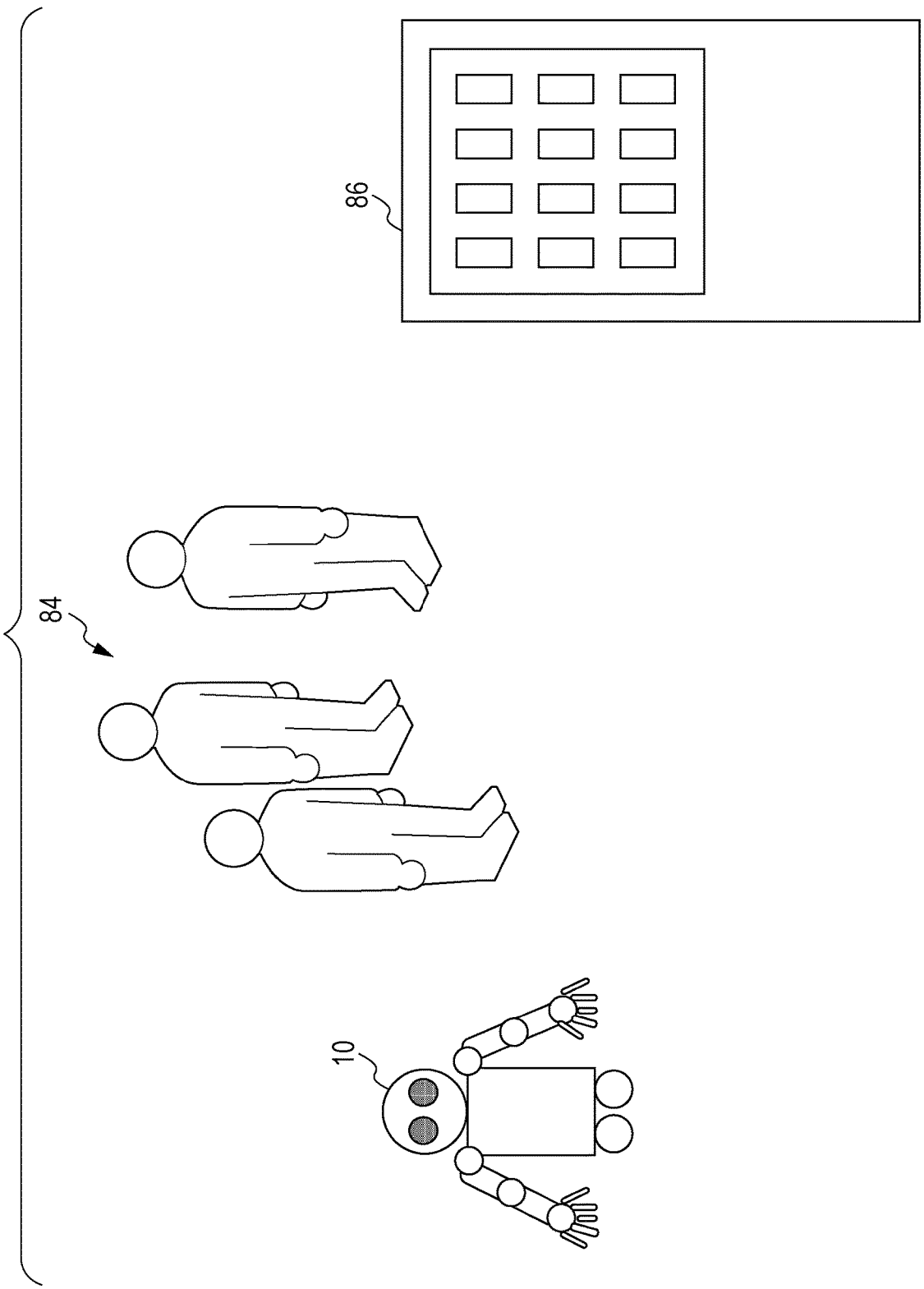
FIG. 19 is a view for explaining an application scene 3.

Application scene 3 will be discussed below with reference to FIG. 19. In FIG. 19, three users 84 and the robot device 10 are shown. If a user 84 says "I'm thirsty", the situation information collector 44 of the robot device 10 collects voice information concerning this remark as situation information, and the detector 56 determines based on this remark whether a problem is occurring. In this example, a problem "being thirsty" is detected.

The solution specifying unit 58 refers to the solution management information 38 and specifies a solution for solving the problem. This problem can be solved by "buying a drink", for example. That is, the solution for this problem is constituted by "a function of providing a drink".

It is assumed that the robot device 10 does not have "a function of providing a drink". That is, this problem is not possible to solve only by the robot device 10. To address such a situation, the robot device 10 searches for a device for providing a drink. The robot device 10 captures an image of a device around the robot device 10 by using a visual sensor (camera), and the identifying unit 64 identifies this device by analyzing the image. For example, a vending machine 86 (an example of the device) for bottled water is installed near the robot device 10. The identifying unit 64 identifies the vending machine 86 and identifies the function (the function of providing a drink for a charge, for example) of the vending machine 86. The identifying unit 64 may identify the payment instrument (such as electronic money or cash) for the vending machine 86, based on the image captured by the visual sensor, or may communicate with the vending machine 86 to identify the payment instrument. The controller 54 determines whether the robot device 10 has this payment instrument.

If the robot device 10 has the payment instrument (such as electronic money, cash, or a credit card) employed by the vending machine 86, the controller 54 performs the payment operation of the robot device 10. The robot device 10 then buys a drink from the vending machine 86 by paying with this payment instrument. The robot device 10 may move to the vending machine 86 and directly operate it to buy a drink. The robot device 10 identifies purchase buttons of the vending machine 86 by analyzing the image captured by the visual sensor, and buys a drink. The robot device 10 may deliver this drink to the user 84. The robot device 10 may buy a drink in response to an instruction from the user 84 or without an instruction from the user 84. If the robot device 10 buys a drink based on an instruction from the user 84, the controller 54 causes information indicating a solution (the user 84 can buy a drink) to be displayed on the UI 50. If the user 84 provides a purchase instruction by using the UI 50, the robot device 10 buys a drink by paying with the payment instrument. Information indicating the solution may be sent to the terminal device 14 of the user 84 and displayed on the UI 72 of the terminal device 14. If the user 84 provides a purchase instruction by using the UI 72, information concerning the purchase instruction is sent from the terminal device 14 to the robot device 10, and the robot device 10 buys a drink in response to the purchase instruction.

If the robot device 10 does not have a payment instrument employed by the vending machine 86, it may pay by receiving payment support from at least one of devices other than the robot device 10 and the users 84. For example, the robot device 10 may buy a drink by receiving money from a user 84 concerned with the solution for solving the problem or by borrowing the payment instrument from another device. A user 84 concerned with the solution for solving the problem is the user 84 said "I'm thirsty". This user 84 is identified by a certain sensor of the robot device 10.

(User Decision Mode 1)

Figure 20:
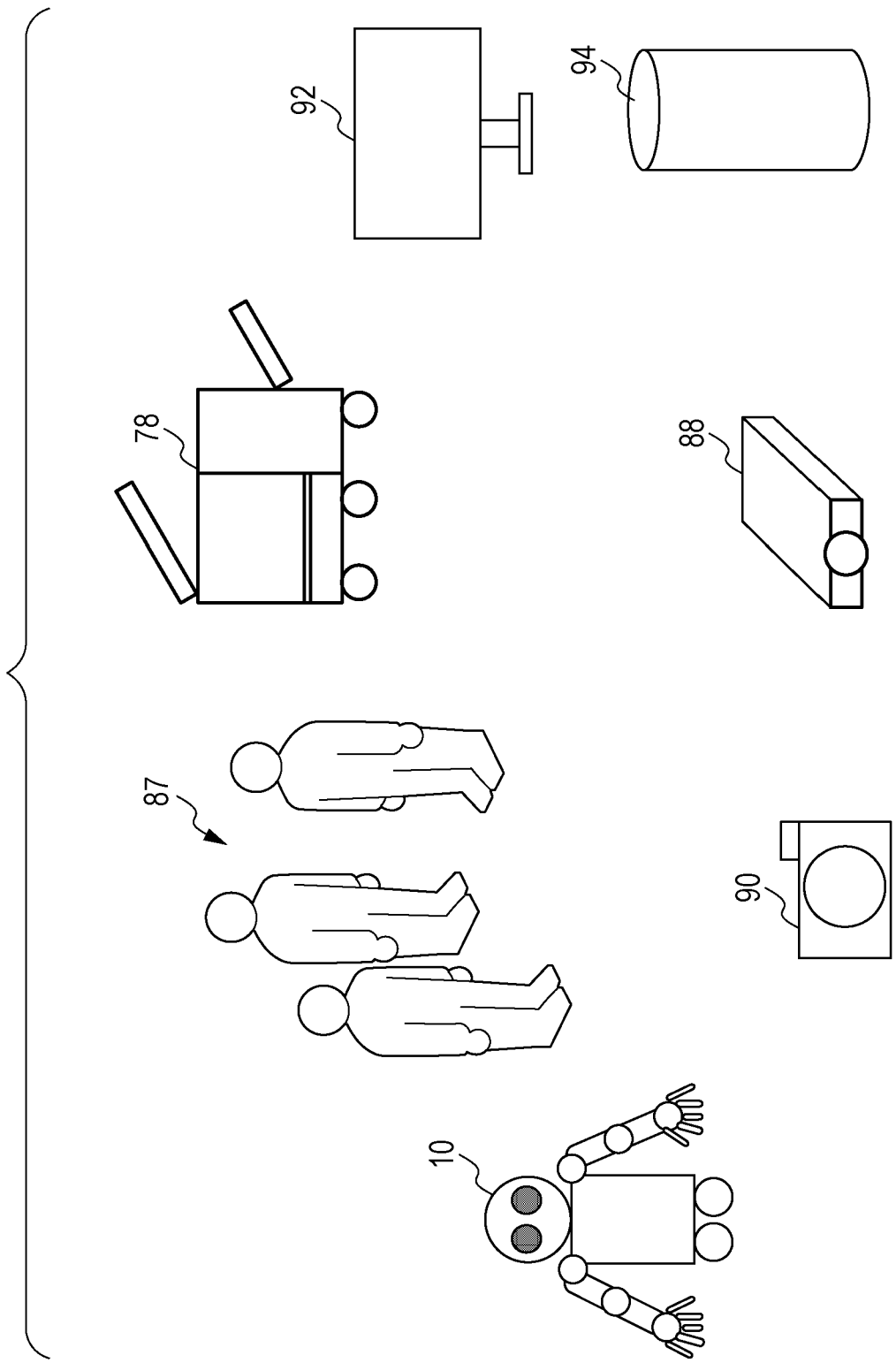
FIG. 20 is a view for explaining an application scene 4.

An example of the user decision mode (user decision mode 1) will be described below in detail with reference to FIG. 20. In FIG. 20, three staff members 87 and the robot device 10 are shown. The staff members 87 are talking, and plural devices (such as a multifunction device 78, a projector 88, a camera 90, a display 92, and an aroma diffuser 94) are installed near the robot device 10.

The status information collector 44 of the robot device 10 collects status information concerning the surroundings of the robot device 10 by using various sensors, and the detector 56 detects the surrounding situation based on the status information. The identifying unit 64 identifies devices around the robot device 10. For example, the detector 56 detects a situation (problem) "three staff members are holding a meeting and seem to be arguing about something". In the example in FIG. 20, the identifying unit 64 identifies the multifunction device 78, the projector 88, the camera 90, the display 92, and the aroma diffuser 94. The identifying unit 64 may identify the terminal device 14 of a staff member 87 (who seems to have a problem, for example).

If the judging unit 60 judges that the robot device 10 is unable to solve the problem detected by the detector 56, the communication unit 30 sends the situation information to a terminal device 14 registered in the robot device 10 or a terminal device 14 identified by the identifying unit 64 (the terminal device 14 of the staff member 87 who seems to have a problem, for example) under the control of the controller 54. The situation information includes information concerning the situation (problem) detected by the detector 56 and information concerning the devices identified by the identifying unit 64.

Figure 21:
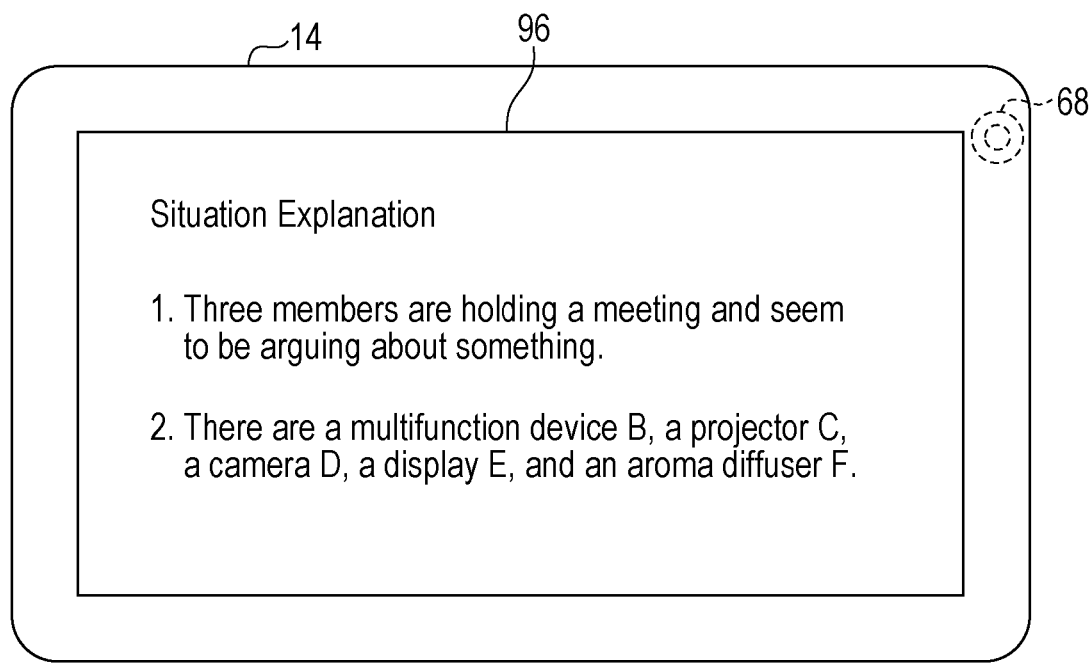
FIGS. 21 through 30 illustrate examples of screens.

On the UI 72 of the terminal device 14, a screen explaining the situation is displayed. FIG. 21 shows an example of the screen. On the UI 72 of the terminal device 14, a situation explanation screen 96 is displayed. On the situation explanation screen 96, information concerning the situation (problem) detected by the detector 56 and information concerning the devices identified by the identifying unit 64 are displayed. In the example in FIG. 21, a character string indicating "three members are holding a meeting and seem to be arguing about something" is displayed as the situation (problem), and a character string "there are a multifunction device B, a projector C, a camera D, a display E, and an aroma diffuser F" is displayed.

If the user makes a request for additional information by using the terminal device 14, information indicating the request is sent from the terminal device 14 to the robot device 10. The communication unit 30 of the robot device 10 then sends additional information to the terminal device 14 in response to this request. If an image representing the surrounding situation is requested by the user as additional information, the communication unit 30 sends image data indicating the surrounding situation to the terminal device 14.

For example, the communication unit 30 sends image data linked with the staff members 87 who seem to have a problem and image data linked with the devices identified by the identifying unit 64 to the terminal device 14 as the image data indicating the surrounding situation. The image data linked with the staff members 87 who seem to have a problem may be image data indicating an image of the staff members 87 captured by the visual sensor or image data schematically indicating the staff members 87. The image data linked with the devices may be image data indicating images of the devices captured by the visual sensor (camera) when the identifying unit 64 has identified the devices or image data schematically representing the identified devices (icons). The image data schematically representing the identified devices may be stored in the robot device 10 in advance, or may be stored in another device, such as a server, in advance and be sent to the robot device 10.

Figure 22:
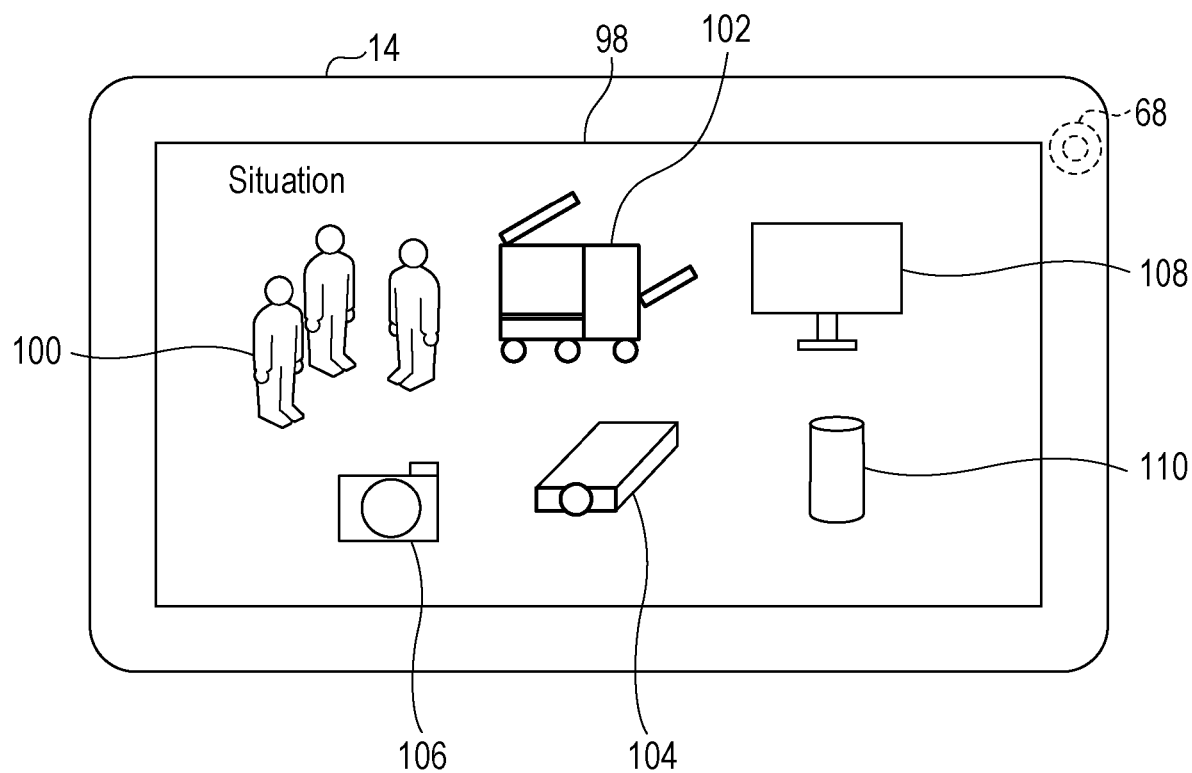

The communication unit 30 sends image data (image data linked with the staff members 87 and image data linked with the devices, for example) as the additional information to the terminal device 14. On the UI 72 of the terminal device 14, the image indicated by the image data is displayed. FIG. 22 shows an example of the image. On the UI 72 of the terminal device 14, a situation explanation screen 98 is displayed. On the situation explanation screen 98, a set of images is displayed as the additional information. For example, an image 100 linked with the staff members 87, a device image 102 linked with the multifunction device 78, a device image 104 linked with the projector 88, a device image 106 linked with the camera 90, a device image 108 linked with the display 92, and a device image 110 linked with the aroma diffuser 94 are displayed.

If the user specifies a device image on the situation explanation screen 98 and provides an instruction to execute a solution by using the device linked with the specified device image, information indicating this instruction is sent to the specified device. Then, this device executes the solution for solving the problem detected by the detector 58 in response to the instruction. Information indicating the instruction may be sent to the device from the terminal device 14 or from the robot device 10.

The user specifies the device images 108 and 110, for example. In this case, the solution specifying unit 58 refers to the solution management information 38 and specifies a solution which is used for solving the problem "three members are holding a meeting and seem to be arguing about something" detected by the detector 56 and which uses the display 92 linked with the device image 108 and the aroma diffuser 94 linked with the device image 110. That is, the solution specifying unit 58 specifies (identifies) a solution for solving the problem "three members are holding a meeting and seem to be arguing about something" detected by the detector 56 by referring to the solution management information 38, and also specifies a set of devices used for the identified solution (a set of devices having functions for executing the solution) by referring to the device function management information 40 and the collaborative function management information 42. If the user specifies the display 92 and the aroma diffuser 94, the solution specifying unit 58 selects a solution to be executed by using the display 92 and the aroma diffuser 94.

Figure 23:
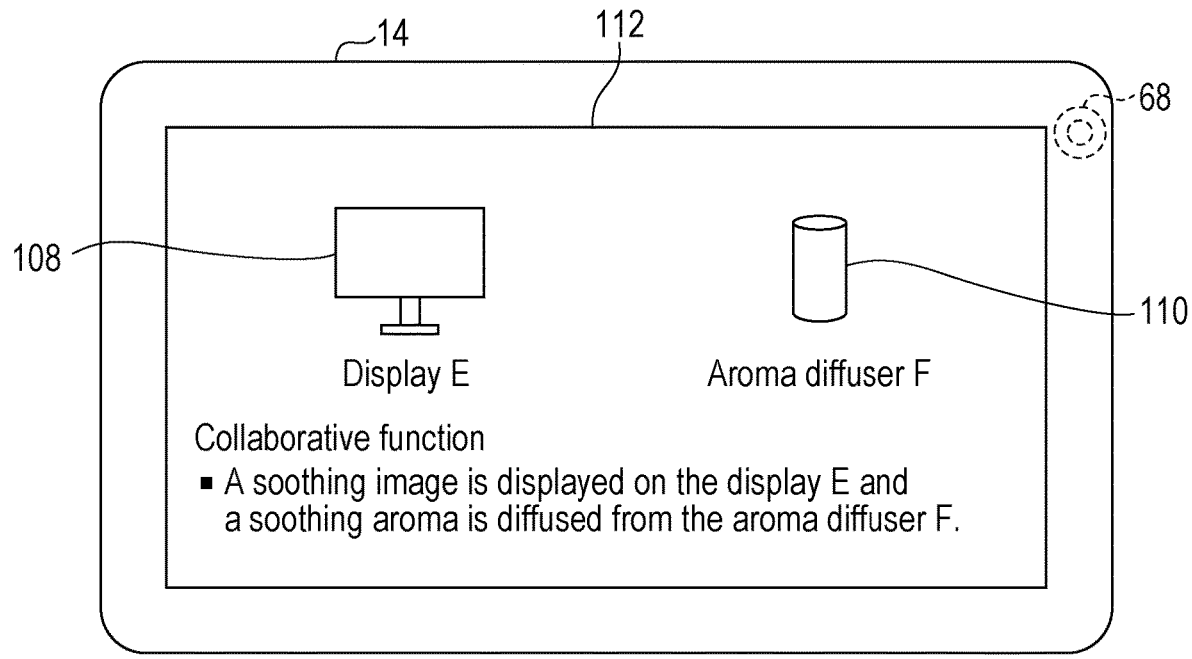

If the user specifies the display 92 and the aroma diffuser 94, an execution instruction screen 112 is displayed on the UI 72 of the terminal device 14, as shown in FIG. 23. On the execution instruction screen 112, device images (device images 108 and 110, for example) specified by the user are displayed, and information indicating a function (solution) that is executable by the devices specified by the user is displayed. The solution that is executable by using the display 92 and the aroma diffuser 94 is "displaying a soothing image on the display 92 and diffusing a soothing aroma from the aroma diffuser 94", for example. This solution is a collaborative function executable by combining the display 92 and the aroma diffuser 94, and is registered in the collaborative function management information 42. When the user provides an instruction to execute the solution by using the terminal device 14, information indicating this instruction is sent from the terminal device 14 to the display 92 and the aroma diffuser 94. This information may alternatively be sent to the display 92 and the aroma diffuser 94 via the robot device 10. Upon receiving this information, the display 92 displays a soothing image, and the aroma diffuser 94 diffuses a soothing aroma. Data indicating a soothing image may be stored in the robot device 10 in advance and may be sent from the robot device 10 to the display 92. The data may alternatively be stored in another device, such as a server, and be sent from this device to the display 92.

The screens 96, 98, and 112 shown in FIGS. 21 through 23 may be displayed on the UI 50 of the robot device 10. In this case, the screens 96, 98, and 112 may not necessarily be displayed on the UI 72 of the terminal device 14. Information displayed on the screens 96, 98, and 112 may be output as voice information.

Details of the selection operation of a device which executes a solution will be discussed later.

(User Decision Mode 2)

Another example of the user decision mode (user decision mode 2) will be discussed below in detail.

If the judging unit 60 judges that the robot device 10 is unable to solve a problem detected by the detector 56, the communication unit 30 sends situation information to a terminal device 14 under the control of the controller 54.

Figure 24:
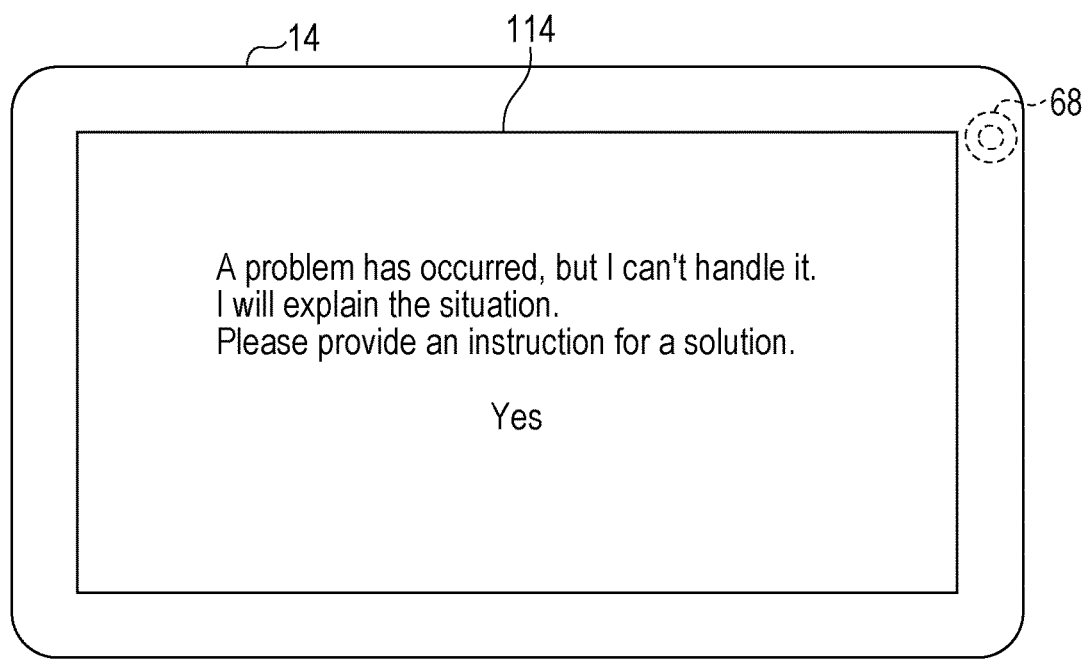

For example, on the UI 72 of the terminal device 14, a notifying screen 114 is displayed, as shown in FIG. 24. On the notifying screen 114, a message that a problem (accident) that is not possible to handle by the robot device 10 has occurred is displayed.

Figure 25:
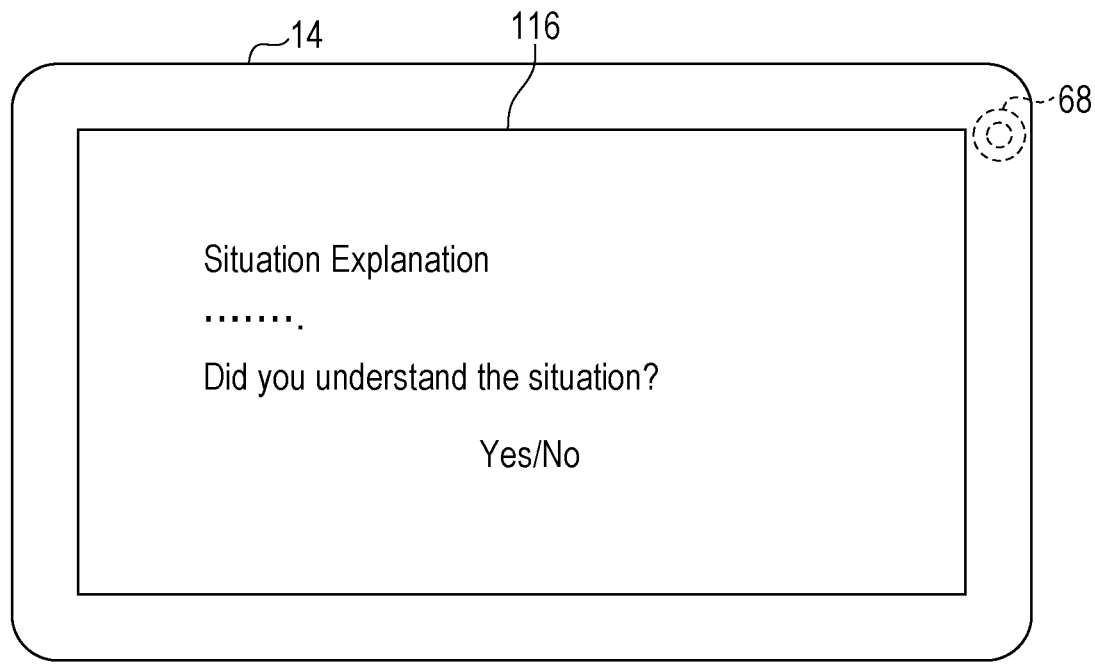

If the user presses a "YES" button on the notifying screen 114, the next screen appears. For example, as shown in FIG. 25, a situation explanation screen 116 is displayed on the UI 72 of the terminal device 14. On the situation explanation screen 116, an explanation of the situation (problem) detected by the robot device 10 is displayed.

Figure 26:
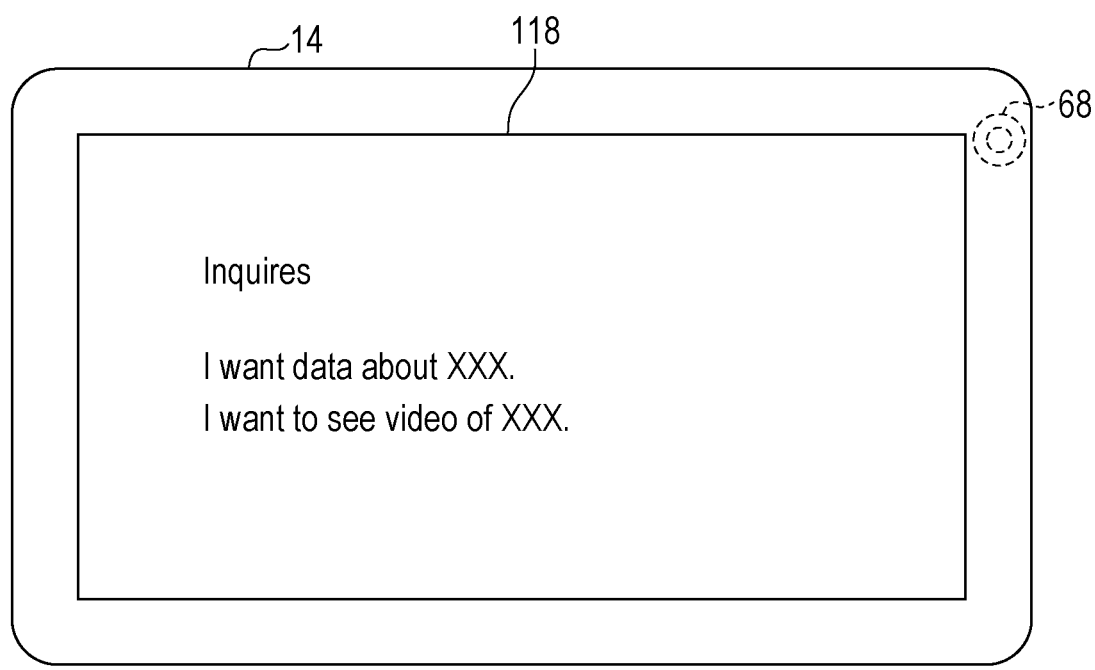

On the situation explanation screen 116, a message asking the user whether the user has understood the situation is displayed. If the user presses a "NO" button, the user can make an inquiry to the robot device 10, that is, the user can make a request for additional information. In this case, on the UI 72 of the terminal device 14, an inquiry screen 118 is displayed, as shown in FIG. 26. On the inquiry screen 118, the user can input inquiries (issues about which the user additionally wants to know) by using the terminal device 14. In the example in FIG. 26, the user has input some inquires "I want data about XXX" and "I want to see video of XXX". Information indicating the inquiries is sent from the terminal device 14 to the robot device 10. The situation information collector 44 of the robot device 10 collects information (image data and voice data, for example) in response to the user inquires. The communication unit 30 then sends the information collected by the situation information collector 44 to the terminal device 14. On the situation explanation screen 116 of the UI 72 of the terminal device 14, the information is displayed.

Figure 27:
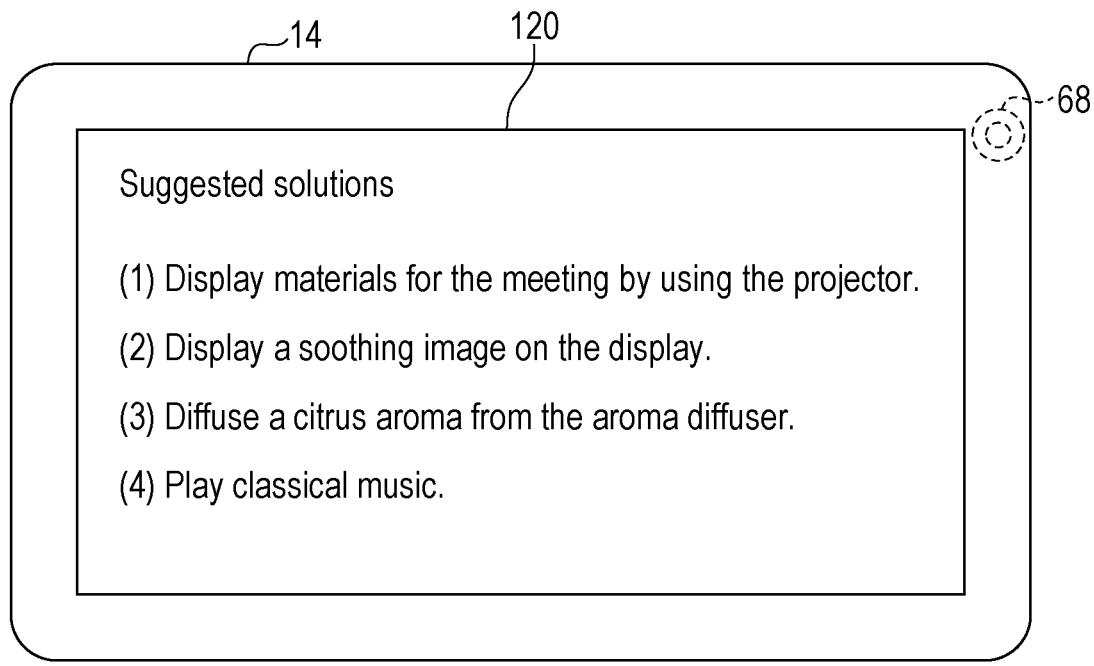

If the user presses a "YES" button on the situation explanation screen 116, a solution display screen 120 is displayed on the UI 72 of the terminal device 14, as shown in FIG. 27. On the solution display screen 120, information indicating solutions specified by the solution specifying unit 58 (such as explanations and names of the solutions) is displayed. For example, if, as discussed above, the problem "three staff members are holding a meeting and seem to be arguing about something" is detected, the solution specifying unit 58 refers to the solution management information 38 and specifies solutions for solving the problem. Information indicating the specified solutions is sent from the robot device 10 to the terminal device 14, and is displayed on the UI 72 of the terminal device 14. In the example in FIG. 27, four solutions (1) through (4) are specified and displayed as recommended solutions for solving the problem. The solutions may be displayed in a random order or in descending order of the effectiveness or the feasibility. For example, a solution using a device located closer to the terminal device 14 or the robot device 10 has a higher feasibility and is thus displayed in the list in a higher position. Information concerning the positions of the robot device 10, the terminal device 14, and the other devices may be obtained by using a global positioning system (GPS). The controller 54 calculates the distance between each device and the robot device 10 or the terminal device 14 by using the GPS position information. Based on the calculation results, the order of the solutions displayed on the solution display screen 120 is determined.

Figure 28:
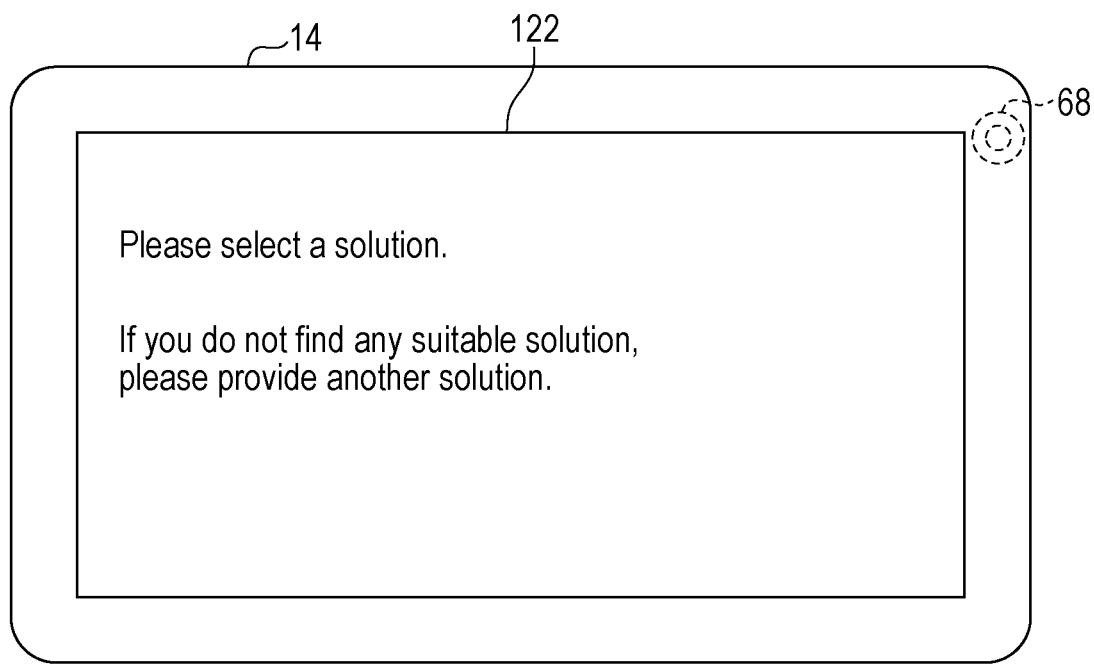

If the user instructs the transition of screens while the solution display screen 120 is being displayed on the UI 72 of the terminal device 14, or if a preset time elapses, a screen 122 is displayed on the UI 72, as shown in FIG. 28. On the screen 122, a message such as "please select a solution", that is, a message instructing the user to select a solution, is displayed. If the user does not find a suitable solution (a desirable solution) among the recommended solutions (see FIG. 27) presented to the user, the user can provide another instruction.

Figure 29:
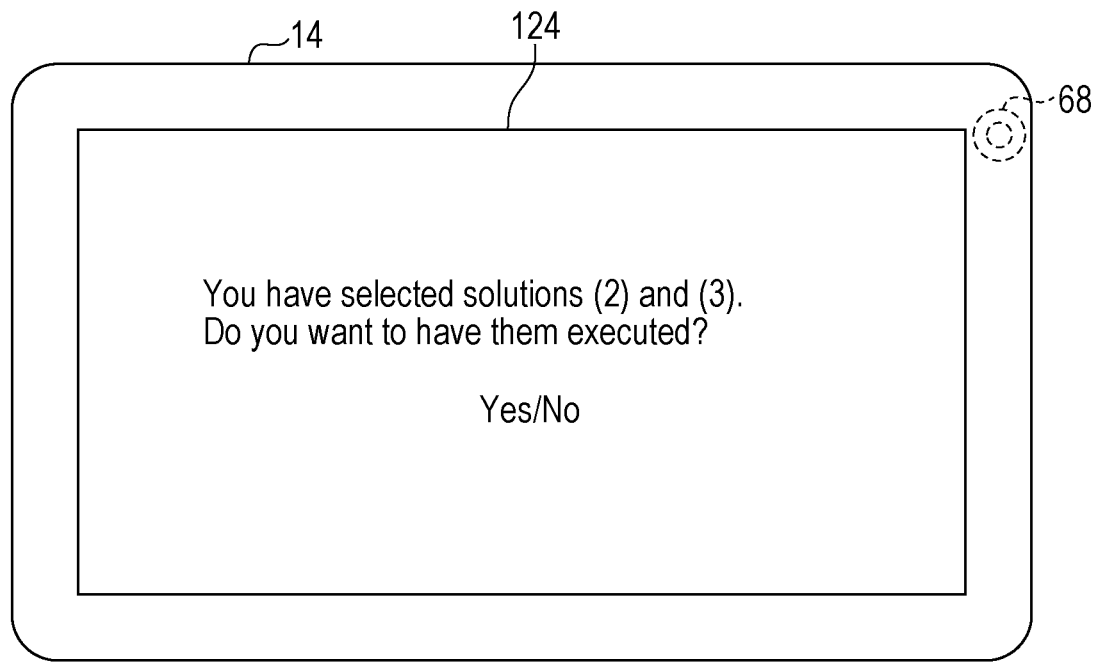

If the user finds a suitable solution among the recommended solutions (see FIG. 27) and selects it by using the terminal device 14, a checking screen 124 is displayed on the UI 72, as shown in FIG. 29. On the checking screen 124, information indicating a solution selected by the user is displayed. In the example in FIG. 29, the solution (2) "displaying a soothing image on the display" and the solution (3) "diffusing a citrus aroma from the aroma diffuser" are selected by the user. If the user presses a "YES" button on the checking screen 124, information indicating an instruction to execute the solutions (2) and (3) is sent from the terminal device 14 or the robot device 10 to the devices used for executing the solutions (2) and (3) (the display 92 and the aroma diffuser 94, for example). Then, the display 92 executes the solution (2) and the aroma diffuser 94 executes the solution (3).

If the user presses a "NO" button on the checking screen 124, the previous screen 122 (see FIG. 28) is displayed.

Figure 30:
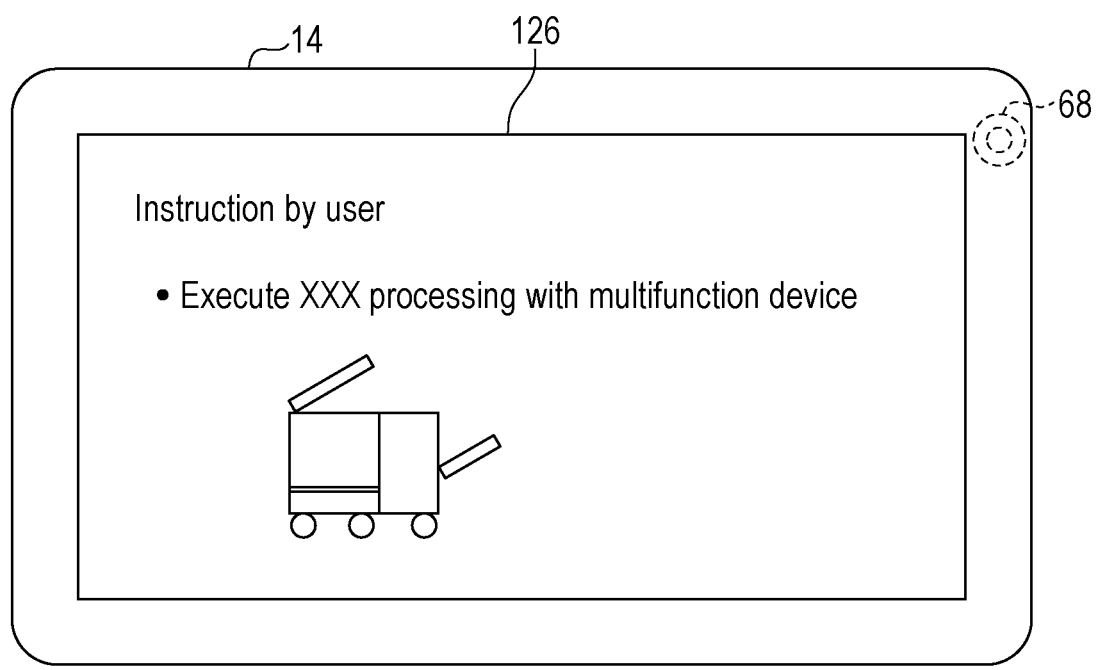

If the user does not find a suitable solution among the recommended solutions (see FIG. 27) presented to the user, the user may specify another solution. If the user provides an instruction to display an input screen for specifying a solution by using the terminal device 14, a user input screen 126 is displayed on the UI 72 of the terminal device 14, as shown in FIG. 30. On the user input screen 126, the user specifies a device and a solution to be executed by using this device. In the example in FIG. 30, a multifunction device is specified as the device for executing the solution, and "XXX processing" is specified as the solution using this multifunction device. The user may specify a device used for the solution by inputting the name of this device with characters or by specifying a device image linked with this device. On the UI 72 of the terminal device 14, one or plural device images linked with one or plural devices identified by the robot device 10 are displayed, and the user selects the device image linked with a device used for executing the solution. By selecting a device image in this manner, a user unfamiliar with the name of a device used for a solution can still specify the device. When the user specifies a device, a list of functions included in the device is displayed on the UI 72. Functions included in a device can be specified by referring to the device function management information 40. The user then selects a function used for the solution from the list. When the user provides an instruction to execute the solution by using the terminal device 14, information indicating the instruction is sent to the device specified by the user, and the device executes the solution.

The screens 114, 116, 118, 120, 122, 124, and 126 shown in FIGS. 24 through 30 may be displayed on the UI 50 of the robot device 10. In this case, the screens 114, 116, 118, 120, 122, 124, and 126 may not necessarily be displayed on the UI 72 of the terminal device 14. Information displayed on the screens 114, 116, 118, 120, 122, 124, and 126 may be output as voice information.

In the above-described user decision modes 1 and 2, information to be displayed on the UI 72 of the terminal device 14 is sent from the robot device 10 to the terminal device 14. The information may alternatively be sent from another device, such as a server, to the terminal device 14 under the control of the robot device 10.

(Identifying Processing for Devices)

Identifying processing for devices will be discussed below. In one example, a device is identified by obtaining device identification information indicating this device by using the augmented reality (AR) technology. For example, by using the AR technology, a device to be singly used is identified by obtaining device identification information indicating this device, and collaborative devices are identified by obtaining device identification information concerning these devices. As the AR technology, a known AR technology may be utilized. Examples of the known AR technology are a marker-based AR technology using a marker, such as a two-dimensional barcode, a markerless AR technology using an image recognition technology, and position information AR technology using position information. Alternatively, device identification information may be obtained without using the AR technology. For example, a device connected to a network may be identified based on the IP address of this device or by reading the device ID. Among devices and terminals having various wireless communication functions, such as infrared communication, visible light communication, Wi-Fi, and Bluetooth, device IDs of devices or terminals to be used as collaborative devices or terminals may be obtained by using corresponding wireless communication functions, and then, a collaborative function may be executed.

Figure 31:
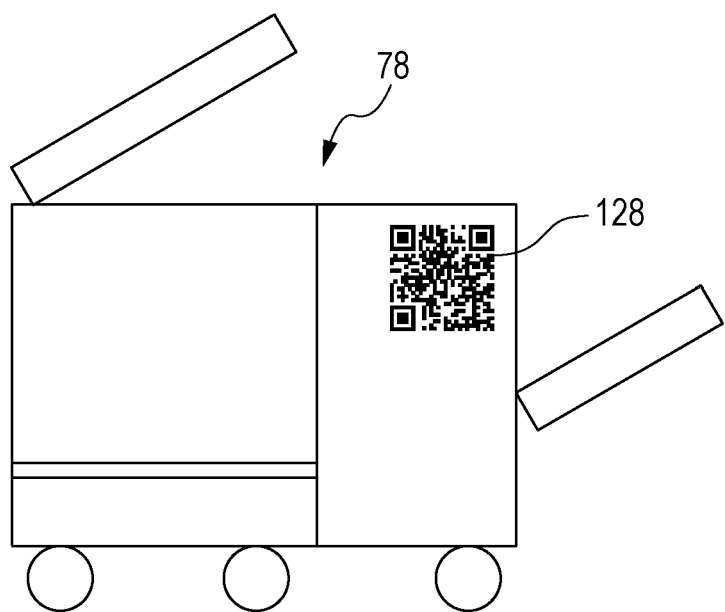
FIG. 31 is a schematic view illustrating the external appearance of a multifunction device.

Processing for obtaining device identification information will be described below in detail with reference to FIG. 31. A description will be given, assuming that the multifunction device 78 is installed near the robot device 10 and the robot device 10 obtains device identification information concerning the multifunction device 78. FIG. 31 shows the schematic external appearance of the multifunction device 78. In this example, processing for obtaining device identification information by utilizing the marker-based AR technology will be discussed. A marker 128, such as a two-dimensional barcode, is provided on the housing of the multifunction device 78. The marker 128 is coded device identification information of the multifunction device 78. The robot device 10 captures an image of the marker 128 by using a visual sensor so as to generate image data indicating the marker 128. The controller 54 of the robot device 10 performs decoding processing on the marker image indicated by the image data so as to extract device identification information. The robot device 10 can thus identify the multifunction device 78. The identifying unit 64 of the robot device 10 then refers to the device function management information 40 and specifies function information indicating functions associated with the extracted identification information. As a result, the functions provided in the multifunction device 78 are specified (identified).

The marker 128 may also include coded function information indicating the functions of the multifunction device 78. In this case, as a result of the controller 54 performing decoding processing on image data indicating the marker 128, the device identification information of the multifunction device 78 is extracted, and also, function information indicating the functions of the multifunction device 78 is extracted. As a result, functions provided in the multifunction device, as well as the multifunction device 78, are specified (identified).

If device identification information is obtained by using the markerless AR technology, the robot device 10 captures an image of the entirety or part of the external appearance of a device (the multifunction device 78, for example) by using the visual sensor so as to generate external-appearance image data. In this case, capturing an image of information for specifying the device, such as the device name (the product name, for example) and the model number, contributes to specifying the device. The controller 54 of the robot device 10 then identifies the device based on the external-appearance image data. In the storage unit 32 of the robot device 10, for each device, external-image associating information indicating the association between external-appearance image data indicating the entirety or part of the external appearance of a device and device identification information concerning this device is stored. The controller 54 compares the external-appearance image data obtained by capturing an image of the device with each item of external-appearance image data included in the external-image associating information, and specifies the device identification information concerning the device to be used based on the comparison results. For example, the controller 54 extracts features of the external appearance of the device from the external-appearance image data obtained by capturing an image of the device, and specifies external-appearance image data having the same or similar features from a set of external-appearance image data included in the external-image associating information. The controller 54 then specifies the device identification information associated with the specified external-appearance image data. As a result, the device (the multifunction device 78, for example) is specified. If external-appearance image data is generated as a result of capturing an image of the device name (the product name, for example) and the model number, the device may be specified based on the device name and the model number indicated by the external-appearance image data. The identifying unit 64 refers to the device function management information 40 and specifies function information indicating the functions associated with the specified device identification information. As a result, the functions provided in the device (the multifunction device 78, for example) are specified.

If device identification information is obtained by using the position information AR technology, position information indicating a position at which a device (the multifunction device 78, for example) is installed is obtained by using a GPS function. Each device has a GPS function and obtains device position information indicating the position of a device. The robot device 10 then outputs information indicating a request to obtain device position information to a device, and receives the device position information from this device as a response to the request. The controller 54 of the robot device 10 identifies the device based on the device position information. In the storage device 32, for each device, position associating information indicating the association between device position information indicating a position at which a device is installed and device identification information concerning this device is stored. The controller 54 specifies the device identification information associated with the device position information, based on the position associating information. As a result, the device is specified (identified). The identifying unit 64 refers to the device function management information 40 and specifies function information indicating the functions associated with the specified device identification information. As a result, the functions provided in the device (the multifunction device 78, for example) are specified (identified).

Figure 32:
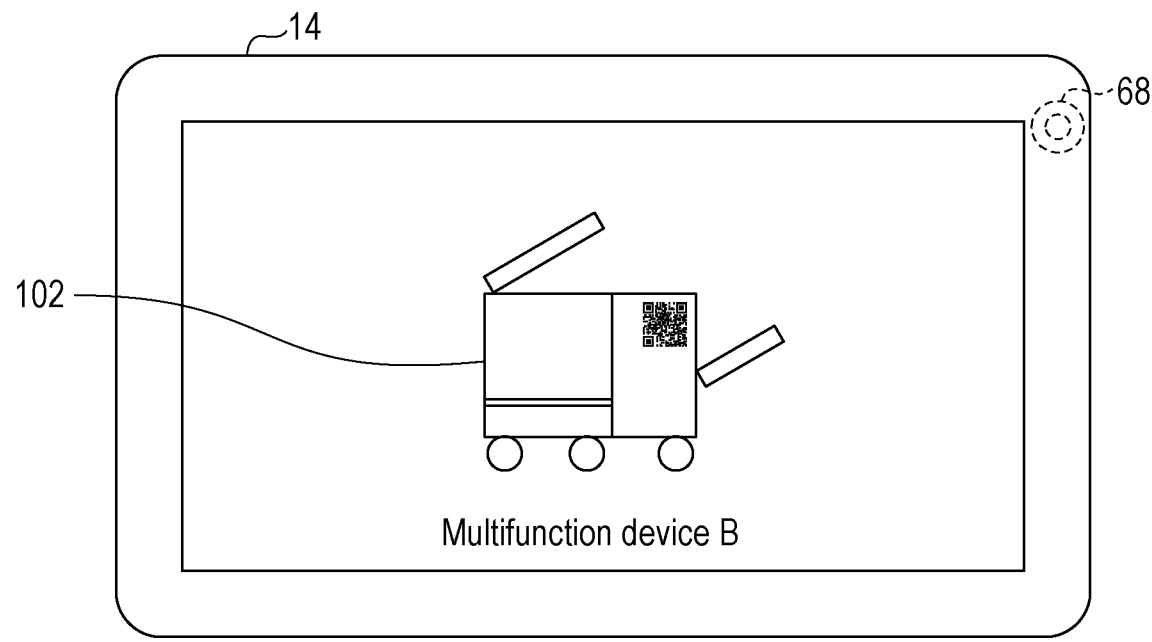
FIGS. 32 through 35 illustrate examples of screens.

For example, in the user decision mode 1, if the multifunction device 78 is identified by the robot device 10, a device image linked with the multifunction device 78 is displayed on the terminal device 14 as situation information. For example, the device image 102 linked with the multifunction device 78 is displayed on the UI 72 of the terminal device 14, as shown in FIG. 32. The device image 102 may be an image captured by the visual sensor of the robot device 10 or may be an image schematically representing the multifunction device 78.

When a device is identified, information indicating the name of this device may be sent from the robot device 10 to the terminal device 14, and the name of the device may be displayed on the UI 72 of the terminal device 14. In the example in FIG. 32, the name "multifunction device B" is displayed.

Figure 33:
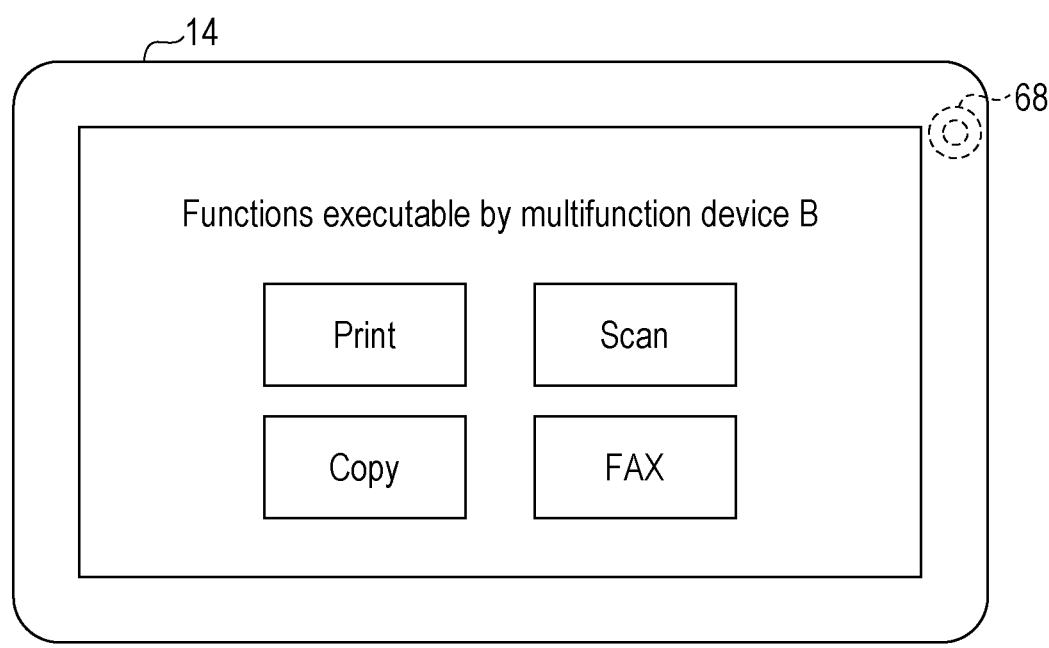

For example, if the user specifies the device image 102 by using the terminal device 14, information indicating the solutions to be executed by using the multifunction device 78 linked with the device image 102 (button images for specifying solutions to be executed, for example) is displayed on the UI 72 of the terminal device 14, as shown in FIG. 33. The multifunction device B has a print function, a scan function, a copy function, and a fax function, for example. Button images for executing these functions as solutions are displayed on the UI 72. If the user provides an instruction to execute the print function by specifying the button image of the print function, execution instruction information indicating an instruction to execute the print function is sent from the terminal device 14 or the robot device 10 to the multifunction device 78. The execution instruction information includes control data for executing the print function and data such as image data to be printed by using the print function. Upon receiving the execution instruction information, the multifunction device 78 performs printing in accordance with the execution instruction information.

Figure 34:
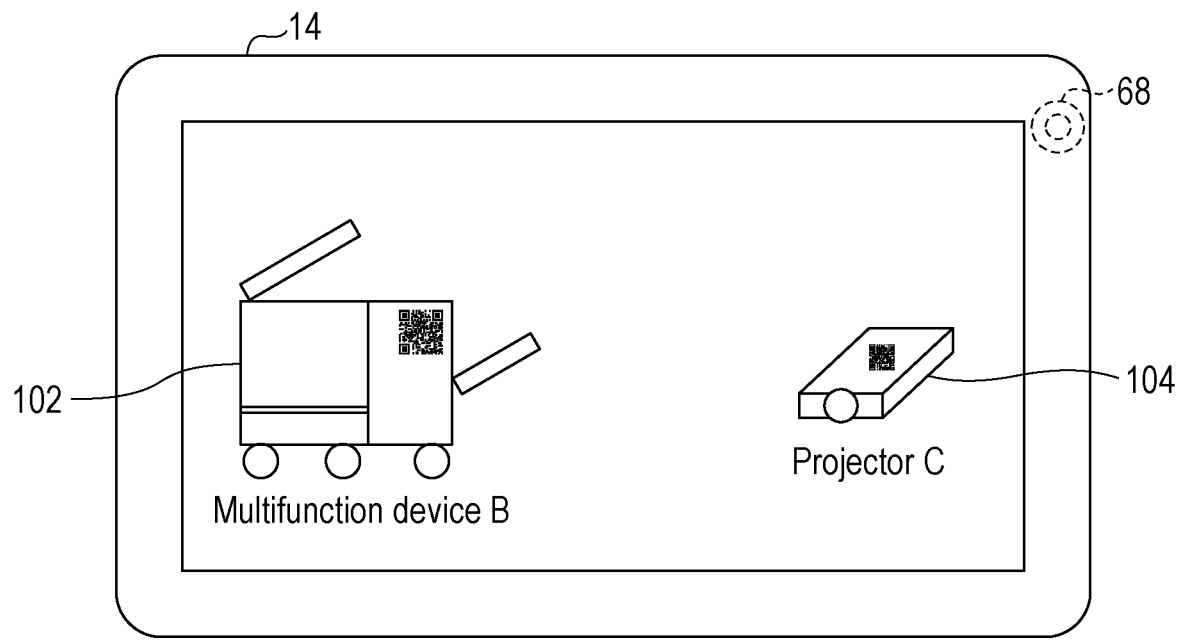

If, in the user decision mode 1, plural devices (the multifunction device 78 and the projector 88, for example) are identified by the robot device 10, a device image linked with the multifunction device 78 and a device image linked with the projector 88 are displayed on the terminal device 14 as situation information. For example, the device image 102 linked with the multifunction device 78 and the device image 104 linked with the projector 88 are displayed on the UI 72 of the terminal device 104, as shown in FIG. 34. The device images 102 and 104 may be images captured by the visual sensor of the robot device 10 or images schematically representing the multifunction device 78 and the projector 88.

When a device is identified, information indicating the name of the device may be sent from the robot terminal 10 to the terminal device 14 and may be displayed on the UI 72 of the terminal device 14. In the example in FIG. 34, the name of the multifunction device 78 "multifunction device B" and the name of the projector 88 "projector C" are displayed.

Figure 35:
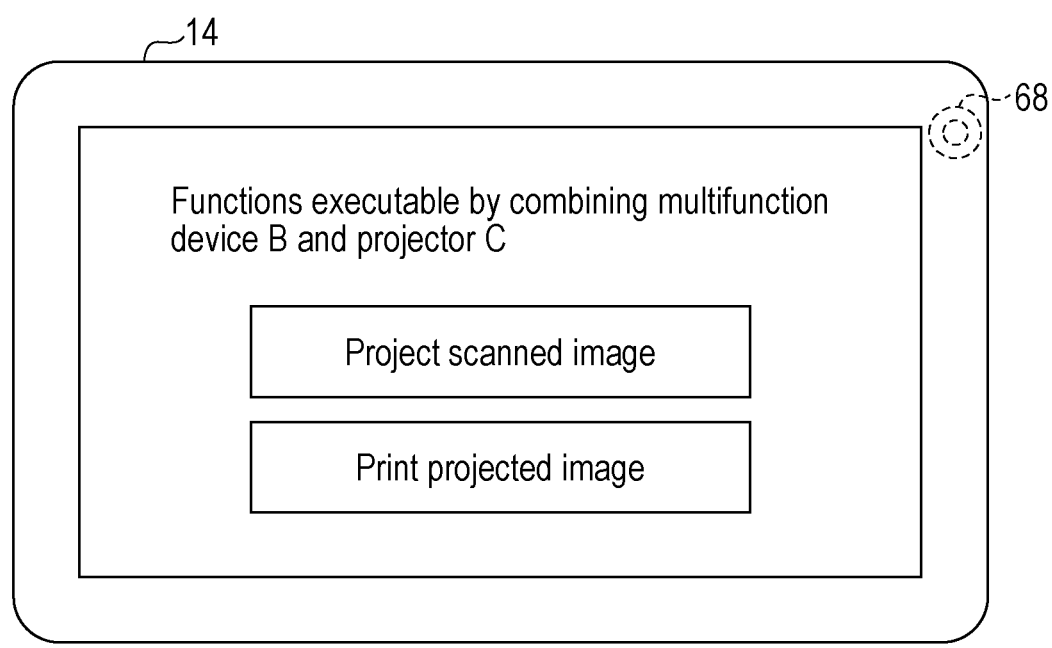

If the user specifies the device images 102 and 104 by using the terminal device 14, information indicating solutions using the multifunction device 78 linked with the device image 102 and the projector 88 linked with the device image 104 (button images for executing the solutions) is displayed on the UI 72 of the multifunction device 14, as shown in FIG. 35. Each of the solutions is a solution implemented by a collaborative function using the multifunction device 78 and the projector 88. By combining the multifunction device 78 and the projector 88, a collaborative function of projecting a scanned image generated by the multifunction device 78 by using the projector 88 and a collaborative function of printing an image projected by the projector 88 by using the multifunction device 78 are executable. Button images for executing these collaborative functions are displayed on the UI 72 of the multifunction device 14. If the user specifies a button image to instruct the execution of the solution (collaborative function), execution instruction information indicating an instruction to execute this solution is sent from the terminal device 14 or the robot device 10 to the multifunction device 78 and the projector 88. Upon receiving the execution instruction information, the multifunction device 78 and the projector 88 execute the collaborative function specified by the user.

The multifunction device 78 and the projector 88 may be specified as collaborative devices to be combined as a result of the user touching the device image 102 with a finger, for example, and then sliding the finger to the device image 104 to specify the device images 102 and 104. The user may touch the device image 104 first with a finger and then slide the finger to the device image 102. A screen contact medium, such as a pen, may be used instead of a finger. The user may specify the device images 102 and 104 by connecting them so as to specify the multifunction device 78 and the projector 88 as collaborative devices. The user may specify the device images 102 and 104 by superposing them on each other so as to specify the multifunction device 78 and the projector 88 as collaborative devices. The user may draw a figure such as a circle around device images linked with collaborative devices, or may specify device images linked with collaborative devices within a preset time. When canceling the collaborative function, the user may specify devices to be canceled on the screen or press a collaboration cancel button. The user may specify devices to be canceled by performing a preset operation, such as drawing a cross mark.

In another example, a collaborative device may be set as a basic collaborative device in advance. The multifunction device 78, for example, is set as a basic collaborative device in advance. Device identification information concerning a basic collaborative device may be stored in the robot device 10 or another device, such as a server, in advance. The user may alternatively specify a basic collaborative device by using the terminal device 14. If a basic collaborative device is set, the user specifies a device image linked with a device other than the basic collaborative device so as to select a device to be combined with the basic collaborative device.

In the above-described example, the functions (single functions and collaborative functions) are implemented by using hardware devices. However, the functions may be implemented by software (software applications). For example, instead of device images, function images (icons images, for example) linked with functions implemented by software are displayed on the UI 72 of the terminal device 14. As a result of the user specifying one or plural function images, a function linked with a function image or a collaborative function using plural functions linked with plural function images may be specified. Device images linked with hardware devices and function images linked with functions implemented by software may be displayed together on the UI 72. As a result of the user specifying a device image and a function image, a collaborative function using a device linked with the device image and a function linked with the function image may be specified.

Figure 36:
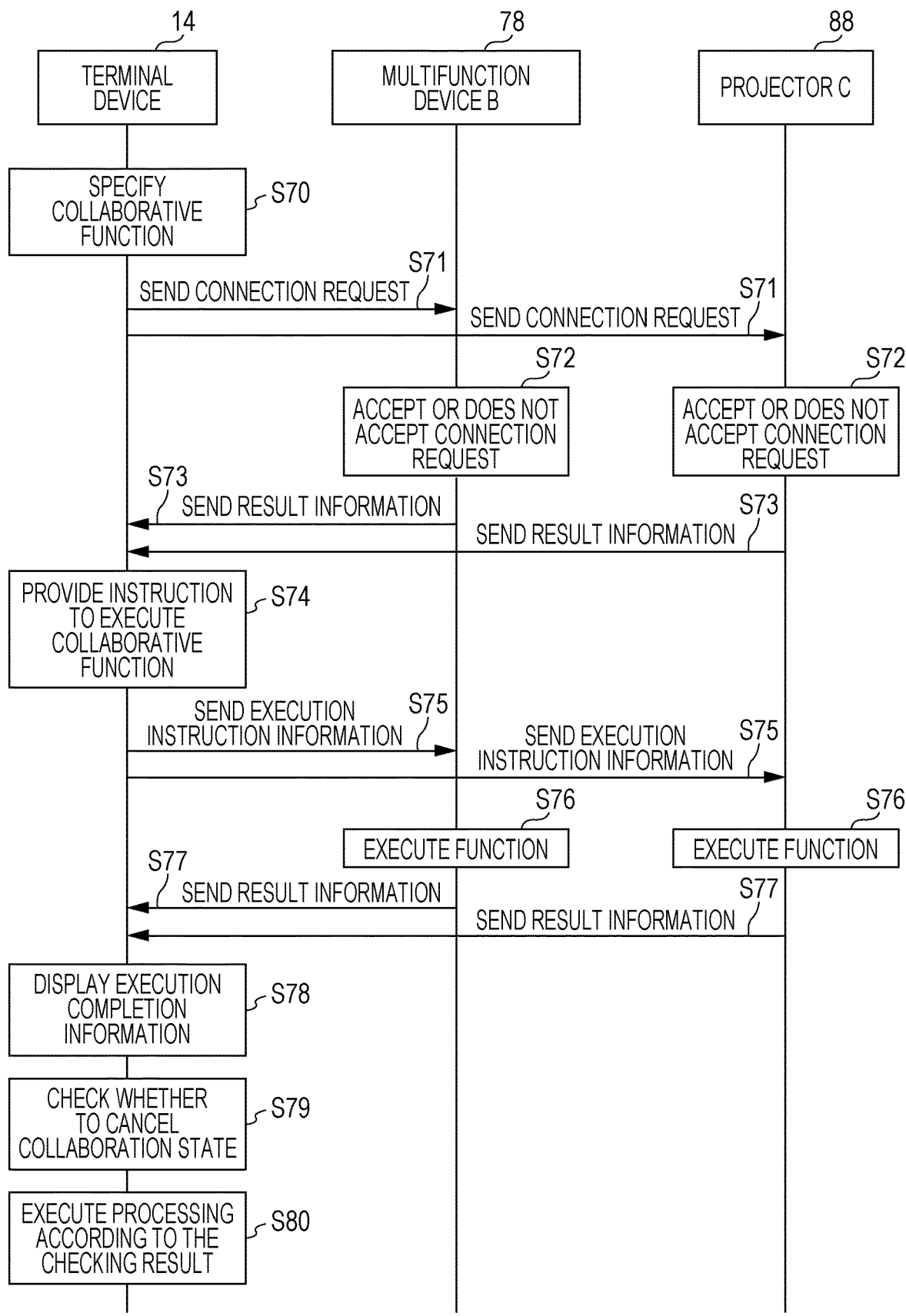
FIG. 36 is a sequence diagram illustrating connection processing.

Processing for executing a device function will be described below. In this example, processing for executing a collaborative function will be discussed. A connection request is sent from the terminal device 14 to collaborative devices to be combined, and the terminal device 14 and these devices are connected to each other. A connection request may be sent from the robot device 10 to collaborative devices, and the robot device 10 and these devices are connected to each other. This connection processing will be described below with reference to the sequence diagram of FIG. 36.

In step S70, a user specifies a collaborative function to be executed by using the terminal device 14. Then, in step S71, the terminal device 14 sends information indicating a connection request to devices (multifunction device 78 and projector 88, for example) executing this collaborative function. If address information concerning device addresses is stored in the robot device 10, the terminal device 14 obtains the address information indicating the addresses of these devices from the robot device 10. The address information may be stored in the terminal device 14. The terminal device 14 may obtain the address information by another approach. The terminal device 14 then sends information indicating a connection request to the collaborative devices (multifunction device 78 and projector 88, for example) by using the obtained address information.

Upon receiving the information indicating the connection request, in step S72, the multifunction device 78 and the projector 88 accept or do not accept this connection request. If the multifunction device 78 and the projector 88 are not allowed to connect to another device or if the number of devices that have requested to connect to the multifunction device 78 and the projector 88 exceeds a maximum number, the multifunction device 78 and the projector 88 do not accept the connection request. If the multifunction device 78 and the projector 88 accept the connection request, they may prohibit the operation for changing settings information concerning the multifunction device 78 and the projector 88 in order to protect it from being changed by the terminal device 14. For example, changing of color parameters and the preset time to shift to a power-saving mode in the multifunction device 78 may be prohibited. This enhances the security for collaborative devices. In another example, more limitations may be imposed on changing of settings information for collaborative devices than for singly used devices. For example, changing of fewer setting items is allowed for collaborative devices than for singly used devices. Reading of personal information concerning the other users, such as operation records, may be prohibited. This enhances the security for personal information concerning the users.

In step S73, result information indicating whether the connection request has been accepted is sent from the multifunction device 78 and the projector 88 to the terminal device 14. If the connection request has been accepted, communication is established between the terminal device 14 and each of the multifunction device 78 and the projector 88.

Then, in step S74, the user provides an instruction to execute the collaborative function by using the terminal device 14. In response to this instruction, in step S75, execution instruction information indicating an instruction to execute the collaborative function is sent from the terminal device 14 to the multifunction device 78 and the projector 88. The execution instruction information sent to the multifunction device 78 includes information (job information, for example) indicating processing to be executed by the multifunction device 78. The execution instruction information sent to the projector 88 includes information (job information, for example) indicating processing to be executed by the projector 88.

Upon receiving the execution instruction information, in step S76, the multifunction device 78 and the projector 88 execute the functions in accordance with the execution instruction information. If the collaborative function involves processing for sending and receiving data between the multifunction device 78 and the projector 88, such as transferring scanned data from the multifunction device 78 (multifunction device B) to the projector 88 (projector C) and projecting the scanned data by the projector 88, communication is established between the multifunction device 78 and the projector 88. In this case, the execution instruction information sent to the multifunction device 78 includes address information indicating the address of the projector 88, and the execution instruction information sent to the projector 88 includes address information indicating the address of the multifunction device 78. Communication is established between the multifunction device 78 and the projector 88 by using these items of address information.

Upon completion of the execution of the collaborative function, in step S77, information indicating the completion of the execution of the collaborative function is sent from the multifunction device 78 and the projector 88 to the terminal device 14. In step S78, the information indicating the completion of the execution of the collaborative function is displayed on the UI 72 of the terminal device 14. If this information is not displayed after the lapse of a preset time after the execution instruction information has been sent, the terminal device 14 displays information indicating an error on the UI 72, and may resend the execution instruction information or the connection request information to the multifunction device 78 and the projector 88.

Then, the user checks in step S79 whether to cancel the collaboration state between the multifunction device 78 and the projector 88, and executes processing in accordance with the checking result in step S80. If the user finds that the collaboration state will be canceled, the user provides an instruction to cancel the collaboration state by using the terminal device 14 so as to cancel the communication between the terminal device 14 and each of the multifunction device 78 and the projector 88. The communication between the multifunction device 78 and the projector 88 is also canceled. If the user finds that the collaboration state will not be canceled, the terminal device 14 may continue to provide an execution instruction.

If a single function is executed, information indicating an instruction to execute this function is sent from the terminal device 14 to a device executing this single function. The device then executes this function in accordance with the execution instruction.

The above-described execution instruction information may be sent from the robot device 10 to collaborative devices.

Processing for specifying devices used for executing a solution will be described below.

(Processing for Switching of Display Order of Collaborative Function Information)

In this exemplary embodiment, the order of displaying items of information concerning collaborative functions may be switched in accordance with the order of connecting device images linked with devices. This processing will be discussed below in detail with reference to FIGS. 37 through 39B.

FIG. 37 illustrates a collaborative function management table, which is another example of the collaborative function management information 42. In the example of the collaborative function management table shown in FIG. 37, information indicating a combination of device IDs, information indicating the names of collaborative devices (device types, for example), information indicating collaborative functions (collaborative function information), information indicating the connecting order, and information indicating the priority level are associated with each other. The connecting order indicates the order of connecting device images linked with devices. The priority level indicates the priority of displaying items of information concerning collaborative functions. The device having a device ID "A", for example, is a PC, and the device having a device ID "B" is a multifunction device. By combining the PC (A) and the multifunction device (B), "scan transfer function" and "print function" are implemented as collaborative functions. "Scan transfer function" is the function of transferring image data generated by a scanning operation of the multifunction device (B) to the PC (A). "Print function" is the function of sending data (image data or document data, for example) stored in the PC (A) to the multifunction device (B) and printing the data in the multifunction device (B). If the user connects the multifunction device (B) to the PC (A), that is, if the user connects the device image linked with the multifunction device (B) to the device image linked with the PC (A), "scan transfer function" takes the first priority level, and "print function" takes the second priority level. In this case, information concerning "scan transfer function" is displayed preferentially over information concerning "print function". Conversely, if the user connects the PC(A) to the multifunction device (B), that is, if the user connects the device image linked with the PC (A) to the device image linked with the multifunction device (B), "print function" takes the first priority level, and "scan transfer function" takes the second priority level. In this case, information concerning "print function" is displayed preferentially over information concerning "scan transfer function".

Figure 38A:
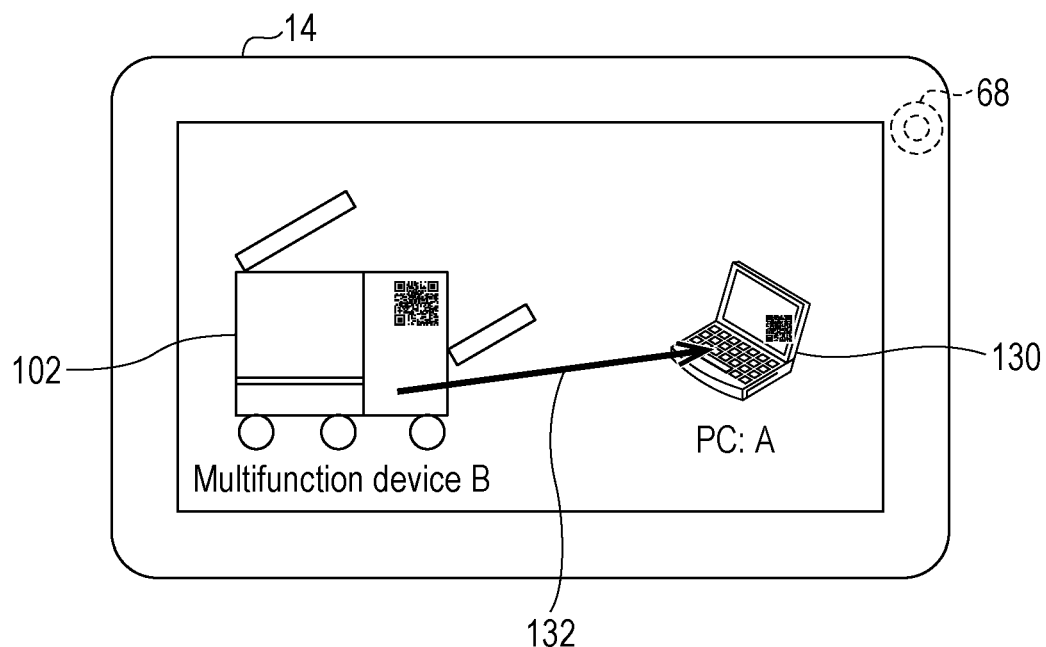
FIGS. 38A through 39B illustrate examples of screens.

FIGS. 38A through 39B illustrate examples of screens displayed on the UI 72 of the terminal device 14. The multifunction device (B) and the PC (A), for example, are identified. In the above-described user decision mode 1, a device image 102 linked with the multifunction device (B) and a device image 130 linked with the PC (A) are displayed as situation information on the UI 72 of the terminal device 14, as shown in FIG. 38A. In this state, the user connects device images representing devices to be combined by using an indicator (a user's finger, a pen, or a stylus, for example). The controller 74 of the terminal device 14 detects the positions at which the indicator contacts the screen to identify the movement of the indicator on the screen. For example, as indicated by an arrow 132 in FIG. 38A, the user touches the device image 102 on the screen by using the indicator and slides the indicator on the screen to the device image 130 so as to connect the device images 102 and 130. This operation specifies the multifunction device (B) linked with the device image 102 and the PC (A) linked with the device image 130 as collaborative devices and also specifies the connecting order of the devices. The connecting order of device images corresponds to the connecting order of devices. The multifunction device (B) corresponds to a first device, while the PC (A) corresponds to a second device. In the example in FIG. 38A, the user connects the device image 102 to the device image 130, and thus, the multifunction device (B) is connected to the PC (A). Information indicating the connecting order of devices is sent from the terminal device 14 to the robot device 10. The controller 74 of the terminal device 14 may cause an image representing a path followed by the user to be displayed on the screen. After collaborative devices are connected to each other, the controller 74 may replace the path by a preset straight line and display it on the screen.

As described above, when collaborative devices to be combined (multifunction device (B) and printer (A), for example) are specified, the identifying unit 64 of the robot device 10 refers to the collaborative function management table shown in FIG. 37, and identifies collaborative functions corresponding to a combination of the PC (A) and the multifunction device (B). Collaborative functions executable by combining the PC (A) and the multifunction device (B) are identified in this manner. When the user specifies the connecting order of the devices, the identifying unit 64 refers to the collaborative function management table and identifies the priority level associated with the connecting order. This will be explained more specifically with reference to FIG. 37. The PC (A) and the multifunction device (B) are specified as collaborative devices, and thus, the collaborative functions executable by the PC (A) and the multifunction device (B) are "scan transfer function" and "print function". The user has connected the multifunction device (B) to the PC (A) (B-+A), and thus, "scan transfer function" takes the first priority level, while "print function" takes the second priority level.

Information concerning the collaborative functions identified as described above and information concerning the priority levels are sent from the robot device 10 to the terminal device 14. The controller 74 of the terminal device 14 causes the information concerning the collaborative functions to be displayed on the UI 72 according to the priority levels.

Figure 38B:
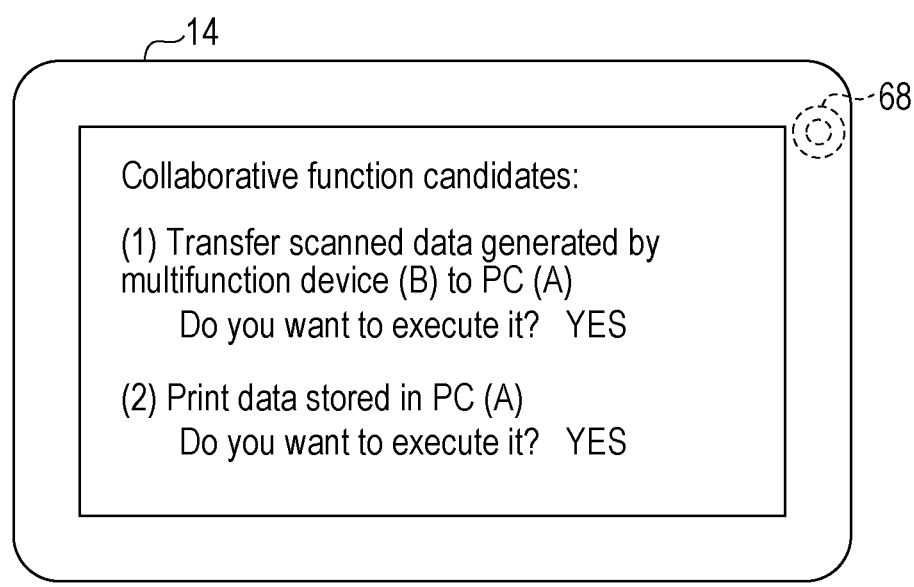

For example, as shown in FIG. 38B, the controller 74 of the terminal device 14 causes information concerning collaborative function candidates to be displayed on the UI 72. "Scan transfer function" takes the first priority level, while "print function" takes the second priority level. The information concerning "scan transfer function" is displayed preferentially over the information concerning "print function". In the example in FIG. 38B, the information concerning "scan transfer function" is displayed above the information concerning "print function". As the information concerning "scan transfer function", a description "transfer scanned data generated by the multifunction device (B) to the PC (A)" is displayed. As the information concerning "print function", a description "print data stored in the PC (A)" is displayed.

When the user specifies a collaborative function and provides an execution instruction, the specified collaborative function is executed. If the user presses a "YES" button, for example, the collaborative function linked with the "YES" button is executed.

Identifying of collaborative functions and priority levels may be performed by the device terminal 14 instead of the robot device 10.

To specify collaborative devices to be combined and the connecting order thereof, the user may draw a figure, such as a circle, instead of sliding an indicator between the device images. The drawing order corresponds to the connecting order. Alternatively, the user may output voice to specify collaborative devices and the connecting order thereof.

Figure 39A:
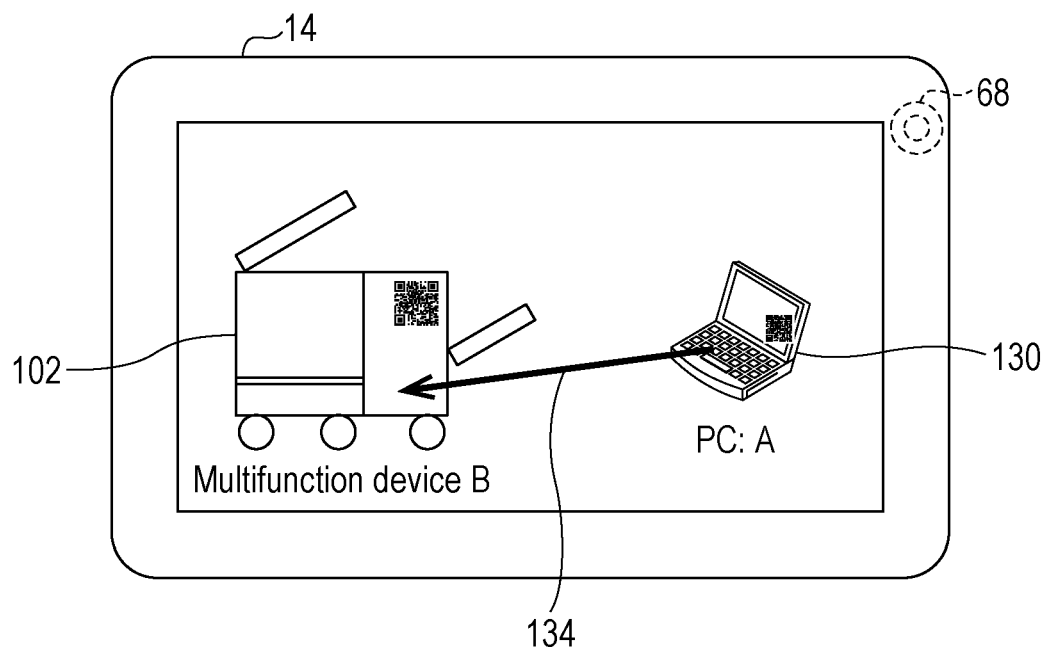
Figure 39B:
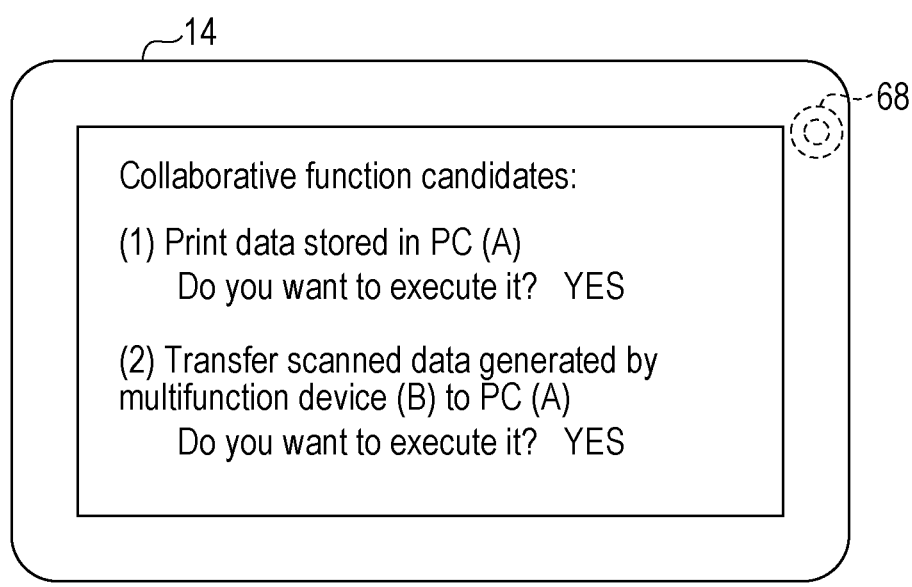

FIGS. 39A and 39B illustrate another example of the operation. As shown in FIG. 39A, the user touches the device image 130 on the screen by using an indicator and slides the indicator on the screen to the device image 102 in the direction indicated by an arrow 134, thereby connecting the device images 130 and 102. This operation specifies the PC (A) linked with the device image 130 and the multifunction device (B) linked with the device image 102 as collaborative devices and also specifies the connecting order of the devices. In the example in FIG. 39A, the user connects the device image 130 to the device image 102, and thus, the PC (A) is connected to the multifunction device (B). The collaborative function management table in FIG. 37 shows that "print function" takes the first priority level and "scan transfer function" takes the second priority level. In this case, as shown in FIG. 39B, on the UI 72 of the terminal device 14, information concerning "print function" is displayed preferentially over information concerning "scan transfer function". In the example in FIG. 39B, the information concerning "print" is displayed above the information concerning "scan transfer function".

As described above, by connecting device images linked with devices, collaborative functions implemented by the function of the connected devices are specified. The display order of items of information concerning collaborative functions is changed in accordance with the connecting order of device images, that is, the connecting order of devices. The connecting order of devices serves as the order of utilizing the functions of the devices and the order of transferring data between the devices. The operation for connecting devices (that is, the operation for connecting device images) serves as the operation for specifying the order of utilizing the functions of the devices and the order of transferring data between the devices. By changing the display order of items of information concerning collaborative functions according to the connecting order, information concerning a collaborative function which is likely to be used by the user is preferentially displayed. That is, information concerning a collaborative function which is highly likely to be used by the user is preferentially displayed. If the user connects the device image 102 linked with the multifunction device (B) to the device image 130 linked with the PC (A), it can be assumed that the user will utilize the collaborative function "using the function of the multifunction device (B) first to transfer data from the multifunction device (B) to the PC (A)". If the user connects the device image 130 linked with the PC (A) to the device image 102 linked with the multifunction device (B), it can be assumed that the user will utilize the collaborative function "using the function of the PC (A) first to transfer data from the PC (A) to the multifunction device (B)". By changing the display order of items of information concerning collaborative functions according to the connecting order of device images, information concerning a collaborative function which is highly likely to be used by the user is preferentially displayed. The order of utilizing the functions and the order of transferring data between devices are specified merely by connecting device images, and as a result, information concerning a collaborative function which is likely to be used by the user is displayed.

The above-described display switching processing may be applied to the use of function images linked with functions. For example, displaying of items of information concerning collaborative functions is switched in accordance with the order of specifying a device image linked with a first function and a device image linked with a second function.

(Collaboration Processing Using Portion Images)

Different functions may be assigned to different positions within a device image linked with a device to be used as a collaborative device. When a user specifies a certain position within a device image, information concerning a collaborative function implemented by using a function assigned to this position is preferentially displayed. This processing will be described below in detail.

FIG. 40 shows an example of the device function management table. Data in the device function management table is stored in the robot device 10 as the device function management information 40. In the example of the device function management table shown in FIG. 40, the device ID, information indicating the device name (device type, for example), information indicating the position within a device image (device image position), information indicating the function assigned to the device image position (function information), and the image ID are associated with each other. The device image position is a specific position (specific portion) within a device image linked with a device. The device image position is, for example, a specific position within a device image schematically representing a device or a specific position within a device image captured by a camera. Different functions are assigned to the specific positions within a device image.

Figure 41A:
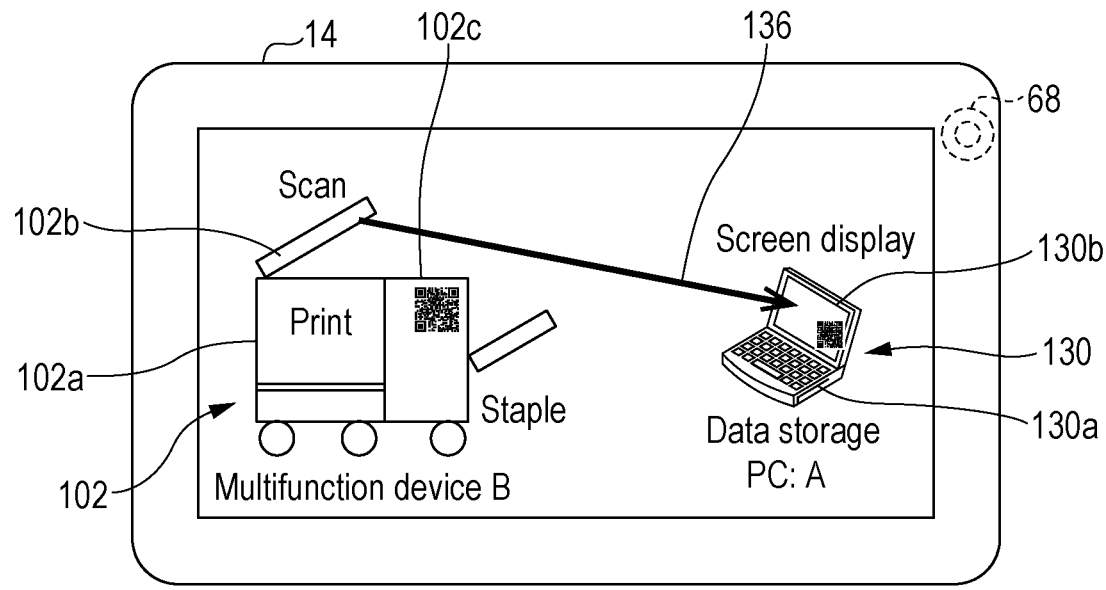
FIGS. 41A and 41B illustrate examples of screens.
Figure 41B:
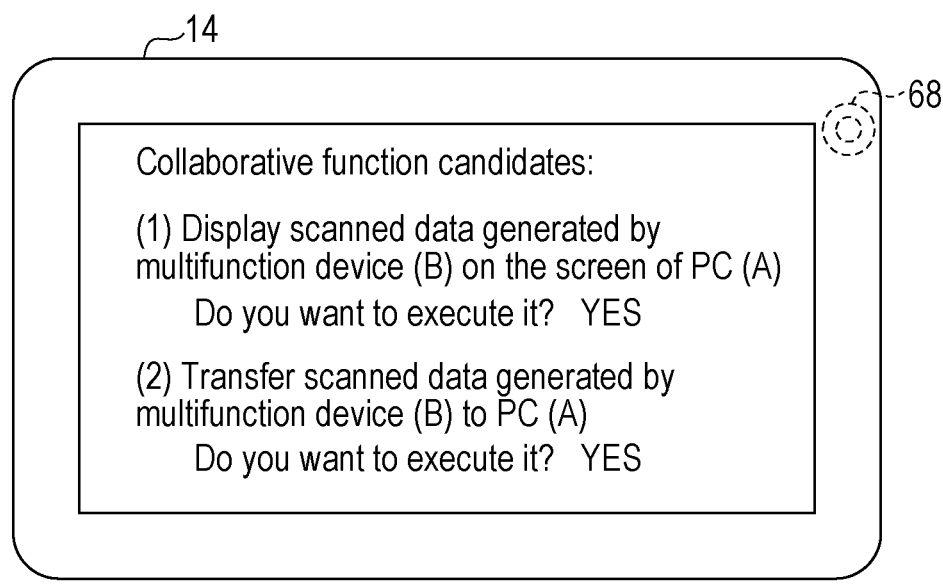

FIGS. 41A through 41B illustrate examples of screens displayed on the UI 72 of the terminal device 14. The multifunction device (B) and the PC (A), for example, are identified. In the above-described user decision mode 1, the device images 102 and 130 are displayed as situation information on the UI 72 of the terminal device 14, as shown in FIG. 41A. The following functions, for example, are assigned to specific positions of the device image 102. A print function is assigned to a specific position (portion image 102*a*) corresponding to the body of the multifunction device (B). A scan function is assigned to a specific portion (portion image 102*b*) corresponding to a document cover, document glass, and an automatic document feeder of the multifunction device (B). A stapling function is assigned to a specific position (portion image 102*c*) corresponding to a post-processor of the multifunction device (B). The stapling function is the function of stapling sheets output from the multifunction device (B). The following functions, for example, are assigned to portions of the device image 130. A data storage function is assigned to a specific position (portion image 130*a*) corresponding to the body of the PC (A). A screen display function is assigned to a specific position (portion image 130b) corresponding to the display of the PC (A). The data storage function is the function of storing data sent from another device in the PC (A). The screen display function is the function of displaying data sent from another device on the PC (A).

The controller 74 of the terminal device 14 may cause the names of functions (such as print and scan) assigned to specific positions within a device image to be displayed on the UI 72. This enables the user to understand which functions are assigned to specific positions. The names of functions may not necessarily be displayed.

When the user specifies a position within a device image to which a function is assigned, this function is specified as a collaborative function. In device images representing devices to be used as collaborative devices, the user connects specific positions (portion images) to which functions are assigned by using an indicator. For example, as indicated by an arrow 136 in FIG. 41A, the user touches the portion image 102b with the indicator and slides the indicator to the portion image 130b so as to connect the portion images 102b and 130b. This connecting operation specifies the multifunction device (B) linked with the device image 102 including the portion image 102b and the PC (A) linked with the device image 130 including the portion image 130b as collaborative devices, and also specifies the scan function assigned to the portion image 102b and the screen display function assigned to the portion image 130b. This connecting operation may also specify the connecting order of the devices. The connecting order of the portion images corresponds to the connecting order of the devices. In the example in FIG. 41A, the user connects the portion image 102b to the portion image 130b, and thus, the multifunction device (B) is connected to the PC (A). As functions to be used for a collaborative function, the scan function and the screen display function are specified. Information indicating the connecting order of the devices and information indicating the positions within the device images specified by the user are sent from the terminal device 14 to the robot device 10.

When devices to be combined as collaborative devices (PC (A) and multifunction device (B), for example) are identified, the identifying unit 64 of the robot device 10 refers to the collaborative function management table shown in FIG. 11 and identifies collaborative functions to be implemented by combining the PC (A) and the multifunction device (B). The identifying unit 64 also refers to the device function management table shown in FIG. 40, and identifies the functions assigned to the positions specified by the user. The identifying unit 64 then adjusts the priority levels of the collaborative functions implemented by combining the PC (A) and the multifunction device (B). More specifically, the identifying unit 64 raises the priority level of the collaborative function using the functions assigned to the positions specified by the user and lowers the priority levels of collaborative functions which do not use these functions.

Information concerning the collaborative functions and information concerning the priority levels are sent from the robot device 10 to the terminal device 14. The controller 74 of the terminal device 14 causes information concerning the collaborative functions to be displayed on the UI 72 as information concerning collaborative function candidates in accordance with the priority levels.

For example, as shown in FIG. 41B, the controller 74 causes information concerning the collaborative function candidates to be displayed on the UI 72. The user has specified the scan function and the screen display function in this order. Consequently, information concerning a collaborative function "scan transfer display function" to be executed by combining the scan function and the screen display function is displayed preferentially over information concerning the other collaborative function. The information concerning "scan transfer display function" is displayed above the other items of information. For example, the information concerning "scan transfer display function" is displayed preferentially over information concerning a collaborative function "scan transfer storage function" executed by combining the scan function and the data storage function. The scan transfer display function is the function of transferring scanned data generated by the multifunction device (B) to the PC (A) and displaying the scanned data on the screen of the PC (A). The scan transfer storage function is the function of transferring scanned data generated by the multifunction device (B) to the PC (A) and storing the scanned data in the PC (A). In the example in FIG. 41B, a description of each collaborative function is displayed as information concerning the collaborative function.

The above-described collaboration processing using portion images enables a user to individually specify the functions assigned to portions of collaborative devices and makes it possible to preferentially display information concerning a collaborative function implemented by the functions specified by the user. As a result, a collaborative function which is likely to be used by the user is preferentially displayed.

A collaborative function may be a function using a combination of portions of the same device, a function using a combination of portions of different devices, a function using a combination of the entirety of a device and a portion of another device, or a function using a combination of the entirety of a device and the entirety of another device.

The above-described collaboration processing using portion images may be applicable to the use of function images linked with functions. For example, different functions are assigned to different positions within a function image, and a collaborative function implemented by using the functions assigned to the positions specified by the user is identified.

(Another Example of Collaboration Processing Using Portion Images)

Another example of collaboration processing using portion images will be discussed below with reference to FIGS. 42 and 43.

FIG. 42 shows an example of the device function management table. Data in the device function management table is stored in the robot device 10 as the device function management information 40. In the example of the device function management table shown in FIG. 42, the device ID, information indicating the device name (device type, for example), information indicating the name of a portion of a device (type of portion, for example), information indicating the portion ID of the portion as portion identification information for identifying this portion, information indicating the function assigned to this portion (function of this portion), and the portion image ID for identifying a portion image linked with this portion are associated with each other. The portion image is an image representing the external appearance of a portion of a device captured by a camera. The portion image may alternatively be a portion image schematically representing a portion of a device. Different functions are assigned to different portions of a device.

This will be explained more specifically. A screen display function is assigned to the display of the PC (A), and information concerning the screen display function is associated with the portion image ID of a portion image linked with the display. The screen display function is the function of displaying information on the PC (A). A data storage function is assigned to the body of the PC (A), and information concerning the data storage function is associated with the portion image ID of a portion image linked with the body. The data storage function is the function of storing data in the PC (A).

A print function is assigned to the body of the multifunction device (B), and information concerning the print function is associated with the portion image ID of a portion image linked with the body. A scan function is assigned to a reader (a portion corresponding to a document cover, document glass, and an automatic document feeder) of the multifunction device (B), and information concerning the scan function is associated with the portion image ID of a portion image linked with the reader. A stapling function is assigned to a post-processor of the multifunction device (B), and information concerning the stapling function is associated with the portion image ID of a portion image linked with the post-processor. The stapling function is the function of stapling sheets output from the multifunction device (B).

The function assigned to a portion of a device may be specified (identified) by using the markerless AR technology. If image data is generated as a result of a camera (a visual sensor of the robot device 10, for example) capturing an image of a portion of a device, the identifying unit 64 of the robot device 10 refers to the device function management table and specifies (identifies) a function associated with this image data. This operation makes it possible to specify (identify) the function associated with the portion of the device. For example, if image data is generated as a result of the visual sensor capturing an image of the body of the multifunction device (B), the identifying unit 64 refers to the device function management table and specifies (identifies) the print function associated with this image data. It is thus possible to specify that the function assigned to the body of the multifunction device (B) is the print function.

The function assigned to a portion of a device may be specified (identified) by using the marker-based AR technology. A marker, which is coded portion identification information (portion ID, for example), such as a two-dimensional barcode, is provided in each portion of a device. An image of the marker is captured by the visual sensor and is processed by using the marker-based AR technology so as to obtain portion identification information (portion ID) indicating this portion. The identifying unit 64 of the robot device 10 then refers to the device function management table and specifies (identifies) the function associated with the portion identification information.

FIG. 43 shows an example of the collaborative function management table. Data in the collaborative function management table is stored in the robot device 10 as the collaborative function management information 42. The collaborative function management table indicates collaborative functions which are each executable by using functions of plural portions. In the example of the collaborative function management table shown in FIG. 43, information indicating a combination of portions of devices, information indicating a combination of portion IDs, and information indicating a collaborative function executable by using plural functions of the combination of the portions of the devices are associated with each other. In the collaborative function management table, information indicating a combination of a portion of a device and the entirety of another device and information indicating a collaborative function executable by using the function of this portion of the device and the function of the entirety of the device may be associated with each other.

The collaborative function management table will be explained more specifically. As a collaborative function, a print function is assigned to a combination of the display of the PC (A) and the body of the multifunction device (B). Information indicating the print function as a collaborative function is associated with information indicating a combination of the portion ID of the display of the PC (A) and the portion ID of the body of the multifunction device (B). The print function as a collaborative function is the function of sending data stored in the PC (A) to the multifunction device (B) and printing the data in the multifunction device (B).

As a collaborative function, a print function is assigned to a combination of the body of the multifunction device (B) and the body of the projector (C). Information indicating the print function as a collaborative function is associated with information indicating a combination of the portion ID of the body of the multifunction device (B) and the portion ID of the body of the projector (C). The print function as a collaborative function is the function of sending data projected by the projector (C) to the multifunction device (B) and printing the data in the multifunction device (B).

As a collaborative function, a scan projecting function is assigned to a combination of the reader of the multifunction device (B) and the body of the projector (C). Information indicating the scan projecting function as a collaborative function is associated with information indicating a combination of the portion ID of the reader of the multifunction device (B) and the portion ID of the body of the projector (C). The scan projecting function as a collaborative function is the function of sending scanned data generated by the multifunction device (B) to the projector (C) and projecting the data by the projector (C).

A collaborative function may be a function using functions of plural portions of the same device or a function using functions of plural portions of different devices. A collaborative function may be a function using functions of three or more portions.

When plural portions of devices (such as plural portions of different devices or plural portions of the same device) are specified (identified) by using the marker-based AR technology or the markerless AR technology, the identifying unit 64 of the robot device 10 refers to the collaborative function management table and specifies (identifies) a collaborative function associated with a combination of the identified plural portions. This operation makes it possible to specify (identify) a collaborative function using functions of plural portions identified by capturing images thereof, for example. If the body of the multifunction device (B) and the body of the projector (C) are identified, the robot device 10 refers to the collaborative function management table and specifies the print function as a collaborative function associated with a combination of the body of the multifunction device (B) and the body of the projector (C).

(Specifying of Collaborative Devices by Superposing Device Images)

Devices to be used as collaborative devices may be specified by superposing plural device images. This processing will be described below with reference to FIGS. 44A through 45B. FIGS. 44A through 45B illustrate examples of screens displayed on the UI 72 of the terminal device 14.

Figure 44A:
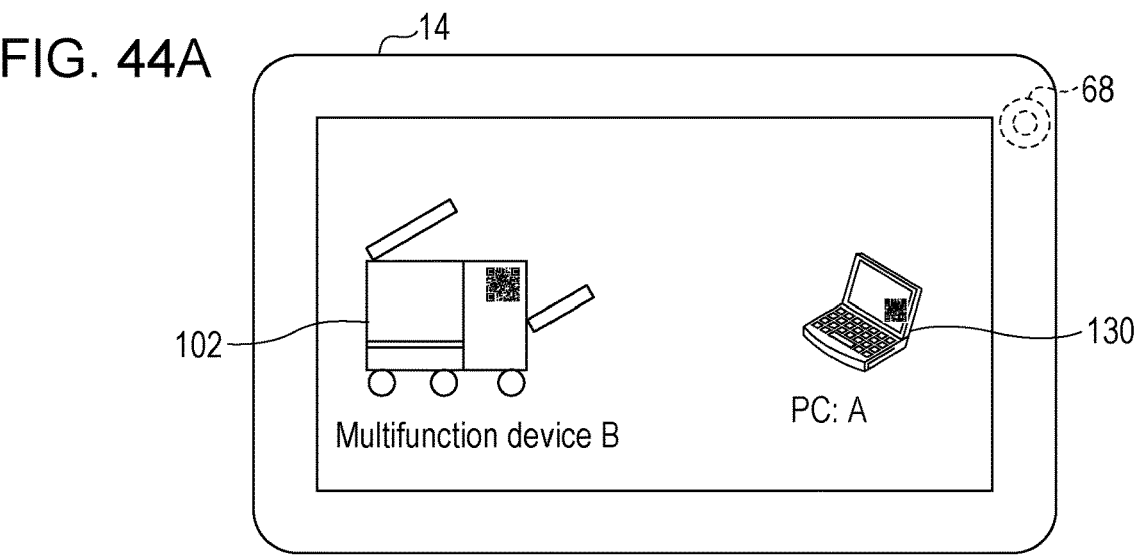
FIGS. 44A through 46B illustrate examples of screens.
Figure 44B:
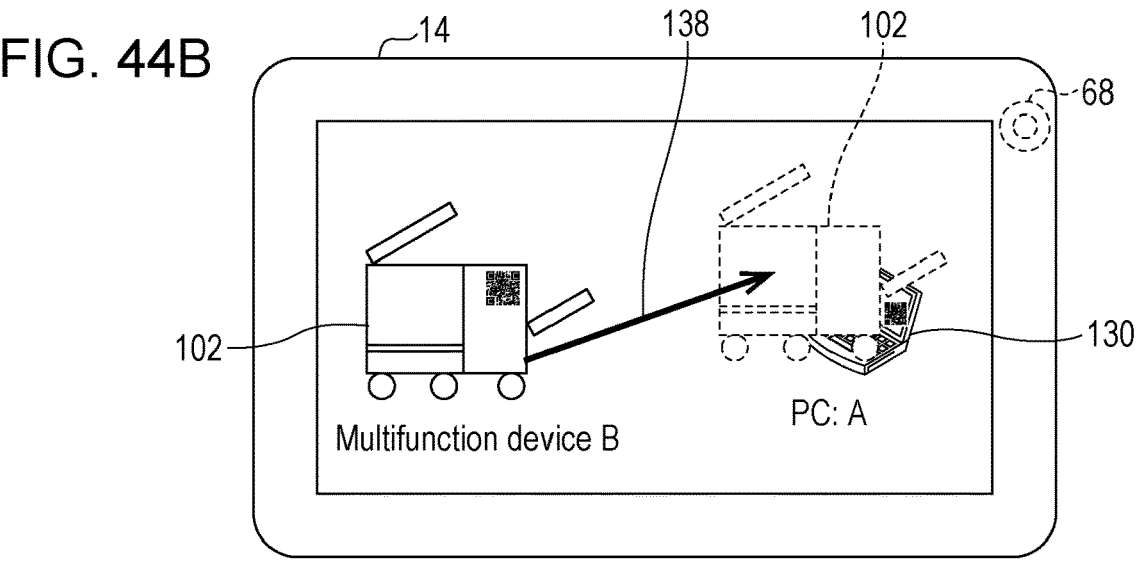

The multifunction device (B) and the PC (A), for example, are identified. In the above-described user decision mode 1, the device images 102 and 130 associated with the identified devices are displayed as situation information on the UI 72 of the terminal device 14, as shown in FIG. 44A. In this state, by using an indicator (a user's finger, a pen, or a stylus, for example), the user superposes a device image linked with a first image on a device image linked with an associating image (second image). For example, as shown in FIG. 44B, the user specifies the device image 102 with the indicator and superposes the device image 102 on the device image 130, as indicated by an arrow 138. The user superposes the device images 102 and 130 by performing a drag-and-drop operation, for example. That is, the user drags the device image 102 and drops it on the device image 130. The drag-and-drop operation is a known operation. Alternatively, the user may provide a voice instruction to specify device images to be superposed on each other. For example, the device images 102 and 130 may be specified and superposed on each other according to a voice instruction provided from the user.

By superposing the device images 102 and 130 on each other, the multifunction device (B) linked with the device image 102 and the PC (A) linked with the device image 130 are specified as collaborative devices.

Under the control of the controller 74 of the terminal device 14, while a device image is being dragged, it may be displayed on the UI 72 in an identifiable manner, such as it is displayed translucently or in a specific color.

Figure 44C:
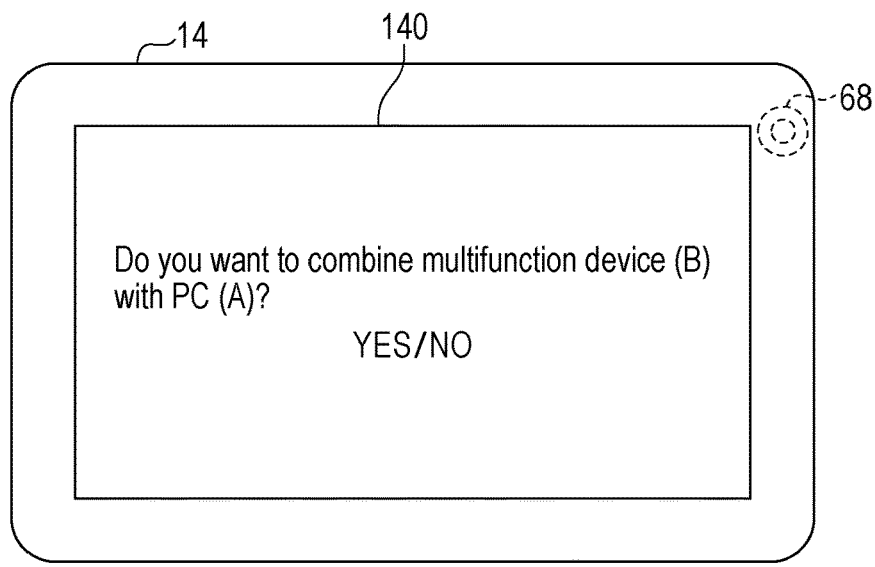

After the device image 102 is superposed on the device image 130, if the PC (A) is capable of executing a collaborative function with the multifunction device (B), a checking screen 140 is displayed on the UI 72 of the terminal device 14, as shown in FIG. 44C. The checking screen 140 is a screen for checking whether the user wishes to combine the devices specified as collaborative devices. If the user provides a collaboration instruction (if the user presses a "YES" button) on the checking screen 140, information concerning the collaborative functions is displayed on the UI 72.

Figure 45A:
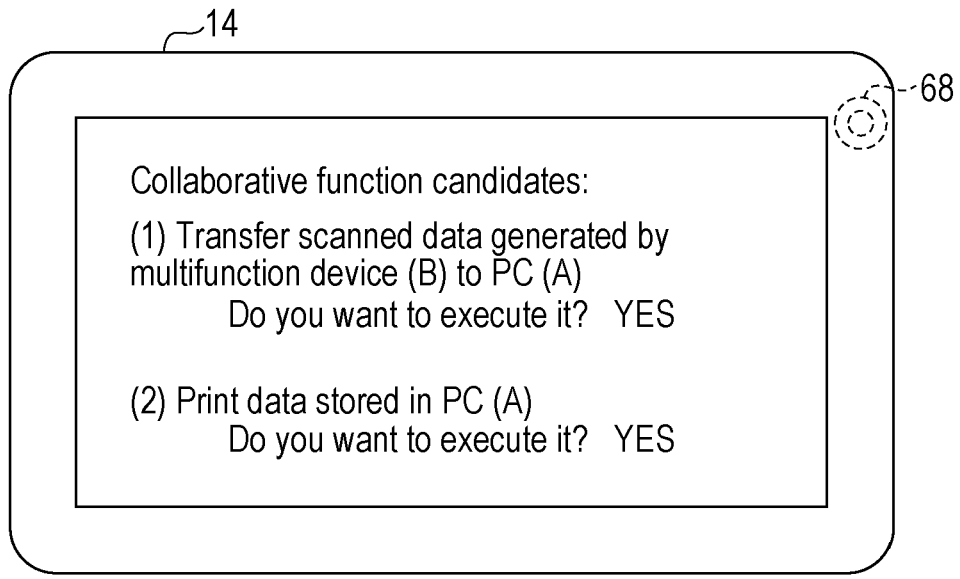

As shown in FIG. 45A, the controller 74 of the terminal device 14 causes information concerning collaborative function candidates to be displayed on the UI 72. By combining the multifunction device (B) with the PC (A), the scan transfer function and the print function are implemented. Consequently, information concerning the scan transfer function and information concerning the print function are displayed on the UI 72.

Figure 45B:
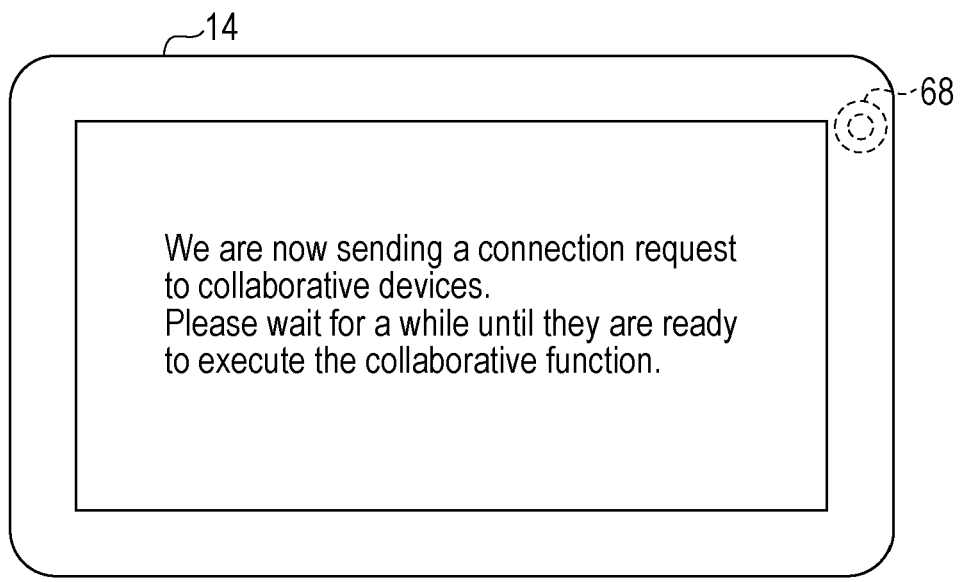

When the user specifies a collaborative function and provides an execution instruction, a connection request is sent from the terminal device 14 to the collaborative devices. As shown in FIG. 45B, a standby screen is displayed on the UI 72 of the terminal device 14 while the connection request is being sent. After the connection between the terminal device 14 and the collaborative devices has successfully established, the specified collaborative function is executed.

As described above, by superposing device images linked with collaborative devices on each other, a collaborative function implemented by using functions of the superposed devices is specified. A mere simple operation such as superposing images is thus sufficient to combine functions.

Figure 46A:
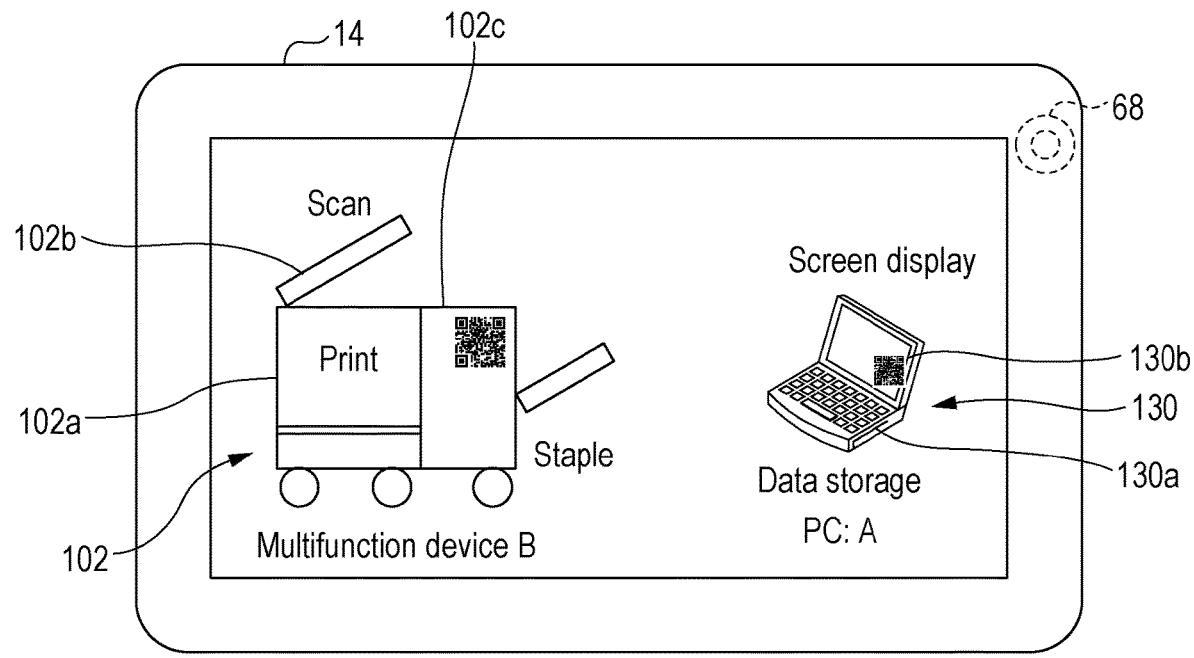
Figure 46B:
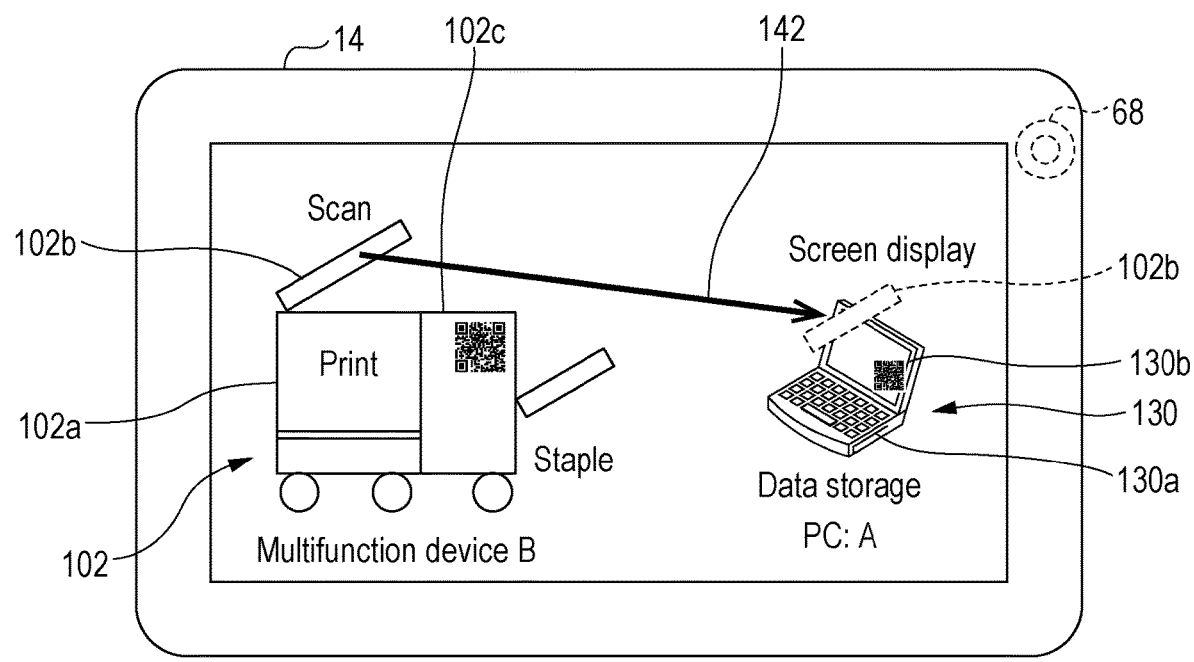

A collaborative function may be specified by superposing a portion image on a device image or on a portion image. This processing will be described below with reference to FIGS. 46A and 46B. FIGS. 46A and 46B illustrate examples of screens displayed on the UI 72 of the terminal device 14.

In a manner similar to the above-described collaboration processing using portion images, different functions are assigned to different positions in a device image linked with a device. By superposing a portion image within a device image on another portion image within the same device image or within a different device image, a collaborative function using functions assigned to these superposed portion images is specified. This processing will be discussed below in detail.

The multifunction device (B) and the PC (A), for example, are identified. In the above-described user decision mode 1, the device images 102 and 130 are displayed as situation information on the UI 72 of the terminal device 14, as shown in FIG. 46A. Portion images 102a, 102b, 102c, 130a, and 130b are displayed as images that can be individually moved independently by separating from other portion images.

When a portion image is specified and is superposed on another portion image by the user, a collaborative function using functions assigned to these superposed portion images is specified, and information concerning the collaborative function is displayed on the UI 72 of the terminal device 14.

For example, if the user drags the portion image 102b and drops it on the portion image 130b by using an indicator, as indicated by an arrow 142 in FIG. 46B, the multifunction device (B) linked with the device image 102 including the portion image 102b and the PC (A) linked with the device image 130 including the portion image 130b are specified as collaborative devices. The scan function assigned to the portion image 102b and the screen display function assigned to the portion image 130b are also specified as a collaborative function.

Functions assigned to portion images are managed in the robot device 10. For example, identification information for identifying portion images, function information indicating functions assigned to the portion images, and collaborative function information indicating collaborative functions to be executed by combining functions are stored in the robot device 10 in association with each other. When a portion image is selected and is superposed on another portion image, identification information indicating these superposed portion images is sent from the terminal device 14 to the robot device 10. In the example in FIG. 46B, identification information indicating the portion image 102b and that indicating the portion image 130b are sent from the terminal device 14 to the robot device 10. The identifying unit 64 of the robot device 10 specifies the functions assigned to the portion images 102b and 130b based on the identification information so as to specify a collaborative function using these functions. Information concerning the collaborative function is sent from the robot device 10 to the terminal device 14 and is displayed.

The above-described processing enables a user to individually specify functions of collaborative devices and makes it possible to preferentially display information concerning a collaborative function using the functions specified by the user. As a result, a collaborative function which is likely to be used by the user is preferentially displayed.

The priority levels of displaying of collaborative functions may be changed in accordance with the order of superposing portion images. In this case, information concerning a collaborative function using the functions linked with superposed portion images is preferentially displayed.

Each of the robot device 10 and the terminal device 14 may be implemented as a result of software and hardware operating together. More specifically, each of the robot device 10 and the terminal device 14 includes one or plural processors, such as a central processing unit (CPU), which is not shown. As a result of this processor or these processors reading and executing a program stored in a storage device, which is not shown, the functions of the robot device 10 and the terminal device 14 are implemented.

This program is stored in a storage device by using a recording medium, such as a compact disc (CD) or a digital versatile disc (DVD), or via a communication path, such as a network. Alternatively, the functions of the robot device 10 and the terminal device 14 may be implemented by using hardware resources, such as a processor, an electronic circuit, and an application specific integrated circuit (ASIC). In this case, a device, such as a memory, may be used. Alternatively, the functions of the robot device 10 and the terminal device 14 may be implemented by using a digital signal processor (DSP) or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A robot device comprising:
   a detector that detects a surrounding situation; and
   a controller programmed to
       find a problem in the detected situation,
       select a solution to the problem from a plurality of solutions to the problem,
       determine whether the robot device can execute the solution alone based on function management information indicating functions of the robot device;
       in response to determining that the robot device can execute the solution alone, cause the robot device to execute the solution; and
       in response to determining that the robot device cannot execute the solution alone,
           determine an identity of an external device based on an image captured by the detector,
           identify a function of the external device based on the determined identity of the external device, and
           in response to the identified function corresponding to the selected solution, manipulate a hardware user interface of the external device to cause the selected solution to be executed using the function of the external device.

2. The robot device according to claim 1, wherein the controller performs control so that information indicating the solution will be displayed.

3. The robot device according to claim 2, wherein the controller also performs control so that a device image linked with the external device that is able to execute the solution will be displayed.

4. The robot device according to claim 3, wherein a function using the external device linked with the device image specified by a user is executed.

5. The robot device according to claim 3, wherein, if a plurality of device images are specified by a user, a collaborative function using a plurality of devices linked with the plurality of device images is executed.

6. The robot device according to claim 1, wherein the detector detects, as the surrounding situation, information concerning a person around the robot device or information concerning surroundings other than persons.

7. The robot device according to claim 6, wherein the controller finds the problem in the surrounding situation when a value representing the information concerning the surroundings other than persons is equal to or higher than a threshold.

8. The robot device according to claim 7, wherein the threshold is changed in accordance with the information concerning the person detected by the detector.

9. The robot device according to claim 6, wherein, if a first problem in the surrounding situation detected from a first detection result based on the information concerning the person is different from a second problem in the surrounding situation detected from a second detection result based on the information concerning the surroundings other than persons, the controller selects the solution in accordance with a priority level determined for the first detection result or a priority level determined for the second detection result.

10. The robot device according to claim 1, wherein, if the external device is usable for a charge, the controller controls a payment operation of the robot device for using the external device.

11. The robot device according to claim 10, wherein, if the robot device does not have any payment instrument, the controller causes the robot device to perform the payment operation by receiving payment support from the external device.

12. The robot device according to claim 1, further comprising:
   a communication unit that performs communication with the external device by changing a communication method suitable for surrounding environments.

13. The robot device according to claim 1, wherein the controller is further programed to:
   in a first mode, search autonomously for the solutions that allow the robot device to autonomously solve the problem in the detected situation; and
   in a second mode, request user input if the controller judges the robot device cannot solve the problem.

14. A non-transitory computer readable medium storing a program causing a computer to execute a process, the process comprising:
   detecting a surrounding situation;
   finding a problem in the detected situation;
   selecting a solution to the problem from a plurality of solutions to the problem;
   determining whether a robot device can execute the solution alone based on function management information indicating functions of the robot device;
   in response to determining that the robot device can execute the solution alone, causing the robot device to execute the solution; and
   in response to determining that the robot device cannot execute the solution alone,
       determining an identity of an external device based on an image captured by a detector,
       identifying a function of the external device based on the determined identity of the external device, and
       in response to the identified function corresponding to the selected solution, manipulating a hardware user interface of the external device to cause the selected solution to be executed using the function of the external device.

15. The non-transitory computer readable medium according to claim 14, the process further comprising:

in a first mode, searching autonomously for the solutions that allow a robot device having the computer to autonomously solve the problem in the detected situation; and in a second mode, requesting user input if the robot device cannot solve the problem.

* * * * *